(12) United States Patent
Guo et al.

(10) Patent No.: US 12,540,313 B2
(45) Date of Patent: Feb. 3, 2026

(54) ADH PROTEIN FAMILY MUTANT AND USE THEREOF

(71) Applicant: KANGMA-HEALTHCODE (SHANGHAI) BIOTECH CO., LTD., Shanghai (CN)

(72) Inventors: Min Guo, Shanghai (CN); Mini Deng, Shanghai (CN); Xue Yu, Shanghai (CN)

(73) Assignee: KANGMA-HEALTHCODE (SHANGHAI) BIOTECH CO., LTD., Shanghai (CN)

( * ) Notice: Subject to any disclaimer, the term of this patent is extended or adjusted under 35 U.S.C. 154(b) by 1222 days.

(21) Appl. No.: 17/059,416

(22) PCT Filed: May 28, 2019

(86) PCT No.: PCT/CN2019/088833
§ 371 (c)(1),
(2) Date: Nov. 27, 2020

(87) PCT Pub. No.: WO2019/228353
PCT Pub. Date: Dec. 5, 2019

(65) Prior Publication Data
US 2021/0214693 A1    Jul. 15, 2021

(30) Foreign Application Priority Data
May 31, 2018    (CN) .......................... 201810554584.5

(51) Int. Cl.
*C12P 21/02*    (2006.01)
*C12N 9/04*    (2006.01)

(52) U.S. Cl.
CPC ............ *C12N 9/0006* (2013.01); *C12P 21/02* (2013.01); *C12Y 101/01001* (2013.01)

(58) Field of Classification Search
CPC .......................... C12N 9/0006; C12P 21/02; C12Y 101/01001
See application file for complete search history.

(56) References Cited

U.S. PATENT DOCUMENTS

2011/0287499 A1    11/2011   Brown et al.

FOREIGN PATENT DOCUMENTS

CN    105861457 A    8/2016

OTHER PUBLICATIONS

Gould RM, et al. Substitution of Arginine for Histidine-47 in the Coenzyme Binding Site of Yeast Alcohol Dehydrogenase I. Biochemistry, 1990; 29: 5463-5468 (Year: 1990).*
Maqbool A, et al. The substrate-binding protein in bacterial ABC transporters: dissecting roles in the evolution of substrate specificity. Biochem Soc Trans. Oct. 2015;43(5):1011-7. doi: 10.1042/BST20150135 (Year: 2015).*
Cruz LM, et al. Protein Function Prediction. Methods Mol Biol. 2017; 1654:55-75. doi: 10.1007/978-1-4939-7231-9_5 (Year: 2017).*
Del Rio. Challenges in the Computational Modeling of the Protein Structure-Activity Relationship. Computation, Mar. 24, 2021; 9(4):39 (Year: 2021).*
Dujon B, et al. Genome evolution in yeasts. Nature. Jul. 1, 2004;430(6995):35-44. doi: 10.1038/nature02579 (Year: 2004).*
International Application No. PCT/CN2019/088833, International Search Report mailed Sep. 10, 2019, 12 pages.
International Application No. PCT/CN2019/088833, International Preliminary Report Report mailed Dec. 1, 2020, 13 pages.
Chen et al. "Optimized Expression in Pichia Pastoris Eliminates Common Protein Contaminants from Subsequent His-tag Purification", Biotechnology Letters, vol. 36, No. 4, Dec. 10, 2013, 8 pages.
Unamed Protein Product, Kluyveromyces dobzhanskii CBS 2104, Jan. 1, 2015, 2 pages.

* cited by examiner

*Primary Examiner* — Peter Paras, Jr.
*Assistant Examiner* — Gillian C. Reglas
(74) *Attorney, Agent, or Firm* — Liang & Hennessey LLP; Stanley D. Liang

(57) ABSTRACT

Provided are an ADH protein mutant and the use thereof. Compared with a wild-type ADH protein, the mutant is capable of (i) enhancing the expression purity, efficiency and yield of exogenous proteins in an in-vitro cell-free synthesis system; and/or (ii) reducing the binding ability of the mutant protein to Ni medium.

1 Claim, 14 Drawing Sheets

Specification includes a Sequence Listing.

```
KlADH1       1 MAASIPETQKGVIFYENGGELQYKDIPVPKPKANELLINVKYSGVCHTDL   50
               |||||||||||||||.|:|:||||||||||||||||||||||||||||||
4w6z_ScADH1  1 ---SIPETQKGVIFYESHGKLEYKDIPVPKPKANELLINVKYSGVCHTDL   47

KlADH1      51 HAWHGDWPLPTKLPLVGGHEGAGVVVAMGENVKGWKIGDFAGIKWLNGSC  100
               |||.||||||.||||||||||||||.||||||||||||:|||||||||||
4w6z_ScADH1 48 HAWHGDWPLPVKLPLVGGHEGAGVVVGMGENVKGWKIGDYAGIKWLNGSC   97

KlADH1     101 MSCEYCELSNESNCPEADLSGYTHDGSFQQYATADAVQAAKIPVGTDLAE  150
               |:||||||.||||||.||||||||||||||||||||||||.||.|||||:
4w6z_ScADH1 98 MACEYCELGNESNCPHADLSGYTHDGSFQQYATADAVQAAHIPQGTDLAQ  147

KlADH1     151 VAPVLCAGVTVYKALKSANLKAGDWVAISGAAGGLGSLAVQYAKAMGYRV  200
               |||:||||:|||||||||||.||.||||||||||||||||||||||||||
4w6z_ScADH1 148 VAPILCAGITVYKALKSANLRAGHWVAISGAAGGLGSLAVQYAKAMGYRV  197

KlADH1     201 LGIDAGEEKAKLFKDLGGEYFIDFTKSKNIPEEVIEATKGGAHGVINVSV  250
               |||.||.|.:||:.:|||.|||||||.|...|::|.||||||||||||||
4w6z_ScADH1 198 LGIDGGEGKEELFRSIGGEVFIDFTKEKDIVGAVLKATDGGAHGVINVSV  247

KlADH1     251 SEFAIEQSTNYVRSNGTVVLVGLPRDAKCKSDVFNQVVKSISIVGSYVGN  300
               ||.|||.||.||||:|||.|||||.|||.|||||||||||||||||||||
4w6z_ScADH1 248 SEAAIEASTRYVRANGTTVLVGMPAGAKCCSDVFNQVVKSISIVGSYVGN  297

KlADH1     301 RADTREAIDFFSRGLVKAPIHVVGLSELPSIYEKMEKGAIVGRYVVDTSK  350
               ||||||||:|||:||||:||.|||||.||||||||.||||||.|||||||
4w6z_ScADH1 298 RADTREALDFFARGLVKSPIKVVGLSTLPEIYEKMEKGQIVGRYVVDTSK  347
```

ADH PROTEIN FAMILY MUTANT AND USE THEREOF

A Sequence Listing in ASCII text file named Sequence Listing, created Jan. 21, 2025 with 90 kilobytes, is incorporated herein by reference in its entirety.

BACKGROUND OF THE INVENTION

1. Technical Field

The present invention relates to the field of biotechnology, and more particularly, to ADH protein family mutants and use thereof.

2. Description of the Related Art

Protein separation and purification refers to processes in which target proteins are purified from mixtures, extracts, cell lysis liquid, reaction products and the like by fusing poly-tag at one end of the target proteins or via the specific characteristics of the target proteins and by using chromatography method to separate other substances. Affinity chromatography refers to a method that one of two molecules having affinity is fixed on an insoluble matrix, and the other molecule is separated and purified based on the specificity and reversibility of the affinity between the two molecules. Common poly-tags used for affinity chromatography mainly include histidine (His), Glutathione S-transferase (GST), Maltose Binding Protein (MBP), etc. The principle of immobilized metal-chelating affinity chromatography (IMAC) is mainly based on the fact that amino acid residues on protein surface can form different affinity with metal ions, which can be divided into three types: electrostatic attraction, covalent binding and coordination bond binding. When protein surface contains histidine, cysteine or tryptophan, the corresponding imidazolyl group, thiol group or indolyl group can form coordination bond with metal ion. This method has become a commonly used protein purification tool by virtue of convenient expression, low cost, small impact on the properties of the target proteins and other advantages.

However, in practice, this purification method also has certain problems. Take Ni-NTA resin for example, some non-target proteins also have several discontinuous histidine residues on the surface of their three-dimensional structure, which results in that those non-target proteins also bind to Ni-NTA resin to a certain extent, thereby interfering with the purity of the final target protein.

Accordingly, there is an urgent need in the art to invent a method for engineering the histidine residues of non-target proteins to make them unable to bind to Ni ion affinity medium, such as Ni-NTA resin, so as to achieve the effect of improving the purity of target proteins.

SUMMARY OF THE INVENTION

One object of the present invention is to provide a method for engineering histidine residues of non-target proteins to make them unable to bind to Ni ion affinity medium, such as Ni-NTA resin, so as to increase the purity of target proteins.

According to the first aspect, the present invention provides an alcohol dehydrogenase (ADH) mutant protein. The mutant protein is a non-natural protein, and the mutant protein has mutations of at least one histidine (H) among amino acids 45-149 of wild-type alcohol dehydrogenase (ADH).

In another preferred embodiment, the mutation does not include histidine (H) at positions 67, 69, 93 and/or 94 of the wild-type alcohol dehydrogenase (ADH).

In another preferred embodiment, compared with the wild-type alcohol dehydrogenase (ADH), the binding ability of the alcohol dehydrogenase (ADH) mutant protein to Ni medium is reduced by 10%, preferably, by 25%, more preferably, by 50%, more preferably, by 80%, and most preferably, by 100%.

In another preferred embodiment, the histidines can be independently mutated to a basic amino acid.

In another preferred embodiment, the types of independent mutations of the histidine can be the same or different.

In another preferred embodiment, the histidines can be independently mutated to one or more amino acids selected from the following group: lysine (K), asparagine (N), glutamine (Q), arginine (R) and combinations thereof.

In another preferred embodiment, the mutant protein is derived from *K. lactis*.

In another preferred embodiment, the alcohol dehydrogenase (ADH) includes ADH1, ADH2, ADH3 and/or ADH4 protein.

In another preferred embodiment, the mutant protein has mutations at one or more core amino acids of wild-type alcohol dehydrogenase (ADH1) corresponding to SEQ ID NO.: 1, wherein the one or more core amino acids are selected from the following group:
  histidine (H) at position 47;
  histidine (H) at position 51; and
  histidine (H) at position 124.

In another preferred embodiment, the mutant protein has mutations at one or more core amino acids of wild-type alcohol dehydrogenase (ADH2) corresponding to SEQ ID NO.: 26, wherein the one or more core amino acids are selected from the following group:
  histidine (H) at position 45;
  histidine (H) at position 49; and
  histidine (H) at position 122.

In another preferred embodiment, the mutant protein has mutations at one or more core amino acids of wild-type alcohol dehydrogenase (ADH3) corresponding to SEQ ID NO.: 27, wherein the one or more core amino acids are selected from the following group:
  histidine (H) at position 71;
  histidine (H) at position 75; and
  histidine (H) at position 148.

In another preferred embodiment, the mutant protein has mutations at one or more core amino acids of wild-type alcohol dehydrogenase (ADH4) corresponding to SEQ ID NO.: 28, wherein the one or more core amino acids are selected from the following group:
  histidine (H) at position 72;
  histidine (H) at position 76; and
  histidine (H) at position 149.

In another preferred embodiment, the histidine (H) at position 47 is mutated to one or more amino acids selected from the following group: lysine (K), asparagine (N), glutamine (Q), arginine (R) and combinations thereof, preferably, lysine (K), asparagine (N) and/or arginine (R), more preferably, lysine (K) and asparagine (N).

In another preferred embodiment, the histidine (H) at position 51 is mutated to one or more amino acids selected from the following group: lysine (K), arginine (R) and a combination thereof, preferably, lysine (K) and/or arginine (R), more preferably, arginine (R).

In another preferred embodiment, the histidine (H) at position 124 is mutated to one or more amino acids selected from the following group: lysine (K), arginine (R) and a combination thereof, preferably, lysine (K).

In another preferred embodiment, the mutant protein has mutations at one or more core amino acids of wild-type alcohol dehydrogenase (ADH) corresponding to SEQ ID NO.: 1, wherein the one or more core amino acids are selected from the following group:
histidine (H) at position 47; and
histidine (H) at position 124.

In another preferred embodiment, the histidine (H) at position 45 is mutated to one or more amino acids selected from the following group: lysine (K), arginine (R), asparagine (N), glutamine (Q) and combinations thereof.

In another preferred embodiment, histidine (H) at position 49 is mutated to one or more amino acids selected from the group consisting of lysine (K), arginine (R) and a combination thereof.

In another preferred embodiment, histidine (H) at position 122 is mutated to one or more amino acids selected from the following group: lysine (K), arginine (R) and a combination thereof.

In another preferred embodiment, the mutant protein has mutations at one or more core amino acids of wild-type alcohol dehydrogenase (ADH) corresponding to SEQ ID NO.: 26, wherein the one or more core amino acids are selected from the following group:
histidine (H) at position 122; and
histidine (H) at position 45.

In another preferred embodiment, the histidine (H) at position 71 is mutated to one or more amino acids selected from the following group: lysine (K), arginine (R), asparagine (N), glutamine (Q) and combinations thereof.

In another preferred embodiment, the histidine (H) at position 75 is mutated to one or more amino acids selected from the following group: lysine (K), arginine (R) and a combination thereof.

In another preferred embodiment, histidine (H) at position 148 is mutated to one or more amino acids selected from the following group: lysine (K), arginine (R) and a combination thereof.

In another preferred embodiment, the mutant protein has mutations at one or more core amino acids of wild-type alcohol dehydrogenase (ADH) corresponding to SEQ ID NO.: 27, wherein the one or more core amino acids are selected from the following group:
histidine (H) at position 148; and
histidine (H) at position 71.

In another preferred embodiment, the histidine (H) at position 72 is mutated to one or more amino acids selected from the following group: lysine (K), arginine (R), asparagine (N), glutamine (Q) and combinations thereof.

In another preferred embodiment, the histidine (H) at position 76 is mutated to one or more amino acids selected from the following group: lysine (K), arginine (R) and a combination thereof.

In another preferred embodiment, the histidine (H) at position 149 is mutated to one or more amino acids selected from the following group: lysine (K), arginine (R) and a combination thereof.

In another preferred embodiment, the mutant protein has mutations at one or more core amino acids of wild-type alcohol dehydrogenase (ADH) corresponding to SEQ ID NO.: 28, wherein the one or more core amino acids are selected from the following group:
histidine (H) at position 149; and
histidine (H) at position 72.

In another preferred embodiment, the mutation is selected from the following group: H47K; H47N; H47Q; H47R; H51K; H51R; H124K; H124R; H47K and H124K; H47N and H124K; H47Q and H124K; H47R and H124K.

In another preferred embodiment, the mutation is selected from the following group: H47K; H47N; H51K; H124R; H47K and H124K; H47N and H124K.

In another preferred embodiment, the mutation is selected from the following group: H122K; H122R; H45K; H45R; H45N; H45Q; H49K; H49R; H122K and H45K; H122K and H45R; H122K and H45N; H122K and H45Q.

In another preferred embodiment, the mutation is selected from the following group: H148K; H148R; H71K; H71R; H71N; H71Q; H75K; H75R; H148K and H71K; H148K and H71R; H148K and H71N; H148K and H71Q.

In another preferred embodiment, the mutation is selected from the following group: H149K; H149R; H72K; H72R; H72N; H72Q; H76K; H76R; H149K and H72K; H149K and H72R; H149K and H72N; H149K and H72Q.

In another preferred embodiment, the amino acid sequence of the alcohol dehydrogenase (ADH) mutant protein is selected from the following group:
(1) a polypeptide whose amino acid sequence is any one of SEQ ID NO.: 2-13.
(2) a polypeptide derived from the polypeptides of amino acid sequences shown in SEQ ID NO.: 2-13, and having the function of the polypeptide described in (1), wherein the polypeptide is formed by substitution, deletion or addition of one or several (preferably 1-20, more preferably 1-15, more preferably 1-10, more preferably 1-8, more preferably 1-3, most preferably 1) amino acid residues in the amino acid sequence shown in any one of SEQ ID NO.: 2-13.

In another preferred embodiment, the amino acid sequence of the mutant protein is any one of SEQ ID NO.: 2-13.

In another preferred embodiment, the amino acid sequence of the mutant protein has at least 70% (preferably at least 75%, 80%, 85%, 90%, and more preferably at least 95% %, 96%, 97%, 98%, 99%) identity with the sequence SEQ ID NO.: 2-13.

In another preferred embodiment, except for the mutation (e.g., positions 47, 51 and/or 124), the remaining amino acid sequence of the mutant protein is identical or substantially identical to the sequence shown in SEQ ID NO.: 1.

In another preferred embodiment, except for the mutation (e.g., positions 45, 49 and/or 122), the remaining amino acid sequence of the mutant protein is identical or substantially identical to the sequence shown in SEQ ID NO.: 26.

In another preferred embodiment, except for the mutation (e.g., positions 71, 75 and/or 148), the remaining amino acid sequence of the mutant protein is identical or substantially identical to the sequence shown in SEQ ID NO.: 27.

In another preferred embodiment, except for the mutation (e.g., positions 72, 76 and/or 149), the remaining amino acid sequence of the mutant protein is identical or substantially identical to the sequence shown in SEQ ID NO.: 28.

In another preferred embodiment, that "the remaining amino acid sequence is substantially identical" refers to up to 50 (preferably 1-20, more preferably 1-10, more preferably 1-5) amino acids are different, wherein, the difference includes substitution, deletion or addition of amino acids, and the mutant protein still can (i) improve the expression purity, efficiency, and/or yield of the exogenous protein in an in-vitro cell-free synthesis system; and/or (ii) reduce the binding ability of the mutant protein to Ni medium.

In another preferred embodiment, the homology with the sequence shown in SEQ ID NO.: 1, 26, 27 or 28 is at least 80%, preferably at least 85% or 90%, more preferably at least 95%, most preferably at least 98% or 99%.

According to the second aspect, the present invention provides a polynucleotide, wherein the polynucleotide encodes the mutant protein of the first aspect of the present invention.

In another preferred embodiment, the polynucleotide is selected from the following group:
(a) a polynucleotide encoding the polypeptide shown in any one of SEQ ID NO.: 2-13;
(b) a polynucleotide whose sequence is any one of SEQ ID NO.: 14-25;
(c) a polynucleotide encoding the polypeptide shown in any one of SEQ ID NO.: 2-13; the homology of the sequence of the polynucleotide to the sequence shown in the nucleotide sequence of the wild-type ADH1 protein is ≥95% (preferably ≥98%);
(d) a polynucleotide complementary to any of the polynucleotides described in (a) to (c).

In another preferred embodiment, the polynucleotide additionally contains accessory elements in the flank of the ORF of the mutant protein, wherein the accessory elements are selected from the following group: a signal peptide, a secretory peptide, a tag sequence (such as γHis) and combinations thereof.

In another preferred embodiment, the polynucleotide is selected from the following group: a DNA sequence, a RNA sequence and a combination thereof.

According to the third aspect, the present invention provides a vector; wherein, the vector contains the polynucleotide according to the second aspect of the present invention.

In another preferred embodiment, the vector includes one or more promoters; wherein, the promoters are operably linked to the nucleic acid sequence, enhancer, transcription termination signal, polyadenylation sequence, origin of replication, selectable marker, nucleic acid restriction site and/or homologous recombination site.

In another preferred embodiment, the vector includes a plasmid and a viral vector.

In another preferred embodiment, the viral vector is selected from the following group: adeno-associated virus (AAV), adenovirus, lentivirus, retrovirus, herpes virus, SV40, poxvirus and combinations thereof.

In another preferred embodiment, the vector includes an expression vector, a shuttle vector and an integration vector.

According to the fourth aspect, the present invention provides a host cell; wherein, the host cell contains the vector according to the third aspect of the present invention, or the host cell has the polynucleotide according to the second aspect of the present invention integrated in its genome.

In another preferred embodiment, the host cell is a eukaryotic cell, such as a yeast cell, a plant cell or a mammal cell (including human and non-human mammal cells).

In another preferred embodiment, the host cell is a prokaryotic cell, such as *E. coli*.

In another preferred embodiment, the yeast cell is selected from one or more yeasts from the following group: *Pichia pastoris, Kluyveromyces* and a combination thereof; preferably, the yeast cell includes: *Kluyveromyces*, more preferably *Kluyveromyces marxianus* and/or *Kluyveromyces lactis*.

In another preferred embodiment, the host cell is selected from the following group: *E. coli*, wheat germ cell, insect cell, SF9 cell, Hela cell, HEK293 cell, CHO cell, yeast cell and combinations thereof.

According to the fifth aspect, the present invention provides a method for producing the alcohol dehydrogenase (ADH) mutant protein of the first aspect of the present invention, including steps of:
the host cell according to the fourth aspect of the present invention is cultured under conditions suitable for expression so as to express the alcohol dehydrogenase (ADH) mutant protein; and/or
the alcohol dehydrogenase (ADH) mutant protein is isolated.

According to the sixth aspect, the present invention provides an enzyme preparation, wherein the enzyme preparation comprises the alcohol dehydrogenase (ADH) mutant protein according to the first aspect of the present invention.

In another preferred embodiment, the enzyme preparation includes an injection and/or a lyophilized preparation.

According to the seventh aspect, the present invention provides a use of the mutant protein according to the first aspect of the present invention; wherein the mutant protein is used to prepare an enzyme preparation which can (i) improve the expression purity, efficiency, and/or yield of the exogenous protein in an in-vitro cell-free synthesis system; and/or (ii) reduce the binding ability of the mutant protein to Ni medium.

In another preferred embodiment, the Ni is selected from the following group: nickel element, nickel ion, free nickel ion, chromatography medium with nickel being bound, $Ni^{2+}$, Ni-beads, Ni-NTA and combinations thereof.

According to the eighth aspect, the present invention provides an engineered strain, wherein, the gene encoding its endogenous ADH protein is mutated to a polynucleotide encoding the mutant protein according to the first aspect of the present invention, wherein the endogenous ADH protein has affinity to Ni medium; wherein, the mutant protein has ADH activity and reduced binding ability to Ni medium.

In some preferred embodiments, the engineered strain is derived from yeast.

In some preferred embodiments, the engineered strain is derived from *Kluyveromyces*.

In some preferred embodiments, the engineered strain is derived from *Kluyveromyces lactis*.

According to the ninth aspect, the present invention provides a cell lysate of the engineered strain according to the eighth aspect of the present invention.

According to the tenth aspect, the present invention provides an in vitro protein synthesis system, comprising the cell lysate according to the ninth aspect of the present invention.

In some preferred embodiments, the in vitro protein synthesis system is a cell-free system.

In some preferred embodiments, the in vitro protein synthesis system is a cell-free transcription and translation system.

According to the eleventh aspect, the present invention provides an enzyme preparation comprising the ADH mutant protein according to the first aspect of the present invention.

According to the twelfth aspect, the present invention provides a method for producing the engineered strain according to the eighth aspect of the present invention.

According to the thirteenth aspect, the present invention provides a use of the engineered strain according to the eighth aspect of the present invention, or the cell lysate according to the ninth aspect of the present invention, or the in vitro protein synthesis system according to the tenth aspect of the present invention, where it is applicable for protein synthesis, and improved product purity of expressed protein is provided when using Ni-medium for purification.

It should be understood that, within the scope of the present invention, above-mentioned technical features and technical features specifically described hereinafter (e.g., embodiments or examples) can be combined with each other, whereby forming new or preferred technical solutions. For the simplicity, details will not be repeated herein.

BRIEF DESCRIPTION OF THE DRAWINGS

FIG. 2 shows a sequence homology comparison of the KlADH family protein ADH1-4. ADH1 (SEQ ID NO.: 1), ADH2 (SEQ ID NO.: 26), ADH3 (SEQ ID NO.: 27), -and ADH4 (SEQ ID NO.: 28). The black region represents the sequences have high homology.

FIG. 3 shows a sequence homology comparison between KlADH1 (SEQ ID NO.: 64) and ScADH1 (SEQ ID NO.: 65), wherein the sequence homology between the two is 84.9%.

DETAILED DESCRIPTION

Figure 1:
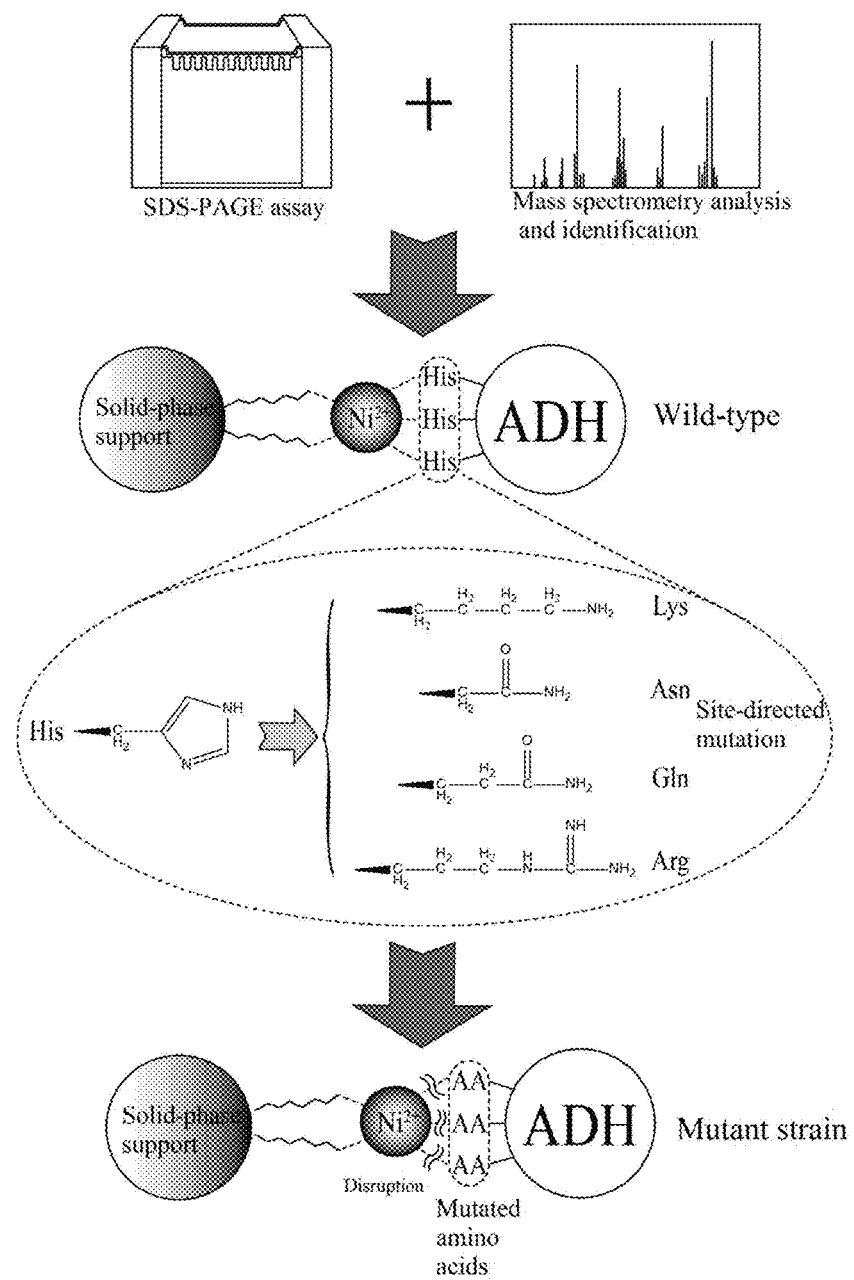
FIG. 1 shows a design route for engineering the gene of ADH1 in the *K. lactis* genome to eliminate its binding to Ni medium.
Figure 4:
FIG. 4 shows a homology modeling of KlADH4 with 2HCY as a template. Both 2HCY and KlADH4 are tetramers, and the six-His aggregation region of each monomer is represented by boxes, respectively.
Figure 5:
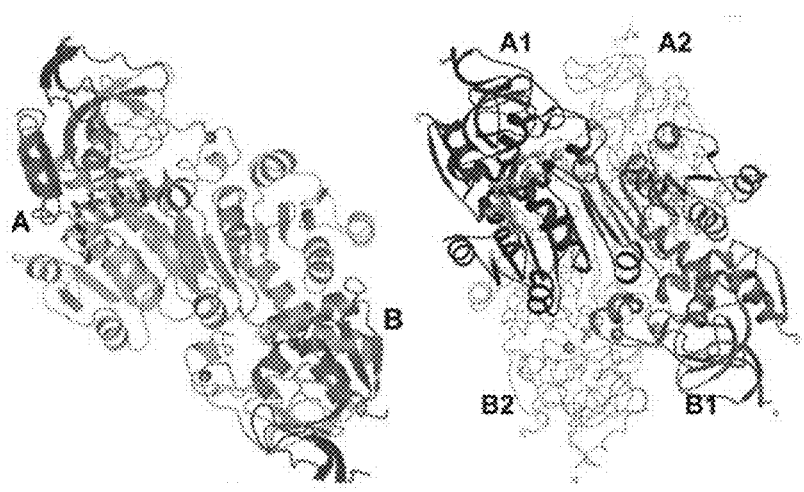
FIG. 5 shows a structure diagram of ScADH1 tetramer. The two subunits A and B form a dimer through the NADH/NAD$^+$ binding domain, and two AB dimers form a "back-to-back" tetramer.

After extensive and in-depth research, the inventors unexpectedly obtained an ADH family protein mutant. Compared with the wild-type ADH family protein, the ADH family protein mutant of the present invention can significantly (i) improve the expression purity, efficiency, and/or yield of the exogenous protein in an in-vitro cell-free synthesis system; and/or (ii) reduce the binding ability of the mutant protein to Ni medium. On this basis, the inventors completed the present invention.

Terms

In order to facilitate the understanding of this disclosure, certain terms are first defined. As used in this application, unless otherwise explicitly stated herein, each of the following terms shall have the meaning given below. Other definitions are stated throughout the application.

The term "about" may refer to a value or composition within an acceptable error range of a particular value or composition determined by those of ordinary skill in the art, which will depend in part on how the value or composition is measured or determined. For example, as used herein, the expression "about 100" includes all values between 99 and 101 (e.g., 99.1, 99.2, 99.3, 99.4, etc.).

As used herein, the terms "contain" or "include" can be understood to be open-ended, semi-closed-ended, or closed-ended. In other words, the terms also include "consist substantially of" or "consist of".

Sequence identity (or homology) is determined by comparing two aligned sequences along a predetermined comparison window (which can be 50%, 60%, 70%, 80%, 90%, 95% or 100% of the length of the reference nucleotide sequence or protein) and determining the number of locations where the same residue appears. Normally, this is expressed as a percentage. The measurement of nucleotide sequence identity is a method well known to those skilled in the art.

As used herein, the terms "subject" and "subject in need" refer to any mammal or non-mammal. The mammal includes, but is not limited to, human, vertebrate (such as rodents), non-human primate, cow, horse, dog, cat, pig, sheep, goat, giraffe, deer, camel, antelope, hare and rabbit.

ADH Family Proteins

A large amount of alcohol dehydrogenase (ADH) family proteins can be found in human and animal livers, plants and microbial cells. As a key enzyme for the metabolism of short-chain alcohols in organisms, it plays an important role in many physiological processes. For example, in humans and mammals, alcohol dehydrogenase and acetaldehyde dehydrogenase (ALDH) constitute the alcohol dehydrogenase system, which participates in the metabolism of alcohol in the body.

The ADH family proteins include ADH1, ADH2, ADH3 and/or ADH4 proteins.

Figure 2:
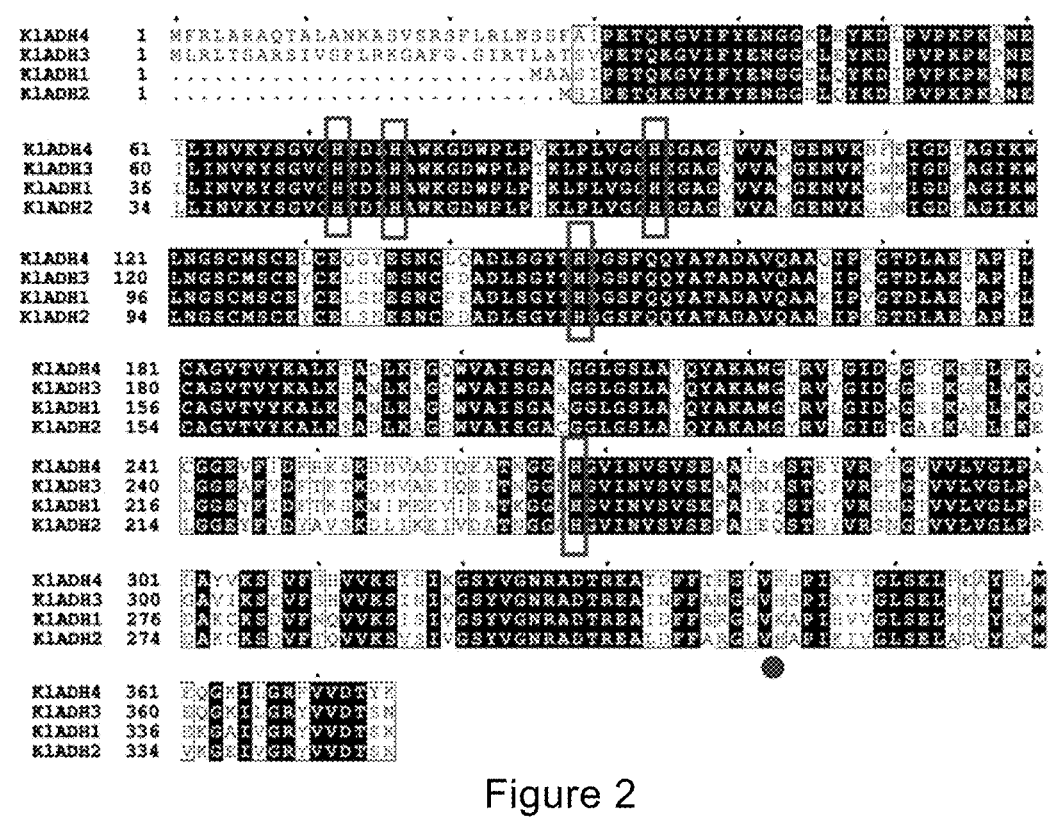

As shown in FIG. 2, the present invention found for the first time that ADH2 (SEQ ID NO.: 26, positions 45-122), ADH3 (SEQ ID NO.: 27, positions 71-148) and ADH4 (SEQ ID NO.: 28, positions 72-149) are highly homologous (about 98.7%) to ADH1 (SEQ ID NO.: 1, positions 47-124), and that ADH2 (H45, H49, H122), ADH3 (H71, H75, H148) and ADH4 (H72, H76, H149) correspond to H47, H51 and H124 in ADH1 respectively, that is, the corresponding relationship among the mutation sites of ADH1, ADH2, ADH3 and ADH4 are as follows.

| ADH Family Proteins | Mutation Sites | | |
| --- | --- | --- | --- |
| ADH1 | Position 47 | Position 51 | Position 124 |
| ADH2 | Position 45 | Position 49 | Position 122 |
| ADH3 | Position 71 | Position 75 | Position 148 |
| ADH4 | Position 72 | Position 76 | Position 149 |

Wild-Type ADH Family Protein

As used herein, "wild-type ADH family protein" refers to the naturally existing ADH family protein with no artificial engineering whose nucleotide sequence can be obtained through genetic engineering techniques (such as genome sequencing, polymerase chain reaction (PCR), etc.) and whose amino acid sequence can be deduced from the nucleotide sequence. The source of the wild-type ADH family protein is K. lactis wild-type cell strain. The wild-type ADH family proteins include ADH1, ADH2, ADH3 and/or ADH4 proteins.

In a preferred embodiment of the present invention, the amino acid sequence of the wild-type ADH family protein (e.g., ADH1, ADH2, ADH3, ADH4) is shown in SEQ ID NO.: 1, 26, 27 or 28, respectively.

ADH Family Protein Mutant and Coding Nucleic Acid Thereof

As used herein, the terms "mutant protein", "mutant protein of the present invention", "ADH mutant protein of the present invention", "mutated ADH protein of the present invention", "ADH mutant" and "mutant of ADH family protein" can be used interchangeably, all referring to mutant ADH protein which is not naturally existing, and the mutant protein has mutations of at least one histidine (H) among the amino acids at positions 45-149 of the wild-type alcohol dehydrogenase (ADH).

Moreover, in the present invention, the mutation does not include histidine (H) at positions 67, 69, 93 and/or 94 of the wild-type alcohol dehydrogenase (ADH).

In the present invention, the histidines can be independently mutated to basic amino acids, and the types of independent mutations of the histidine can be the same or different.

In a preferred embodiment, the histidines can be mutated to one or more amino acids selected from the following group: lysine (K), asparagine (N), glutamine (Q), arginine (R) and combinations thereof.

In a preferred embodiment, the mutant ADH protein of the present invention is a protein obtained by artificially engineering the protein shown in SEQ ID NO: 1, 26, 27 or 28.

Wherein, the mutant protein contains core amino acids related to activity, and at least one of the core amino acids is artificially engineered; and the mutant protein of the present invention can significantly (i) improve the expression purity, efficiency, and/or yield of the exogenous protein in an in-vitro cell-free synthesis system; and/or (ii) reduce the binding ability of the mutant protein to Ni medium.

The term "core amino acids" refers to a sequence which is based on the sequence of SEQ ID NO.: 1, 26, 27 or 28 and has at least 80% (e.g., 84%, 85%, 90%, 92%, 95%, 98%) homology with SEQ ID NO.: 1, 26, 27 or 28, the corresponding position is the specific amino acids described herein. For example, based on the sequence shown in SEQ ID NO.: 1, the core amino acids are:

histidine (H) at position 47; and/or
histidine (H) at position 51; and/or
histidine (H) at position 124.

For example, based on the sequence shown in SEQ ID NO.: 26, the core amino acids are:

histidine (H) at position 45; and/or
histidine (H) at position 49; and/or
histidine (H) at position 122.

For example, based on the sequence shown in SEQ ID NO.: 27, the core amino acids are:

histidine (H) at position 71; and/or
histidine (H) at position 75; and/or
histidine (H) at position 148.

For example, based on the sequence shown in SEQ ID NO.: 28, the core amino acids are:

histidine (H) at position 72; and/or
histidine (H) at position 76; and/or
histidine (H) at position 149.

And the mutant proteins obtained by mutating the above-mentioned core amino acids have the activity of significantly (i) improving the expression purity, efficiency, and/or yield of the exogenous protein in an in-vitro cell-free synthesis system; and/or (ii) reducing the binding ability of the mutant protein to Ni medium.

In another preferred embodiment, the histidine (H) at position 47 is mutated to one or more amino acids selected from the following group: lysine (K), asparagine (N), glutamine (Q), arginine (R) and combinations thereof, preferably, lysine (K), asparagine (N) and/or arginine (R), more preferably, lysine (K) and/or asparagine (N).

In another preferred embodiment, the histidine (H) at position 51 is mutated to one or more amino acids selected from the following group: lysine (K), arginine (R) and a combination thereof, preferably, lysine (K) and/or arginine (R), more preferably, arginine (R).

In another preferred embodiment, the histidine (H) at position 124 is mutated to one or more amino acids selected from the following group: lysine (K), arginine (R) and a combination thereof, preferably, lysine (K).

In another preferred embodiment, the mutant protein has mutations at one or more core amino acids of wild-type alcohol dehydrogenase (ADH) corresponding to SEQ ID NO.: 1, wherein the one or more core amino acids selected from the following group:

histidine (H) at position 47; and
histidine (H) at position 124.

In another preferred embodiment, the histidine (H) at position 45 is mutated to one or more amino acids selected from the following group: lysine (K), arginine (R), asparagine (N), glutamine (Q) and combinations thereof.

In another preferred embodiment, histidine (H) at position 49 is mutated to one or more amino acids selected from the group consisting of lysine (K), arginine (R) and a combination thereof.

In another preferred embodiment, histidine (H) at position 122 is mutated to one or more amino acids selected from the following group: lysine (K), arginine (R) and a combination thereof.

In another preferred embodiment, the mutant protein has mutations at one or more core amino acids of wild-type alcohol dehydrogenase (ADH) corresponding to SEQ ID NO.: 26, wherein the one or more core amino acids are selected from the following group:

histidine (H) at position 122; and
histidine (H) at position 45.

In another preferred embodiment, the histidine (H) at position 71 is mutated to one or more amino acids selected from the following group: lysine (K), arginine (R), asparagine (N), glutamine (Q) and combinations thereof.

In another preferred embodiment, the histidine (H) at position 75 is mutated to one or more amino acids selected from the following group: lysine (K), arginine (R) and a combination thereof.

In another preferred embodiment, histidine (H) at position 148 is mutated to one or more amino acids selected from the following group: lysine (K), arginine (R) and a combination thereof.

In another preferred embodiment, the mutant protein has mutations at one or more core amino acids of wild-type alcohol dehydrogenase (ADH) corresponding to SEQ ID NO.: 27, wherein the one or more core amino acids are selected from the following group:

histidine (H) at position 148; and
histidine (H) at position 71.

In another preferred embodiment, the histidine (H) at position 72 is mutated to one or more amino acids selected from the following group: lysine (K), arginine (R), asparagine (N), glutamine (Q) and combinations thereof.

In another preferred embodiment, the histidine (H) at position 76 is mutated to one or more amino acids selected from the following group: lysine (K), arginine (R) and a combination thereof.

In another preferred embodiment, the histidine (H) at position 149 is mutated to one or more amino acids selected from the following group: lysine (K), arginine (R) and a combination thereof.

In another preferred embodiment, the mutant protein has mutations at one or more core amino acids of wild-type alcohol dehydrogenase (ADH) corresponding to SEQ ID NO.: 28, wherein the one or more core amino acids are selected from the following group:

histidine (H) at position 149; and
histidine (H) at position 72.

It should be understood that the amino acid serial numbers in the mutated ADH protein of the present invention are based on the amino acid sequence of the wild-type ADH protein (preferably, SEQ ID NO.: 1, 26, 27 or 28). When a specific mutant protein has at least 80% homology with the sequence shown in SEQ ID NO.: 1, 26, 27 or 28, the amino acid serial numbers of the mutant protein may have a dislocation relative to amino acid serial numbers of SEQ ID NO.: 1, 26, 27, or 28, such as 1-5 dislocation positions towards the N or C terminus of amino acids. Using conventional sequence alignment techniques in the art, it is generally understood by those skilled in the art that such dislocation is within a reasonable range, and mutant proteins having 80% (e.g. 90%, 95%, 98%) homology and having identical or similar activity, should not be excluded due to dislocation of amino acid serial numbers, from the scope of the mutant proteins of the present invention.

The mutant protein of the present invention is a synthesized protein or a recombinant protein, that is, it can be a chemically synthesized product, or be produced from a prokaryotic or eukaryotic host (e.g., bacteria, yeast, plant) using recombinant technique. According to the host used in the recombinant production scheme, the mutant protein of the present invention can be glycosylated or non-glycosylated. The mutant protein of the present invention can also include or exclude the starting methionine residue.

The present invention also includes fragments, derivatives and analogues of the mutant protein. As used herein, the terms "fragment", "derivative" and "analogue" refer to a protein that substantially retains the same biological function or activity as the mutant protein.

The fragments, derivatives or analogues of the mutant protein of the present invention can be (i) a mutant protein in which one or more conservative or non-conservative amino acid residues (preferably conservative amino acid residues) are substituted, whereas such resultant substituted amino acid residues may or may not be encoded by genetic codes, or (ii) a mutant protein with a substitution group in one or more amino acid residues, or (iii) a mutant protein formed by the fusion of a mature mutant protein with another compound (such as a compound that prolongs the half-life of the mutant protein, such as polyethylene glycol), or (iv) a mutant protein formed by the fusion of an additional amino acid sequence to the mutant protein sequence (such as a fusion protein formed by fusion of a leading sequence, or a secretory sequence, or a sequence used to purify this mutant protein, or a proteogen sequence, or an antigen IgG fragment with the mutant protein). According to the teachings herein, these fragments, derivatives and analogues are within the scope well known to those skilled in the art. In the present invention, conservatively substituted amino acids are preferably generated by amino acid substitutions according to Table I.

TABLE I

| Initial Residue | Representative Substitution | Preferred Substitution |
|---|---|---|
| Ala (A) | Val; Leu; Ile | Val |
| Arg (R) | Lys; Gln; Asn | Lys |
| Asn (N) | Gln; His; Lys; Arg | Gln |
| Asp (D) | Glu | Glu |
| Cys (C) | Ser | Ser |
| Gln (Q) | Asn | Asn |
| Glu (E) | Asp | Asp |
| Gly (G) | Pro; Ala | Ala |
| His (H) | Asn; Gln; Lys; Arg | Arg |
| Ile (I) | Leu; Val; Met; Ala; Phe | Leu |
| Leu (L) | Ile; Val; Met; Ala; Phe | Ile |
| Lys (K) | Arg; Gln; Asn | Arg |
| Met (M) | Leu; Phe; Ile | Leu |
| Phe (F) | Leu; Val; Ile; Ala; Tyr | Leu |
| Pro (P) | Ala | Ala |
| Ser (S) | Thr | Thr |
| Thr (T) | Ser | Ser |
| Trp (W) | Tyr; Phe | Tyr |
| Tyr (Y) | Trp; Phe; Thr; Ser | Phe |
| Val (V) | Ile; Leu; Met; Phe; Ala | Leu |

The active mutant protein of the present invention has the activity of significantly (i) improving the expression purity, efficiency, and/or yield of the exogenous protein in an in-vitro cell-free synthesis system; and/or (ii) reducing the binding ability of the mutant protein to Ni medium.

In the present invention, the mutant protein is as described in the first aspect of the present invention. Preferably, the mutant protein is an amino acid sequence as shown in any one of SEQ ID NO.: 2-13.

It should be understood that the mutant protein of the present invention generally has higher homology (identity) compared with the sequence shown in any one of SEQ ID NO.: 2-13. Preferably, the mutant protein has at least 80%, preferably at least 85%-90%, more preferably at least 95%, and most preferably at least 98% homology with any of the sequences shown in SEQ ID NO. 2-13

In addition, the mutant protein of the present invention can also be modified. Modification (usually not change the primary structure) forms include: in vivo or in vitro chemically derived forms of mutant protein, such as acetylation or carboxylation. Modification also includes glycosylation, such as glycosylation modification carried out in the synthesis and processing or in further processing steps of the mutant proteins. This modification can be accomplished by exposing the mutant proteins to enzymes (such as mammalian glycosylases or deglycosylases) that perform glycosylation. Modification forms further include sequences with phosphorylated amino acid residues (such as phosphotyrosine, phosphoserine, phosphothreonine). Modification forms further include mutant proteins that are modified and thereby obtain increased resistance to proteolysis or improved solubility.

The term "polynucleotide encoding the mutant protein" can be a polynucleotide encoding the mutant protein of the present invention, and also can be a polynucleotide that further contains additional coding and/or non-coding sequences.

The polynucleotide of the present invention can be in a form of DNA or RNA. In another preferred embodiment, the nucleotide is DNA. DNA forms include cDNA, genomic DNA and synthetic DNA. DNA can be single-stranded or double-stranded. DNA can be a coding strand or a non-coding strand. The coding region sequence encoding a mature polypeptide can be the same as the sequence encoding the polypeptide shown in any one of SEQ ID NO.: 2-13 or can be a degenerate variant. As used herein, "degenerate variant" in the present invention refers to a nucleic acid sequence that encodes a polypeptide shown in any one of SEQ ID NO.: 2-13 but differs in the sequence of the corresponding coding region.

The present invention also relates to variants of the aforementioned polynucleotides. The variants encode fragments, analogues and derivatives of polypeptides or mutant proteins having the same amino acid sequence as that of the present invention. These nucleotide variants include substitution variants, deletion variants and insertion variants. As is known in the art, an allelic variant is an alternative form of a polynucleotide. The allelic variant may be a substitution, deletion or insertion of one or more nucleotides, but it does not substantially change the function of the mutant protein encoded by it.

The nucleic acid sequence can be DNA, RNA, cDNA or PNA. The nucleic acid sequence can be genomic, recombinant or synthetic. The nucleic acid sequence can be isolated or purified. The nucleic acid sequence can be single-stranded or double-stranded. Preferably, the nucleic acid sequence will encode a photosensitive protein as described herein. The nucleic acid sequence can be derived by cloning techniques, such as, by standard molecular cloning techniques including restriction enzyme digestion, ligation and gel electrophoresis, such as cloning techniques described in Sambrook et al. Molecular Cloning: A laboratory manual, Cold Spring Harbour Laboratory Press. The nucleic acid sequence can be isolated, for example be isolated by using PCR technology. Isolation means the isolation of nucleic acid sequences from any impurities and from other nucleic acid sequences and/or proteins that are naturally found associated with the nucleic acid sequence in the source. Preferably, the nucleic acid sequence also does not contain cellular materials, media or other chemicals from purification/production processes. The nucleic acid sequence can be synthetic, for example can be produced by direct chemical synthesis. The nucleic acid sequence can be provided as a naked nucleic acid, or can be provided in a form of complex with proteins or lipids.

The present invention also relates to a polynucleotide that hybridizes with the aforementioned sequence and has at least 50%, preferably at least 70%, and more preferably at least 80% identity with the aforementioned sequence. The present invention particularly relates to a polynucleotide that can hybridize with the polynucleotide of the present invention under strict conditions (or rigorous conditions). In the present invention, "strict conditions" refer to: (1) hybridization and elution at lower ionic strength and higher temperature, such as 0.2×SSC, 0.1% SDS, 60° C.; or (2) hybridization in the presence of denaturant such as 50% (v/v) formamide, 0.1% calf serum/0.1% Ficoll, 42° C., etc.; or (3) hybridization occurs only when the identity between the two sequences is at least 90%, preferably at least 95%.

Mutant proteins and polynucleotides of the present invention are preferably provided in an isolated form, more preferably, being purified to homogeneity.

The full-length polynucleotide sequence of the present invention can usually be obtained by PCR amplification method, recombination method or artificial synthesis method. For the PCR amplification method, primers can be designed according to the relevant nucleotide sequence disclosed in the present invention, especially the open reading frame sequence, and the relevant sequences can be amplified using a commercially available cDNA library or a cDNA library prepared according to the conventional methods known to those skilled in the art as a template. When the sequence is long, it is often necessary to perform PCR amplifications twice or more times, and then the amplified fragments obtained from each of the PCR amplifications are spliced together in correct order.

Once related sequences are obtained, related sequences can be obtained in large numbers by recombination method. This usually refers to cloning the related sequences into vectors, transformation into cells, and subsequent isolation from the proliferated host cells by conventional methods to obtain the related sequences.

In addition, the related sequences, especially related sequences with short fragment lengths, can also be synthesized by artificial synthesis methods. Usually, synthesize many small fragments first and then carry out ligation to obtain fragments with a long sequence.

At present, the DNA sequence encoding the protein (or fragment or derivative thereof) of the present invention has can be obtained entirely via chemical synthesis. The DNA sequence can then be introduced into various existing DNA molecules (such as vectors) and cells known in the art. In addition, one can also introduce mutations into the protein sequence of the present invention via chemical synthesis.

The methods of amplifying DNA/RNA using PCR technology are preferably used to obtain the polynucleotide of the present invention. Especially when it is difficult to obtain full-length cDNA from the library, RACE method (RACE, Rapid Amplification of cDNA ends) can be preferably used. Primers used for PCR can be appropriately selected according to the sequence information of the present invention disclosed herein and can be synthesized by conventional methods. Amplified DNA/RNA fragments can be separated and purified by conventional methods such as gel electrophoresis.

In the present invention, DNA coding sequence of the ADH protein mutant is the nucleotide sequence shown in any one of SEQ ID NO.: 14-25.

Expression Vector and Host Cell

The present invention also relates to a vector containing the polynucleotide of the present invention, a host cell produced by genetic engineering using the vector of the present invention or using the coding sequence of the mutant protein of the present invention, and relates to a method for producing the polypeptide of the present invention through recombinant technology.

Through conventional recombinant DNA technology, the polynucleotide sequence of the present invention can be used to express or produce recombinant mutant protein. Generally speaking, the method comprises the following steps:

(1) transforming or transducing an appropriate host cell with a polynucleotide (or a variant) encoding the mutant protein of the present invention, or with a recombinant expression vector containing the polynucleotide;
(2) culturing the host cell in an appropriate medium; and
(3) isolating and purifying proteins from the medium or cells.

In the present invention, the polynucleotide sequence encoding the mutant protein can be inserted into a recombinant expression vector. The term "recombinant expression vector" refers to a bacterial plasmid, bacteriophage, yeast plasmid, plant cell virus, mammalian cell virus such as adenovirus and retrovirus, or other vectors well known in the art. Any plasmids and vectors can be used as long as they can be replicated and stable in the host. An important feature of the expression vector is that it usually contains a replication origin, a promoter, a marker gene and translation control elements.

Methods well known to those skilled in the art can be used to construct an expression vector containing the DNA sequence encoding the mutant protein of the present invention and appropriate transcription/translation control signals. These methods include in-vitro recombinant DNA technology, DNA synthesis technology, in-vivo recombination technology, etc. The DNA sequence can be effectively linked to an appropriate promoter in the expression vector to guide mRNA synthesis. Representative examples of these promoters include: lac or trp promoter of $E.\ coli$; PL promoter of 2 phage; eukaryotic promoters including CMV immediate-early promoter, HSV thymidine kinase promoter, SV40 early and late promoters, LTRs of retroviruses and some other known promoters that can control gene expression in prokaryotic or eukaryotic cells or viruses therein. The expression vector also includes a ribosome binding site for translation initiation and a transcription terminator.

In addition, the expression vector preferably contains one or more selective marker genes to provide phenotypic characters for selecting transformed host cells, such as dihydrofolate reductase, neomycin resistance and green fluorescent protein (GFP) for eukaryotic cell culture, or such as tetracycline resistance or ampicillin resistance for $E.\ coli$.

A vector containing the above-mentioned appropriate DNA sequence and an appropriate promoter or control sequence can be used to transform an appropriate host cell to enable it express proteins.

The host cells can be prokaryotic cells (such as $E.\ coli$), or lower eukaryotic cells, or higher eukaryotic cells such as yeast cells, plant cells, or mammal cells (including human and non-human mammal cells). Representative examples include: *E. coli*, wheat germ cells, insect cells, SF9 cells, Hela cells, HEK293 cells, CHO cells, yeast cells, etc. In a preferred embodiment of the present invention, yeast cells (such as *Pichia pastoris, Kluyveromyces* or a combination thereof; preferably, the yeast cells include: *Kluyveromyces*, more preferably *Kluyveromyces marxianus* and/or *Kluyveromyces lactis*) are selected as host cells.

When the polynucleotide of the present invention is expressed in higher eukaryotic cells, transcription will be enhanced if an enhancer sequence is inserted into the vector. The enhancer is a cis-acting element of DNA, usually of about 10 to 300 base pairs, acting on promoters to enhance gene transcription. Examples include SV40 enhancer of 100 to 270 base pairs on the late side of replication origin, polyoma enhancer on the late side of replication origin, adenovirus enhancer, etc.

Those of ordinary skill in the art know how to select appropriate vectors, promoters, enhancers and host cells.

Transformation of host cells by using recombinant DNA can be performed by using conventional techniques well known to those skilled in the art. When the host is a prokaryotic organism such as *E. coli*, competent cells that can absorb DNA can be harvested after the exponential growth phase and be treated by $CaCl_2$ method, where the steps used are well known in the art. Another method is using $MgCl_2$. If necessary, transformation can also be performed by electroporation. When the host is a eukaryote, the following DNA transfection methods can be selected: calcium phosphate coprecipitation method and conventional mechanical methods such as microinjection, electroporation, liposomal packaging, etc.

The obtained transformants can be cultured by conventional methods to express the polypeptide encoded by the gene of the present invention. According to the host cell used, the medium used in the culture can be selected from various conventional media. The culture is carried out under conditions suitable for the growth of the host cell. After the host cell has grown to an appropriate cell density, the selected promoters are induced by appropriate methods (such as temperature switching or chemical induction) and the cells are cultured for another period of time.

The recombinant polypeptide mentioned in the above method can be expressed in the inside of the cell or on the cell membrane, or be secreted to the outside of the cell. If necessary, the recombinant protein can be separated and purified via various separation methods by virtue of its physical, chemical and other characteristics. These methods are well known to those skilled in the art. Examples of these methods include, but are not limited to: conventional renaturation treatment, treatment with protein-precipitating agent (salting-out method), centrifugation, osmotic lysis of bacteria, ultra-treatment, ultracentrifugation, molecular sieve chromatography (gel filtration), adsorption chromatography, ion exchange chromatography, high performance liquid chromatography (HPLC) and other various liquid chromatography techniques and combinations of these methods.

The main advantages of the present invention include as follows:

(1) The present invention determines the type of intracellular protein that can bind to Ni medium via mass spectrometry identification of the components in cells that bind to Ni medium;

(2) For the first time, the present invention provides a series of histidine sites in ADH family proteins that may bind to Ni medium by systematically analyzing ADH family proteins in the cell genome.

(3) For the first time, the present invention obtains several strains that can significantly reduce the binding ability of ADH1 to Ni medium through gene knockout of ADH1 and site-directed mutation of a series of histidine sites in ADH1 that may bind to Ni medium.

(4) By analyzing the transcription and translation activity of cell-free system of multiple cell strains mentioned above, it is found that the site-directed mutation of ADH1 has less effect on the transcription and translation activity of cell-free system than the gene knockout, and for the first time, a cell strain, which does not affect the transcription and translation activity of cell-free system as well as significantly reduces the binding ability of ADH1 to Ni medium, is obtained.

(5) The present invention takes *Kluyveromyces lactis* (*K. lactis*) as an example, but the same design, analysis, and experimental methods are also applicable to other cells including prokaryotic cells, eukaryotic cells, yeast cells, human source cells, Hela cells, CHO cells, HEK293 cells, *Saccharomyces cerevisiae*, etc.

(6) For the first time, it is found, in the present invention, that the mutation of the core amino acids of ADH family proteins can significantly (i) improve the expression purity, efficiency, and/or yield of the exogenous protein in an in-vitro cell-free synthesis system; and/or (ii) reduce the binding ability of the mutant protein to Ni medium.

The present invention will be further illustrated below in combination with specific examples (or embodiments). It should be understood that these examples (or embodiments) are provided solely for the purpose of illustration and should not be regarded as limitations to the scope of the present invention. With respect to the experimental methods without specifically described conditions in the following examples (or embodiments), one person can generally follow conventional conditions, such as conditions described in Sambrook et. al, Molecular Cloning: A Laboratory Manual (New York: Cold Spring Harbor Laboratory Press, 1989), or follow conditions recommended by the manufacturer. Unless otherwise stated, percentage and portions refer to percentage by weight and portions by weight.

Unless otherwise stated, materials and reagents used in the examples of the present invention are all commercially available products.

The present invention takes *Kluyveromyces lactis* (*K. lactis*) as an example, but the same design, analysis and experimental methods are also applicable to other cells including prokaryotic cells, eukaryotic cells, yeast cells, human source cells, Hela cells, CHO cells, HEK293 cells, *Saccharomyces cerevisiae* and other cells General Method The present invention provides a design and method as follows: Ni-binding proteins are identified through Ni purification and mass spectrometry analysis, and then, on this basis, ADH family proteins in the genome are subjected to point mutations to reduce their binding ability to Ni medium, thereby improving the efficiency, yield and purity of proteins purified by Ni. The following steps are included:

(1) identification and analysis of ADH family proteins by the following method:
A. polyacrylamide gel electrophoresis analysis of protein purified by Ni;
B. mass spectrometry analysis of non-specific bands (35-50 kDa); and C. peptide comparison of mass spectrometry analysis results to identify the main non-specific band which was identified as ADH protein;

(2) analysis of potential binding sites of *K. lactis* ADH family proteins to Ni medium by the following method:

A. sequence alignment of ADH1 protein in *K. lactis* and ADH1 protein in *Saccharomyces cerevisiae*;

B. using ScADH as a template for homology modeling, and finding out the His-rich region sites in KlADH, such as H47, H51 and H124 in ADH1; H45, H49 and H122 in ADH2; H71, H75 and H148 and ADH3; H72, H76 and H149 in ADH4; and C. performing an engineerability analysis on His sites in this region, such as whether the engineering affects the catalytic activity of ADH, and finally selecting alternative amino acids, such as a site-directed mutation of ADH1 selected from the following group: H124K, H124R, H47K, H47R, H47N, H47Q, H51K, H51R, H124KH47K, H124KH47R, H124KH47N, H124KH47Q and combinations thereof; a site-directed mutation of ADH2 selected from the following group: H122K, H122R, H45K, H45R, H45N, H45Q, H49K, H49R, H122KH45K, H122KH45R, H122KH45N, H122KH45Q and combinations thereof; a site-directed mutation of ADH3 selected from the following group: H148K, H148R, H71K, H71R, H71N, H71Q, H75K, H75R, H148KH71K, H148KH71R, H148KH71N, H148KH71Q and combinations thereof; a site-directed mutation of ADH4 selected from the following group: H149K, H149R, H72K, H72R, H72N, H72Q, H76K, H76R, H149KH72K, H149KH72R, H149KH72N, H149KH72Q and combinations thereof;

(3) construction of Cas9-gRNA cloning vector, and the construction method is as follows:

A. for the sequence of a specific gene, respectively designing a gRNA sequence that guides the splicing of the gene; and B. recombining the above gRNA sequence into a vector containing Cas9 to obtain a first vector in which the gRNA and Cas9 are co-expressed;

(4) construction of a donor DNA which is used for knock-out of the specific gene by the following method:

A. downloading the nucleotide sequence of the specific gene from the gene database, and constructing a second vector by using sequences located at 800 bp upstream and downstream of the gene, respectively; and B. amplifying the second vector with primers M13F and M13R, and the obtained PCR product is concentrated by alcohol precipitation to obtain the donor DNA;

(5) construction of a donor DNA with a specific point mutation of histidine residue by the following method:

A. downloading the nucleotide sequence of the specific gene from the gene database, and constructing a second vector by using the target gene and sequences located at 800 bp upstream and downstream of the target gene, respectively, making point mutations to parts of amino acid residues, and making synonymous mutations to gRNA; and B. amplifying the second vector with primers M13F and M13R, and the obtained PCR product is concentrated by alcohol precipitation to obtain the donor DNA;

(6) obtaining a cell strain with knockout or point mutation of the specific gene by the following method:

A. transforming the first vector and the donor DNA simultaneously into competent cells; and B. screening out monoclonal cells for enlargement culture, extracting the genome, designing primers to amplify the ADH genes and homologous arms, and the amplified PCR products are verified by sequencing;

(7) testing the binding ability of the strain, which has been subjected to gene knockout or point mutant, to Ni medium by the following method:

A. performing enlargement culture for the obtained strain having been subjected to gene knockout or point mutant, and performing cell lysis to obtain a cell lysate; and B. purifying the cell lysate through Ni medium, and analyzing the purified product via polyacrylamide gel electrophoresis;

(8) Cell-free in vitro protein synthesis system

A yeast cell lysate is prepared using the genetically engineered cell strain and added into an in vitro protein translation system. The reaction system is let stand at 20-30° C. for 2-12 hours, the absorbance value by using a multifunctional microplate reader (Perkin Elmer) is read, and the activity of the enhanced green fluorescent protein (eGFP) is detected.

Example 1 Analysis and Specific Engineering of ADH Family Genes in *K. lactis*

1.1 Analysis of ADH Family Genes in *K. lactis*

When a His-tag-labeled target protein, which was expressed in *K. lactis*, was affinity-purified with Ni medium, there was an obvious non-specific band at 35-50 kDa. Mass spectrometry results showed that the non-specific protein was mainly derived from ADH family proteins in *K. lactis* (Table 1). ADH is a NAD (P)-dependent oxidoreductase, exists in almost all organisms and catalyzes the reversible oxidation of primary and secondary alcohols to aldehydes and ketones, respectively. The ADH family proteins in *K. lactis* include four types of KlADH1, KlADH2, KlADH3 and KlADH4, and all of them are encoded by chromosomal DNA. Among them, ADH1 gene sequence (SEQ ID NO.32) with a KEGG database code of KlLAOF21010g is located at chromosome F; ADH2 gene sequence (SEQ ID NO.29) with a KEGG database code of KlLAOF18260g is located at chromosome F; ADH3 gene sequence (SEQ ID NO. 30) with a KEGG database code of KlLAOB09064g is located at chromosome B; ADH4 gene sequence (SEQ ID NO. 31) with a KEGG database code of KlLAOF13530g is located at chromosome F. Among them, ADH1 and ADH2 carry out their functions in the cytosol, while ADH3 and ADH4 carry out their functions in mitochondria, with relative molecular weights of 37.3 kDa, 37.1 kDa, 39.6 kDa and 40.2 kDa, respectively. The amino acid sequences of these four ADH proteins are highly homologous and their tertiary structures are also quite similar.

TABLE 1

Peptide fragments obtained by identifying non-specific proteins purified by Ni medium by mass spectrometry and *K. lactis* endogenous proteins indicated by the peptide fragments

| Peptide Sequence | Target Protein in *K. lactis* |
| --- | --- |
| EAIDFFSR | ADH1 |
| SNGTVVLVGLPR | ADH1&ADH2 |
| SISIVGSYVGNR | ADH1 |
| DLGGEYFIDFTK | ADH1 |

TABLE 1-continued

Peptide fragments obtained by identifying non-specific proteins purified by Ni medium by mass spectrometry and *K. lactis* endogenous proteins indicated by the peptide fragments

| Peptide Sequence | Target Protein in *K. lactis* |
|---|---|
| GVIFYENGGELQYK | ADH1&ADH2 |
| LPLVGGHEGAGVVVAMGENVK | ADH1&ADH2&ADH3 (mitochondria) |
| APIHVVGLSELPSIYEK | ADH1 |
| GGAHGVINVSVSEFAIEQSTNYVR | ADH1&ADH2 |
| AGDWVAISGAAGGLGSLAVQYAK | ADH1&ADH3 (mitochondria) |
| GVIFYENGGKIEYK | ADH3&ADH4 (mitochondria) |
| SDVFNQVVK | ADH1 |
| NIPEEVIEATK | ADH1 |
| ANEILINVK | ADH4 |

Because the crystal structure of ADH family proteins in *K. lactis* are still unknown, we used homology modeling to predict their spatial tertiary structures. The primary sequence alignment between KlADH1 in *K. lactis* and ScADH1 in *Saccharomyces cerevisiae* (PDB No. 4W6Z) shows that the two are tetramers with 84.9% sequence homology. Homology modeling using ScADH1 as template showed that each monomer of KlADH1 in *K. lactis* contains a total of six His, located at positions 47, 51, 69, 124, 243 and 321, respectively. The whole tetramer contains a total of four His-rich regions. Except that the 5th His of each monomer is relatively independent, the other five His of each monomer are close in space, wherein, the closest in space (and also in sequence) among the other five His are the three to four His in front of each monomer.

Since the four ADHs in *K. lactis* are highly homologous and five His are highly conserved, the spatial structures of KlADH2, KlADH3 and KlADH4 are also similar to the spatial structure of KlADH1, that is, the first four His of each ADH protein may cluster in space, thereby generating affinity to Ni medium.

1.2 Specific Engineering of ADH Family Genes in *K. lactis*

Figure 6:
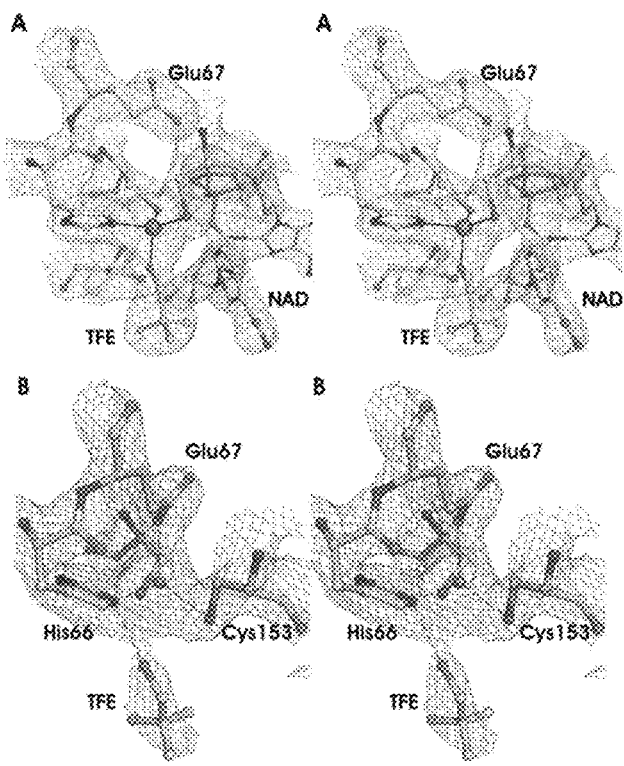
FIG. 6 shows a diagram of the amino acid structure around H66 in ScADH1. H66 is involved in chelating the catalytic $Zn^{2+}$ in two conformations of ADH1. Figure A shows a closed conformation with NAD being bound, and Figure B shows an open conformation with no NAD being bound.
Figure 7:
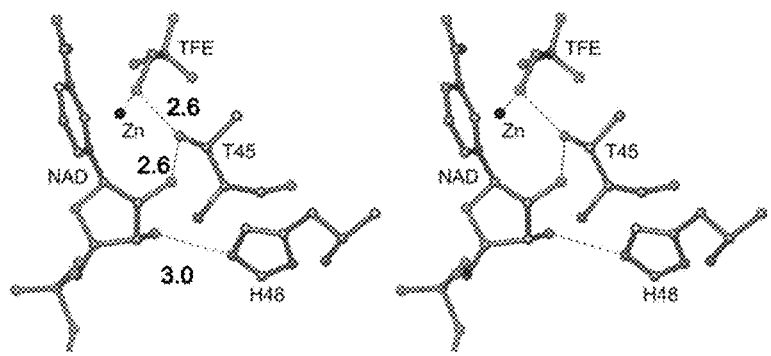
FIG. 7 shows a diagram of the amino acid structure around H48 in ScADH1. H48 is involved in the formation of a ternary complex and affects the proton transfer process of the substrate.
Figure 8:
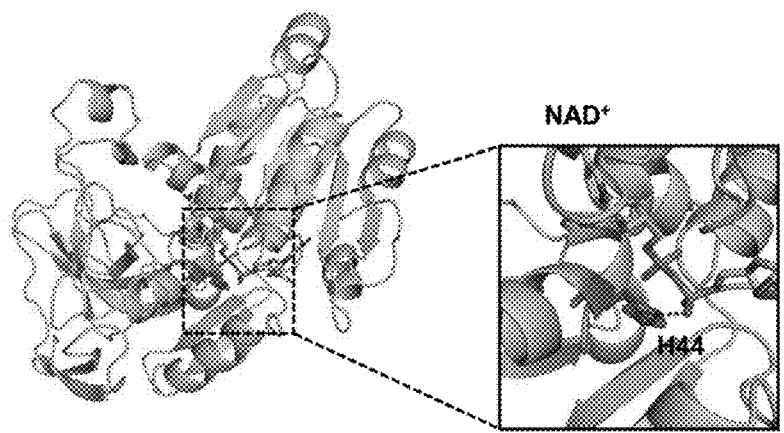
FIG. 8 shows a diagram of the amino acid structure around H44 in ScADH1. ND1 on the imidazole ring of H44 may be involved in the binding of NAD$^+$/NADH.
Figure 9:
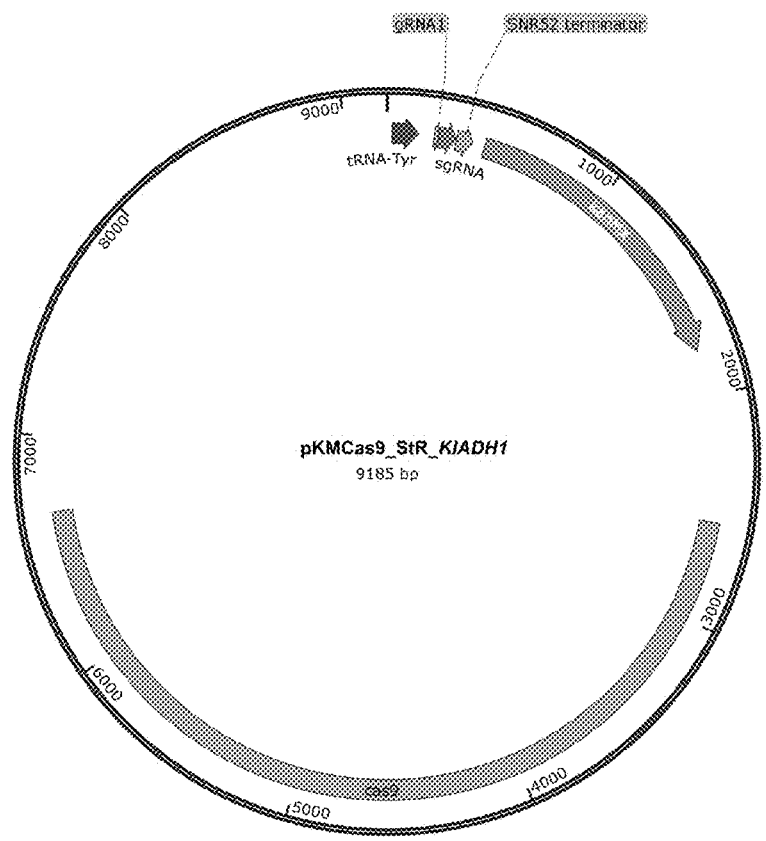
FIG. 9 shows a plasmid profile of pKMCas9_StR_KlADH1. The plasmid has a tRNA-Tyr promoter, a SNR52 terminator and a kana selection marker.
Figure 10:
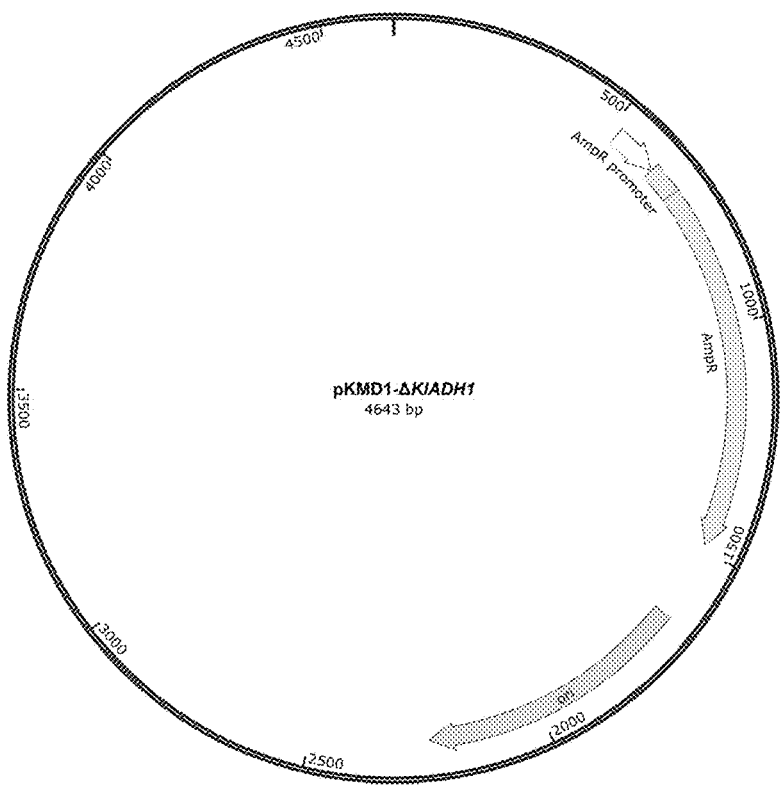
FIG. 10 shows a plasmid profile of pKMD1-ΔKlADH1. Homologous arm 1 and homologous arm 2 are the gene sequences at about 800 bp upstream and downstream of the ORF of the KlADH1 gene, respectively, and the plasmid has an Amp selection marker.
Figure 11:
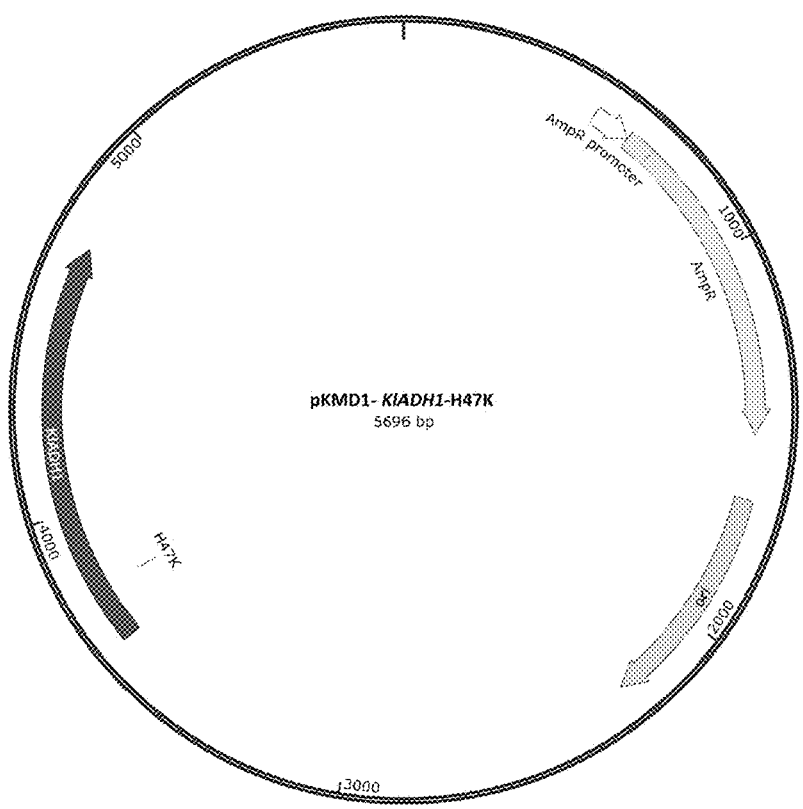
FIG. 11 shows a plasmid profile of pKMD1-KlADH1-H47K. Homologous arm 1 and homologous arm 2 are the gene sequences at about 800 bp upstream and downstream of the ORF of the KlADH1 gene, respectively, and the plasmid has an Amp selection marker.
Figure 12:
FIG. 12 shows a plasmid profile of pKMD1-KlADH1-H47N. Homologous arm 1 and homologous arm 2 are the gene sequences at about 800 bp upstream and downstream of the ORF of the KlADH1 gene, respectively, and the plasmid has an Amp selection marker.
Figure 13:
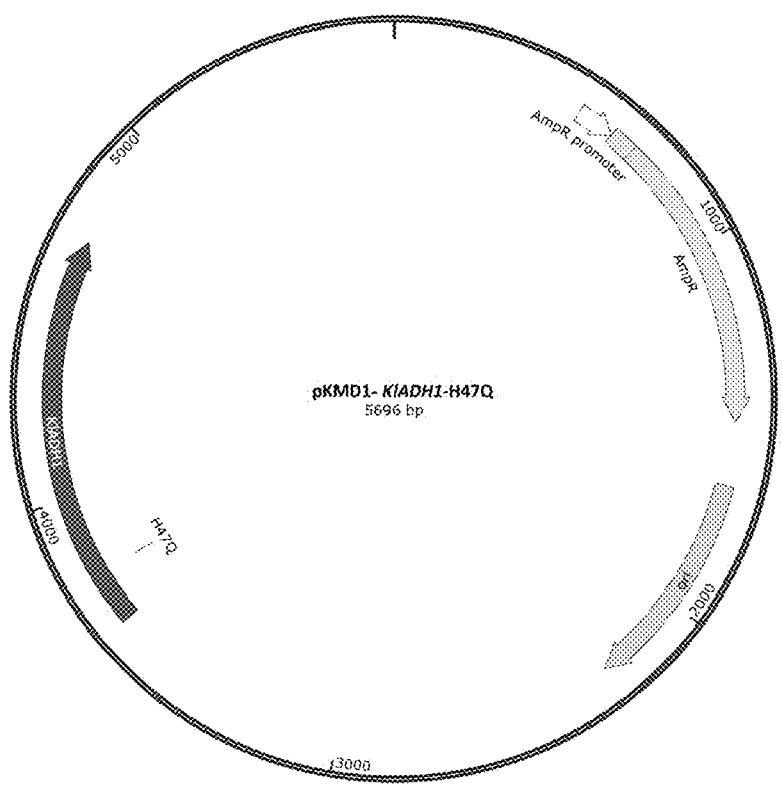
FIG. 13 shows a plasmid profile of pKMD1-KlADH1-H47Q. Homologous arm 1 and homologous arm 2 are the gene sequences at about 800 bp upstream and downstream of the ORF of the KlADH1 gene, respectively, and the plasmid has an Amp selection marker.
Figure 14:
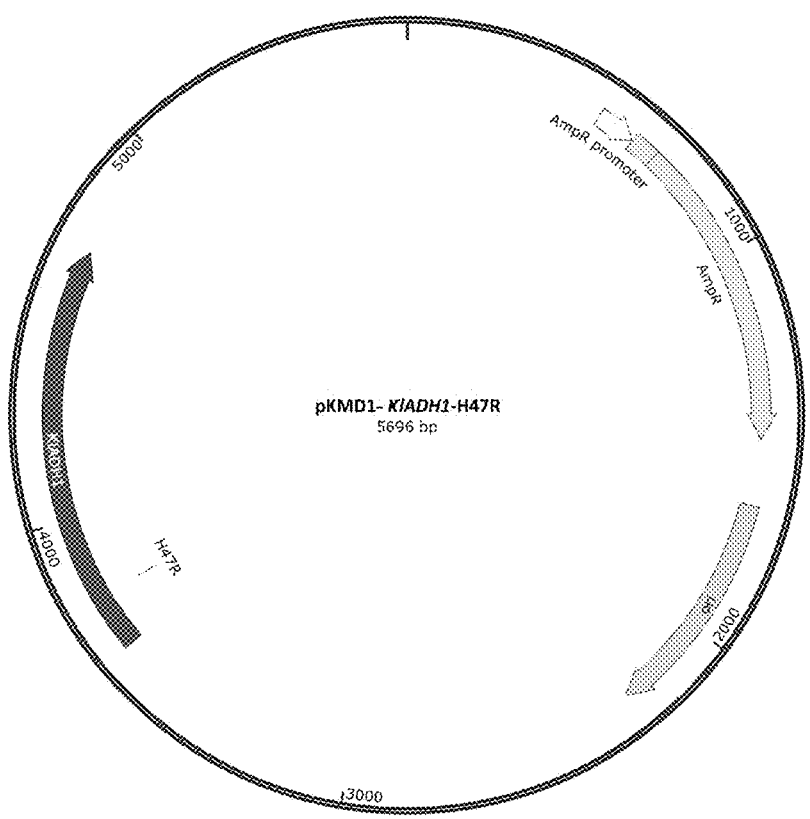
FIG. 14 shows a plasmid profile of pKMD1-KlADH1-H47R. Homologous arm 1 and homologous arm 2 are the gene sequences at about 800 bp upstream and downstream of the ORF of the KlADH1 gene, respectively, and the plasmid has an Amp selection marker.
Figure 15:
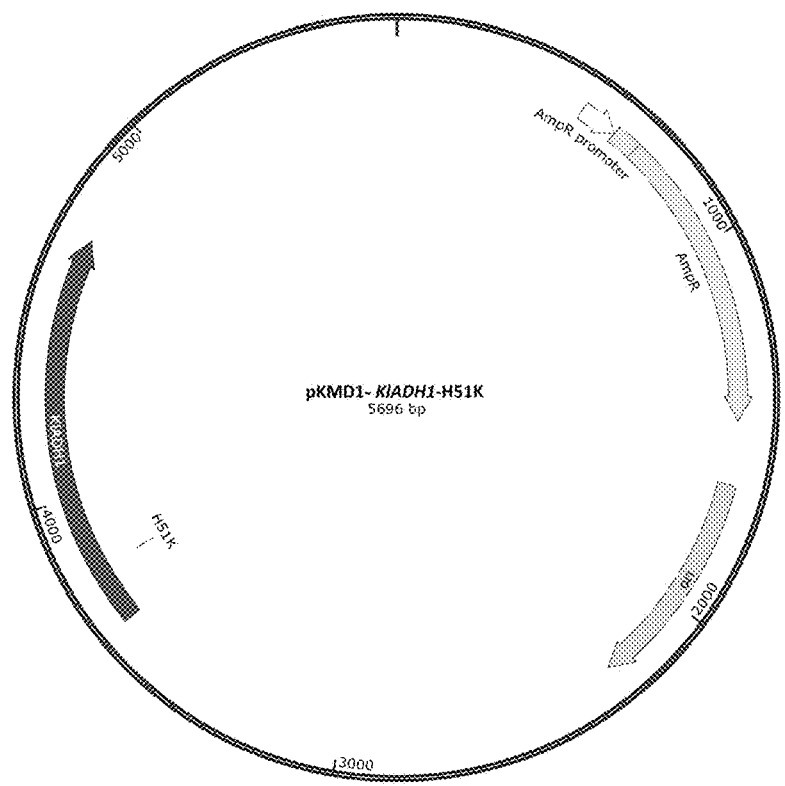
FIG. 15 shows a plasmid profile of pKMD1-KlADH1-H51K. Homologous arm 1 and homologous arm 2 are the gene sequences at about 800 bp upstream and downstream of the ORF of the KlADH1 gene, respectively, and the plasmid has an Amp selection marker.
Figure 16:
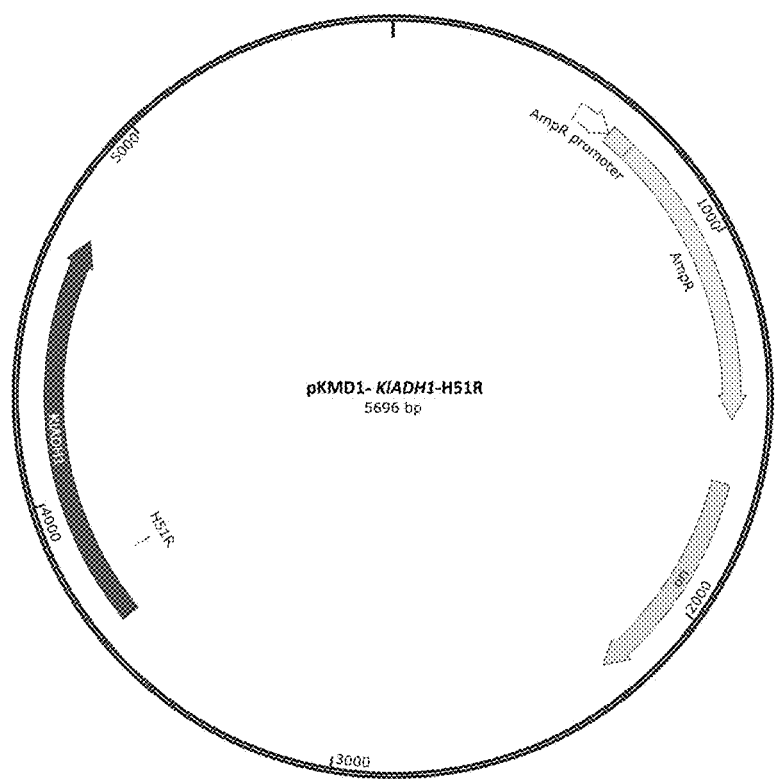
FIG. 16 shows a plasmid profile of pKMD1-KlADH1-H51R. Homologous arm 1 and homologous arm 2 are the gene sequences at about 800 bp upstream and downstream of the ORF of the KlADH1 gene, respectively, and the plasmid has an Amp selection marker.
Figure 17:
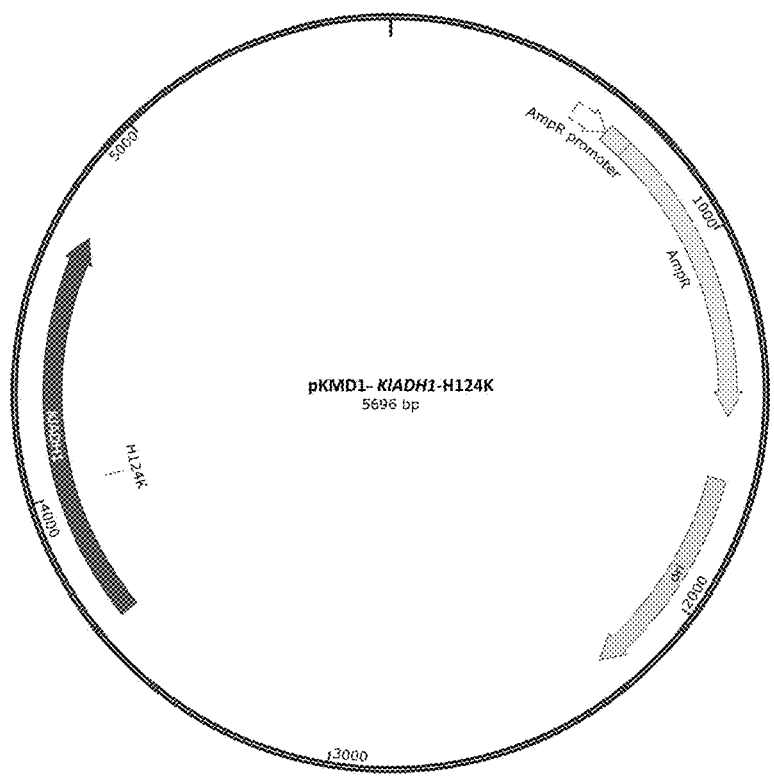
FIG. 17 shows a plasmid profile of pKMD1-KlADH1-H124K. Homologous arm 1 and homologous arm 2 are the gene sequences at about 800 bp upstream and downstream of the ORF of the KlADH1 gene, respectively, and the plasmid has an Amp selection marker.
Figure 18:
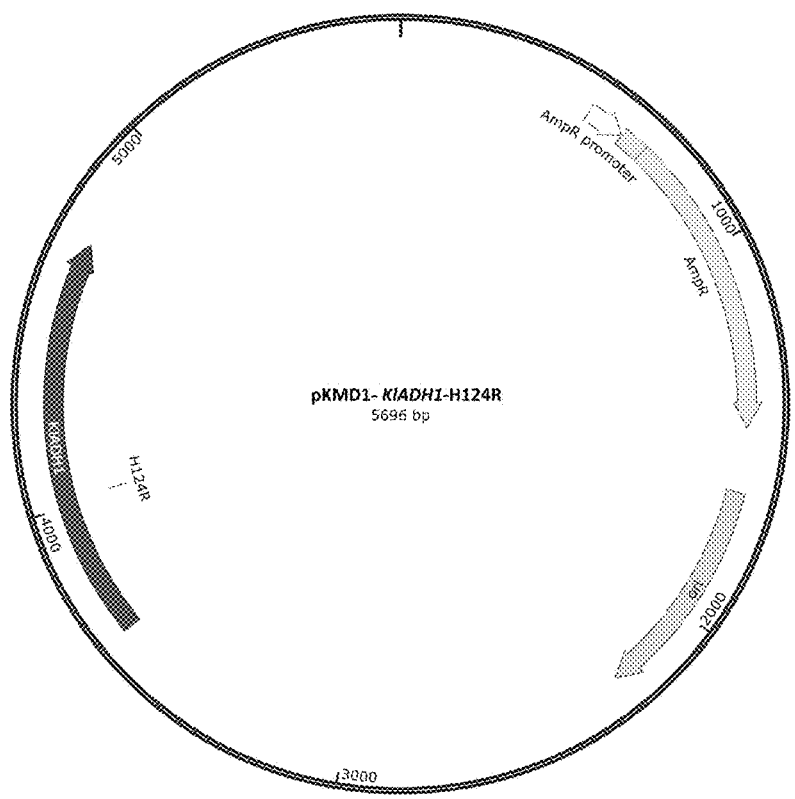
FIG. 18 shows a plasmid profile of pKMD1-KlADH1-H124R. Homologous arm 1 and homologous arm 2 are the gene sequences at about 800 bp upstream and downstream of the ORF of the KlADH1 gene, respectively, and the plasmid has an Amp selection marker.
Figure 19:
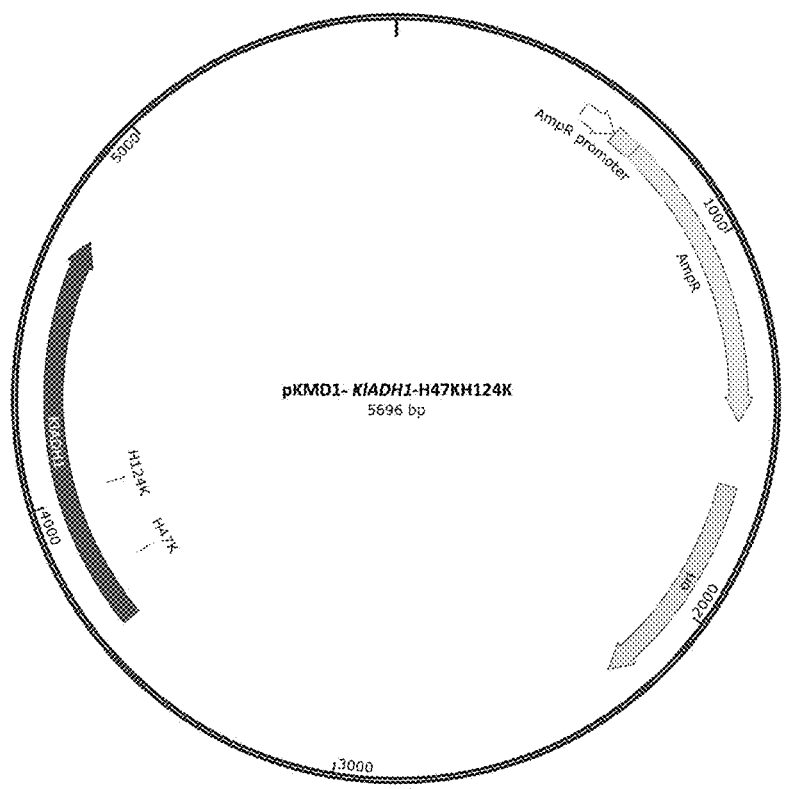
FIG. 19 shows a plasmid profile of pKMD1-KlADH1-H47KH124K. Homologous arm 1 and homologous arm 2 are the gene sequences at about 800 bp upstream and downstream of the ORF of the KlADH1 gene, respectively, and the plasmid has an Amp selection marker.
Figure 20:
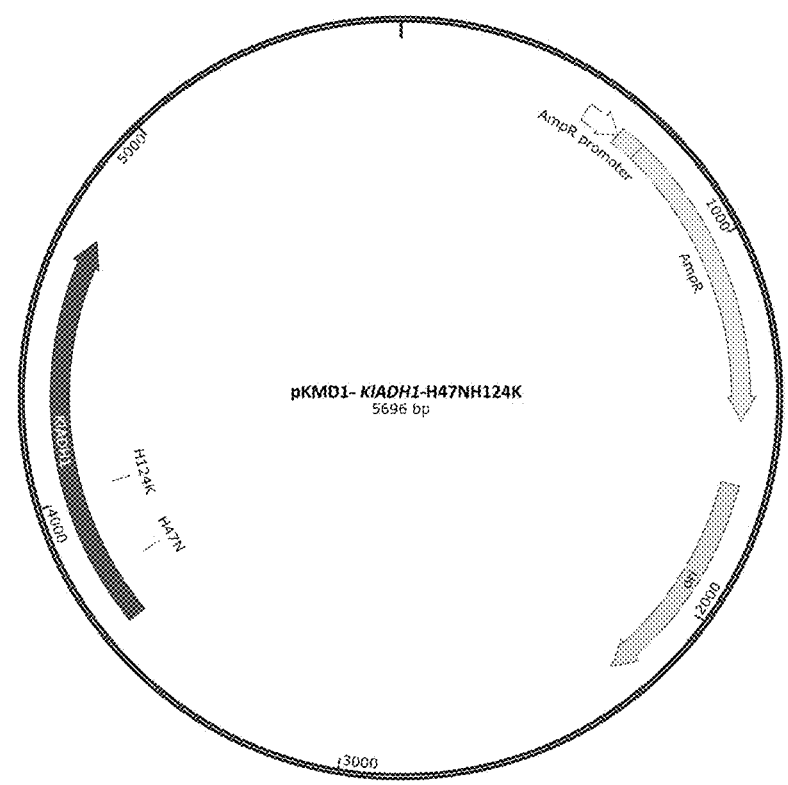
FIG. 20 shows a plasmid profile of pKMD1-KlADH1-H47NH124K. Homologous arm 1 and homologous arm 2 are the gene sequences at about 800 bp upstream and downstream of the ORF of the KlADH1 gene, respectively, and the plasmid has an Amp selection marker.
Figure 21:
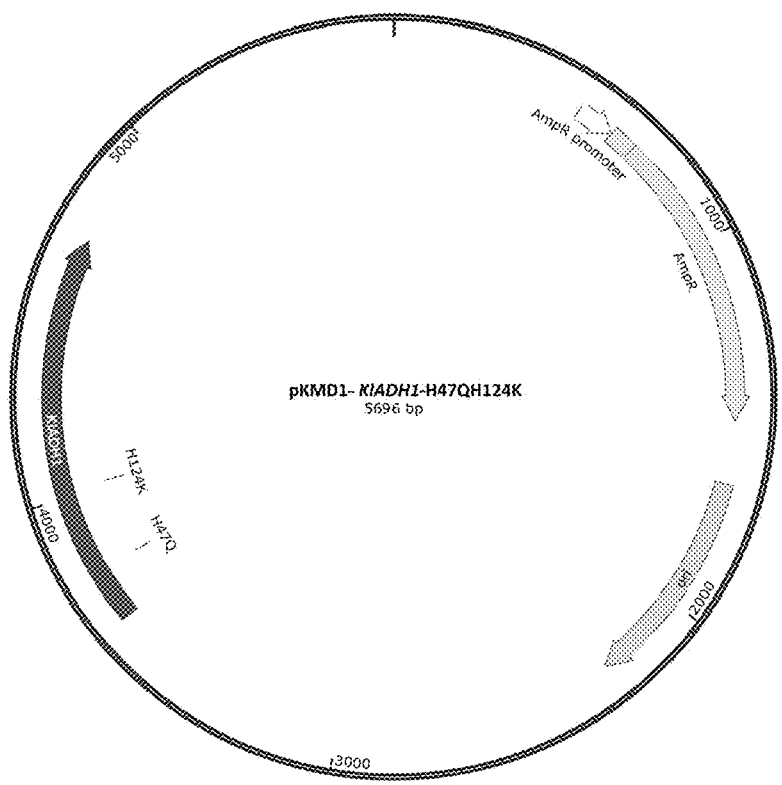
FIG. 21 shows a plasmid profile of pKMD1-KlADH1-H47QH124K. Homologous arm 1 and homologous arm 2 are the gene sequences at about 800 bp upstream and downstream of the ORF of the KlADH1 gene, respectively, and the plasmid has an Amp selection marker.
Figure 22:
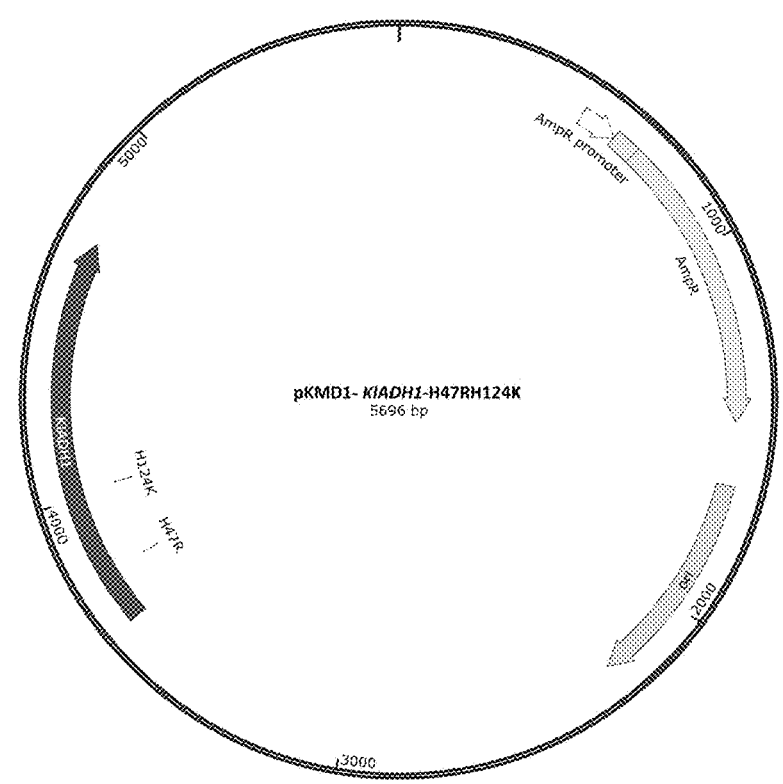
FIG. 22 shows a plasmid profile of pKMD1-KlADH1-H47RH124K. Homologous arm 1 and homologous arm 2 are the gene sequences at about 800 bp upstream and downstream of the ORF of the KlADH1 gene, respectively, and the plasmid has an Amp selection marker.
Figure 23:
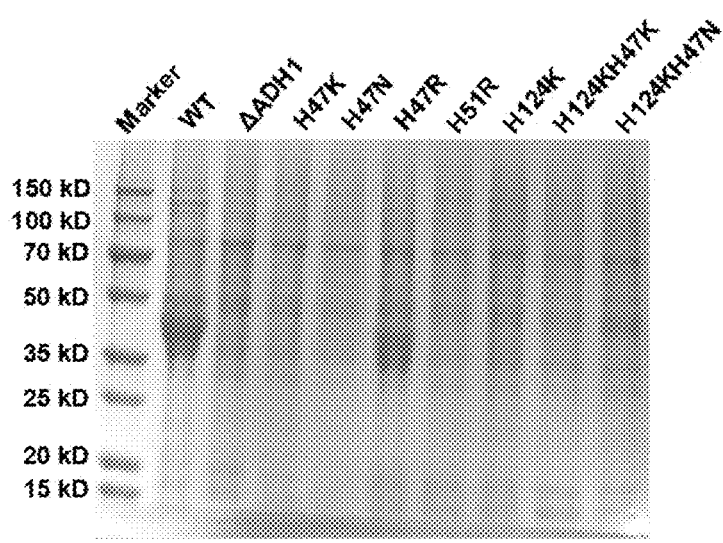
FIG. 23 shows a polyacrylamide gel analysis purified by Ni-NTA. As shown in the figure, knockout of KlADH1 gene and His mutation at different positions can significantly reduce the affinity of KlADH1 to Ni-NTA. The size of the target band is about 37 KD, and the bands from left to right refer to marker, *K. lactis* wild-type cell strain WT, cell strain ΔADH1 with KlADH1 being knocked-out, KlADH1 single mutant cell strain H47K, H47N, H47R, H51K, H124K, H124KH47K and H124KH47N, respectively.

In view of the need to minimize as far as possible the effect on ADH activity when eliminating the affinity of ADH to Ni medium, the analysis of function of His in KlADH1 becomes the key. Through a large number of comparisons and screening, it was found that among the six His in KlADH1 protein homologous to those in ScADH1 protein, H44, H48, H66 and H121, because of their homology with the four His clustered in KlADH1, become the key point of the analysis of the present invention. Because H66 is involved in chelating catalytic $Zn^{2+}$ in both two conformations of ScADH1, as shown in FIG. 6, it may play a significant impact on the catalytic activity of ADH, so as that it is not taken as an engineering target of the present invention. Although H48 does not bind to coenzymes, it participates in the formation of the ternary complex and affects the proton transfer process of the substrate, as shown in FIG. 7. The research of the present invention found that ND1 on the H44 imidazole ring may form a hydrogen bond with O2A of $NAD^+$, thereby participating in the binding of $NAD^+$/NADH. H44R can reduce the dissociation constant of $NAD^+$ and NADH by 2-4 times, and decrease the conversion number by 4-6 times. In addition, the side chain of H121 can form a hydrogen bond with T130.

Based on the above research, in the present invention, three His sites (H44, H48 and H121, respectively) that have little effect on the function of ADH1 in ScADH1 were mutated to amino acids with similar function, and finally the point mutation scheme designed for KlADH1 was H124K, H124R, H47K, H47R, H47N, H47Q, H51K, H51R, H124KH47K, H124KH47R, H124KH47N and H124KH47Q.

Because ADH2, ADH3 and ADH4 in *K. lactis* are highly homologous with ADH1 (FIG. 2), that is, H45, H49 and H122 in ADH2, H71, H75 and H148 in ADH3, and H72, H76 and H149 in ADH4 correspond to H47, H51 and H124 in ADH1, respectively.

Therefore, in the present invention, ADH1 is taken as an example to reduce the binding of ADH1 to Ni medium, specifically as indicated in the knockout of ADH1 gene and the site-directed mutation of H47, H51 and H124. ADH2, ADH3 and ADH4 can also be engineered at corresponding sites by using methods similar to those for ADH1.

Example 2 Targeted Knockout of ADH1 Gene Via CRISPR/Cas9

2.1 Determination of KlADH1 CRISPR gRNA Sequence

According to the point mutation designed in KlADH1, PAM sequence (NGG) was selected and corresponding gRNA sequence was determined. The principle for selecting gRNA in this example is as follows: the GC content should be moderate (40%-60%), and the existence of a poly T structure should be avoided. In this embodiment, the KlADH1 gRNA1 sequence is TGGGTGAAAACGTCAAGGGC (SEQ ID No.: 33).

Methods for plasmid construction and transformation are as follows: using primers pKMCas9-KlADH1-gRNA1-PF: TGGGTGAAAACGTCAAGGGCGTTT-TAGAGCTAGAAATAGC (SEQ ID No.: 34) and pCas9-KlADH1-gRNA1-PR: GCCCTTGACGTTTTCACC-CAAAAGTCCCATTCGCCACCCG (SEQ ID No.: 35), and using pCAS plasmid as template, PCR amplification was performed. 17 µL of amplified product was taken and added with 1 µL of Dpn I and 2 µL of 10× digestion buffer; after mixing, the mixture was incubated at 37° C. for 3 hours. 10 µL of DpnI-treated mixture was added into 50 µL of DH5a competent cells. The mixture was placed on ice for 30 minutes, heat-shocked at 42° C. for 45 seconds, followed by the addition of 1 mL of LB liquid medium, and then cultured with shaking at 37° C. for 1 hour. Thereafter, the mixture was coated onto a Kan-resistant LB solid medium, and then an inverted culture was carried out at 37° C. until monoclonal colonies grew out. Two monoclonal colonies were picked out and then cultured with shaking in an LB liquid medium. After being detected PCR-positive and confirmed by sequencing, the plasmid was extracted and stored, and named pKMCas9 StR_KlADH1.

2.2 Construction and Amplification of Donor DNA Plasmid

In this example, to facilitate the storage and amplification of linear donor DNA, the donor DNA was firstly inserted into a pKMD1 plasmid, and then amplified by PCR to obtain linear donor DNA sequences.

A PCR amplification process was carried out by using primers of pKMD1-PF: ATCGTCGACCTGCAGGCATG (SEQ ID No.: 36) and pKMD1-PR: ATCTCTAGAG-GATCCCCGGG (SEQ ID No.: 37) with a pKMD1 plasmid as template. 17 µL amplified product was taken and then added with 1 µL of Dpn I and 2 µL of 10× digestion buffer; after mixing, the mixture was incubated at 37° C. for 3 hours; and a linear fragment pKMD1-T of plasmid skeleton was obtained.

2.2.1 Construction of Donor Plasmid pKMD1-ΔKlADH1

One PCR amplification process was carried out by using primers of KlADH1-HR1-PF: TCGAGCTCGGTACCCGGGGATCCTCT AGAGAT-CATGGACAATACGTTACCGAGATGAGG (SEQ ID No.: 38) and KlADH1-HR1-PR: GAAGAGATTTCATT-TATCTTTTTTTAG TATAGAGTTTGTGTGTT-TAAAGCTTG (SEQ ID No.: 39) with a *Kluyveromyces lactis* genomic DNA as template, and the product was named ΔKlADH1-F1; another PCR amplification process was carried out by using primers of KlADH1-HR2-PF: CAAACTCTATAC TAAAAAAAGATAAAT-GAAATCTCTTCCGCATTCAAGTCATGA C (SEQ ID No.: 40) and KlADH1-HR2-PR: TGCCAAGCTTGCAT GCCTGCAGGTCGACGATCTTATACTGGGTAGATTT-CAAACGGGA C (SEQ ID No.: 41) with a *Kluyveromyces lactis* genomic DNA as template, and the product was named ΔKlADH1-F2.

1 μL of each of the amplified products ΔKlADH1-F1, ΔKlADH1-F2 and pKMD1-T were mixed, and added with 5 μL of Cloning Mix (a kit named Transgene pEASY-Uni Seamless Cloning and Assembly Kit, from TransGen Biotech Company, the same below) and 2 μL of water. After mixing, the mixture was bathed in 50° C. water for 1 hour. After the water bath, the mixture was placed on ice for 2 minutes. 10 μL of the reaction mixture was all added into 50 μL of Trans-T1 competent cells (from TransGen Biotech Company, the same below). The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-ΔKlADH1.

2.3 Electrotransformation of *K. lactis*

The competent cells were taken out from a −80° C. refrigerator, melted on ice and added with 400 ng gRNA&Cas9 plasmids (or gRNA/cas9 fragments) and 1000 ng Donor DNA fragments. After mixing, the mixture was transferred into an electroporation cuvette and was bathed in ice for 2 minutes. The electroporation cuvette was put into electroporator for electric shock (with parameters of 1.5 kV, 200 (2 and 25 μF). After completion of the electric shock, the mixture was immediately added with 700 μL of YPD, and then incubated on a shaker at a speed of 200 rpm at 30° C. for 1-3 hours. 2-200 μL of the mixture was taken and inoculated on YPD (with G418 resistance) plate and cultured at 30° C. for 2-3 days until monoclonal colonies appeared.

2.4 Positive Identification 12 to 24 monoclonal colonies were picked out from the plate with transformed cells. Samples were detected by PCR using identification primers of ADH1-CF: GTGATG-GAACACGGGAATAG (SEQ ID No.: 42) and ADH1-CR: CACATATACCTTGGCAGTAG (SEQ ID No.: 43) with the cells as template. Strains that were tested positive by PCR and identified by sequencing were determined as positive strains and named ΔADH1.

Example 3 Site-Directed Mutation of ADH1 H47 Site by CRISPR/Cas9

3.1 Determination of KlADH1 CRISPR gRNA Sequence

According to the point mutation designed in KlADH1, PAM sequence (NGG) was selected and corresponding gRNA sequence was determined. The principle for selecting gRNA in this example is as follows: the gRNA should be close to the designed mutation site; the GC content should be moderate (40%-60%), and the existence of a poly T structure should be avoided. In this embodiment, the KlADH1 gRNA1 sequence is TGGGTGAAAACGT-CAAGGGC (SEQ ID No.: 33).

Methods for plasmid construction and transformation are as follows: using primers pCas9-KlADH1-gRNA1-PF: TGGGTGAAAACGTCAAGGGCGTTT-TAGAGCTAGAAATAGC (SEQ ID No.: 34) and pCas9-KlADH1-gRNA1-PR: GCCCTTGACGTTTTCACC-CAAAAGTCCCATTCGCCACCCG (SEQ ID No.: 35), and using pCAS plasmid as template, PCR amplification was performed. 17 μL of amplified product was taken and added with 1 μL of Dpn I and 2 μL of 10× digestion buffer. After mixing, the mixture was incubated at 37° C. for 3 hours. 10 μL of DpnI-treated mixture was added into 50 μL of DH5a competent cells. The mixture was placed on ice for 30 minutes, heat-shocked at 42° C. for 45 seconds, followed by the addition of 1 mL of LB liquid medium, and then cultured with shaking at 37° C. for 1 hour. Thereafter, the mixture was coated onto a Kan-resistant LB solid medium, and then an inverted culture was carried out at 37° C. until monoclonal colonies grew out. Two monoclonal colonies were picked out and then cultured with shaking in an LB liquid medium. After being detected PCR-positive and confirmed by sequencing, the plasmid was extracted and stored, and named pKMCas9 StR_KlADH1.

3.2 Construction and Amplification of Donor DNA Plasmid

In this example, to facilitate the storage and amplification of linear donor DNA, the donor DNA was firstly inserted into a pKMD1 plasmid, and then amplified by PCR to obtain linear donor DNA sequences.

A PCR amplification process was carried out by using primers of pKMD1-PF: ATCGTCGACCTGCAGGCATG (SEQ ID No.: 36) and pKMD1-PR: ATCTCTAGAG-GATCCCCGGG (SEQ ID No.: 37) with a pKMD1 plasmid as template. 17 μL amplified product was taken and then added with 1 μL of Dpn I and 2 μL of 10× digestion buffer; after mixing, the mixture was incubated at 37° C. for 3 hours; and a linear fragment pKMD1-T of plasmid skeleton was obtained.

3.2.1 Construction of Donor Plasmid pKMD1-KlADH1-H47K

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H47K-PR: AGCATGAAGGTCAGTTT-TACAGACACCGGAGTACTTGACG (SEQ ID No.: 44) with a *Kluyveromyces lactis* genomic DNA as template, and the product was named KlADH1-H47K-F1; another PCR amplification process was carried out by using primers of KlADH1-H47K-PF: GTAAAACTGACCTTCATGCTTG-GAAGGGTGACTGGCCTTTG (SEQ ID No.: 45) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H47K-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H47N-F3.

1 μL of each of the amplified products KlADH1-H47K-F1, KlADH1-H47K-F2, KlADH1-H47K-F3 and pKMD1-T were mixed, and added with 5 μL of Cloning Mix and 1 μL of water. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H47K.

3.2.2 Construction of Donor Plasmid pKMD1-KlADH1-H47N

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H47N-PR: AGCATGAAGGTCAGTAT-TACAGACACCGGAGTACTTGACG (SEQ ID No.: 48) with a *Kluyveromyces lactis* genomic DNA as template, and the product was named KlADH1-H47N-F1; another PCR amplification process was carried out by using primers of KlADH1-H47N-PF: GTAATACTGACCTTCATGCTTG-GAAGGGTGACTGGCCTTTG (SEQ ID No.: 49) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H47N-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H47N-F3.

1 μL of each of the amplified products KlADH1-H47N-F1, KlADH1-H47N-F2, KlADH1-H47N-F3 and pKMD1-T were mixed, and added with 5 μL of Cloning Mix and 1 μL of water. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H47N.

3.2.3 Construction of Donor Plasmid pKMD1-KlADH1-H47Q

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H47Q-PR: AGCAT-GAAGGTCAGTTTGACAGACACCG-GAGTACTTGACG (SEQ ID No.: 50) with a *Kluyveromyces lactis* genomic DNA as template, and the product was named KlADH1-H47Q-F1; another PCR amplification process was carried out by using primers of KlADH1-H47Q-PF: GTCAAACTGACCTTCATGCTTG-GAAGGGTGACTGGCCTTTG (SEQ ID No.: 51) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H47Q-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H47Q-F3.

1 μL of each of the amplified products KlADH1-H47Q-F1, KlADH1-H47Q-F2, KlADH1-H47Q-F3 and pKMD1-T were mixed, and added with 5 μL of Cloning Mix and 1 μL of water. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H47Q.

3.2.4 Construction of Donor Plasmid pKMD1-KlADH1-H47R

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H47R-PR: AGCATGAAGGTCAGTTC-TACAGACACCGGAGTACTTGACG (SEQ ID No.: 52) with a *Kluyveromyces lactis* genomic DNA as template, and the product was named KlADH1-H47R-F1; another PCR amplification process was carried out by using primers of KlADH1-H47R-PF: GTAGAACTGACCTTCATGCTTG-GAAGGGTGACTGGCCTTTG (SEQ ID No.: 53) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H47R-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-HR2-PR: TGCCAAGCTTG-CATGCCTGCAGGTCGACGATCTTATACTGGGTAGATTTCAAACGGGAC (SEQ ID No.: 41) with a *Kluyveromyces lactis* genomic DNA as template, and the product was named KlADH1-H47R-F3.

1 μL of each of the amplified products KlADH1-H47R-F1, KlADH1-H47R-F2, KlADH1-H47R-F3 and pKMD1-T were mixed, and added with 5 μL of Cloning Mix and 1 μL of water. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H47R.

3.3 Electrotransformation of *K. lactis* (the Same as Example 2.3)

3.4 Positive Identification 12 to 24 monoclonal colonies were picked out from a plate with transformed cells. Samples were detected by PCR using identification primers of ADH1-m-CF: TGG-GAGAGAATGTTAAAGGT (SEQ ID No.: 54) and ADH1-m-CR: TGACGGTCGTTAACTAAGAT (SEQ ID No.: 55) and by using the cells as template. Strains that were tested positive by PCR and identified by sequencing were determined as positive strains and named ADH1 H47K, ADH1 H47N, ADH1 H47Q and ADH1 H47R, respectively.

Example 4 Site-Directed Mutation of ADH1 H51 Site by CRISPR/Cas9

4.1 Determination of KlADH1 CRISPR gRNA Sequence

According to the point mutation designed in KlADH1, PAM sequence (NGG) was selected and corresponding gRNA sequence was determined. The principle for selecting gRNA in this example is as follows: the gRNA should be close to the designed mutation site; the GC content should be moderate (40%-60%), and the existence of a poly T structure should be avoided. In this embodiment, the KlADH1 gRNA1 sequence is TGGGTGAAAACGTCAAGGGC (SEQ ID No.: 33).

Methods for plasmid construction and transformations are as follows: using primers pCas9-KlADH1-gRNA1-PF: TGGGTGAAAACGTCAAGGGCGTTTTAGAGCTAGAAATAGC (SEQ ID No.: 34) and pCas9-KlADH1-gRNA1-PR: GCCCTTGACGTTTTCACCCAAAAGTCCCATTCGCCACCCG (SEQ ID No.: 35), and using pCAS plasmid as template, PCR amplification was performed. 17 μL of amplified product was taken and added with 1 μL of Dpn I and 2 μL of 10× digestion buffer. After mixing the mixture was incubated at 37° C. for 3 hours. 10 μL of DpnI-treated mixture was added into 50 μL of DH5a competent cells. The mixture was placed on ice for 30 minutes, heat-shocked at 42° C. for 45 seconds, followed by the addition of 1 mL of LB liquid medium, and then cultured with shaking at 37° C. for 1 hour. Thereafter, the mixture was coated onto a Kan-resistant LB solid medium, and then an inverted culture was carried out at 37° C. until monoclonal colonies grew out. Two monoclonal colonies were picked out and then cultured with shaking in an LB liquid medium. After being detected PCR-positive and confirmed by sequencing, the plasmid was extracted and stored, and named pKMCas9_StR_KlADH1.

4.2 Construction and Amplification of Donor DNA Plasmid

In this example, to facilitate the storage and amplification of linear donor DNA, the donor DNA was firstly inserted into a pKMD1 plasmid, and then amplified by PCR to obtain linear donor DNA sequences.

One PCR amplification process was carried out by using primers of pKMD1-PF: ATCGTCGACCTGCAGGCATG (SEQ ID No.: 36) and pKMD1-PR: ATCTCTAGAG-GATCCCCGGG (SEQ ID No.: 37) with a pKMD1 plasmid as template. 17 μL amplified product was taken and then added with 1 μL of Dpn I and 2 μL of 10× digestion buffer; after mixing, the mixture was incubated at 37° C. for 3 hours; and a linear fragment pKMD1-T of plasmid skeleton was obtained.

4.2.1 Construction of Donor Plasmid pKMD1-KlADH1-H51K

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H51K-PR: CCAAGCTT-TAAGGTCAGTATGACAGACACCGGAGTACTTGACG (SEQ ID No.: 56) with a *Kluyveromyces lactis* genomic DNA as template, and the product was named KlADH1-H51K-F1; another PCR amplification process was carried out by using primers of KlADH1-H51K-PF: GTCAT-ACTGACCTTAAAGCTTG-GAAGGGTGACTGGCCTTTG (SEQ ID No.: 57) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H51K-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-HR2-PR: TGCCAAGCTTG-CATGCCTGCAGGTCGACGATCTTATACTGGGTAGATTTCAAACGGGAC (SEQ ID No.: 41) with a *Kluyveromyces lactis* genomic DNA as template, and the product was named KlADH1-H51K-F3.

1 μL of each of the amplified products KlADH1-H51K-F1, KlADH1-H51K-F2, KlADH1-H51K-F3 and pKMD1-T were mixed, and added with 5 μL of Cloning Mix and 1 μL of water. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H51K.

4.2.2 Construction of Donor Plasmid pKMD1-KlADH1-H51R

One PCR amplification process was carried out by using primers of KlADH1-HR1-PF: TCGAGCTCGGTACCCGGGGATCCTCTAGAGAT- CATGGACAATAC GTTACCGAGATGAGG (SEQ ID No.: 38) and KlADH1-H51R-PR: CCAAGCTCTAAGGTCAGTATGACAGACACCG-GAGTACTTGACG (SEQ ID No.: 58) with a *Kluyveromyces lactis* genomic DNA as template, and the product was named KlADH1-H51R-F1; another PCR amplification process was carried out by using primers of KlADH1-H51R-PF: GTCATACTGACCTTAGAGCTTG-GAAGGGTGACTGGCCTTTG (SEQ ID No.: 59) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H51R-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H51R-F3.

1 μL of each of the amplified products KlADH1-H51R-F1, KlADH1-H51R-F2, KlADH1-H51R-F3 and pKMD1-T were mixed, and added with 5 μL of Cloning Mix and 1 μL of water. After mixing, the mixture was bathed in 50° C. water for 1 hour. After the water bath, the mixture was placed on ice for 2 minutes. 10 μL of the reaction mixture was all added into 50 L of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H51R.

4.3 Electrotransformation of *K. lactis* (the Same as Example 2.3)

4.4 Positive Identification 12 to 24 monoclonal colonies were picked out from a plate with transformed cells. Samples were detected by PCR using identification primers of ADH1-m-CF: TGG-GAGAGAATGTTAAAGGT (SEQ ID No.: 54) and ADH1-m-CR: TGACGGTCGTTAACTAAGAT (SEQ ID No.: 55) with the cells as template. Strains that were tested positive by PCR and identified by sequencing were determined as positive strains and named ADH1 H51K and ADH1 H51R, respectively.

Example 5 Site-Directed Mutation of ADH1 H124 Site by CRISPR/Cas9

5.1 Determination of KlADH1 CRISPR gRNA Sequence

According to the point mutation designed in KlADH1, PAM sequence (NGG) was selected and corresponding gRNA sequence was determined. The principle for selecting gRNA in this example is as follows: the gRNA should be close to the designed mutation site; the GC content should be moderate (40%-60%), and the existence of a poly T structure should be avoided. In this embodiment, the KlADH1 gRNA1 sequence is TGGGTGAAAACGT-CAAGGGC (SEQ ID No.: 33).

Methods for plasmid construction and transformation are as follows: using primers pCas9-KlADH1-gRNA1-PF: TGGGTGAAAACGTCAAGGGCGTTT-TAGAGCTAGAAATAGC (SEQ ID No.: 34) and pCas9-KlADH1-gRNA1-PR: GCCCTTGACGTTTTCACC-CAAAAGTCCCATTCGCCACCCG (SEQ ID No.: 35), and using pCAS plasmid as template, PCR amplification was performed. 17 μL of amplified product was taken and added with 1 μL of Dpn I and 2 μL of 10× digestion buffer; after mixing, the mixture was incubated at 37° C. for 3 hours. 10 μL of DpnI-treated mixture was added into 50 μL of DH5a competent cells. The mixture was placed on ice for 30 minutes, heat-shocked at 42° C. for 45 seconds, followed by the addition of 1 mL of LB liquid medium, and then cultured with shaking at 37° C. for 1 hour. Thereafter, the mixture was coated onto a Kan-resistant LB solid medium, and then an inverted culture was carried out at 37° C. until monoclonal colonies grew out. Two monoclonal colonies were picked out and then cultured with shaking in an LB liquid medium. After being detected PCR-positive and confirmed by sequencing, the plasmid was extracted and stored, and named pKMCas9_StR_KlADH1.

5.2 Construction and Amplification of Donor DNA Plasmid

In this example, to facilitate the storage and amplification of linear donor DNA, the donor DNA was firstly inserted into a pKMD1 plasmid, and then amplified by PCR to obtain linear donor DNA sequences.

A PCR amplification process was carried out by using primers of pKMD1-PF: ATCGTCGACCTGCAGGCATG (SEQ ID No.: 36) and pKMD1-PR: ATCTCTAGAG-GATCCCCGGG (SEQ ID No.: 37) with a pKMD1 plasmid as template. 17 μL amplified product was taken and then added with 1 μL of Dpn I and 2 μL of 10× digestion buffer; after mixing, the mixture was incubated at 37° C. for 3 hours; and a linear fragment pKMD1-T of plasmid skeleton was obtained.

5.2.1 Construction of Donor Plasmid pKMD1-KlADH1-H124K

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H124K-F1; another PCR amplification process was carried out by using primers of KlADH1-gRNA1-m-PF: GGGAGAGAATGT-TAAAGGTTGGAAGATTGGTGACTTCGCTG G (SEQ ID No.: 47) and KlADH1-H124K-PR: CCATCTTTTGTATATCCACT-CAAGTCAGCTTCTGGACAGTTG G (SEQ ID No.: 60) with a *Kluyveromyces lactis* genomic DNA as template, and the product was named KlADH1-H124K-F2; another PCR amplification process was carried out by using primers of KlADH1-H124K-PF: CTTGAGTGGATATACAAAA-GATGGTTCTTTCCAACAATACGCTA CTGC (SEQ ID No.: 61) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H124K-F3.

1 μL of each of the amplified products KlADH1-H124K-F1, KlADH1-H124K-F2, KlADH1-H124K-F3 and pKMD1-T were mixed, and added with 5 μL of Cloning Mix and 1 μL of water. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H124K.

5.2.2 Construction of Donor Plasmid pKMD1-KlADH1-H124R

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H124K-F1; another PCR amplification process was carried out by using primers of KlADH1-gRNA1-m-PF: GGGAGAGAATGT-TAAAGGTTGGAAGATTGGTGACTTCGCTG G (SEQ ID No.: 47) and KlADH1-H124R-PR: CCATCTCTTGTATATCCACT-CAAGTCAGCTTCTGGACAGTTG G (SEQ ID No.: 62) with a *Kluyveromyces lactis* genomic DNA as template, and the product was named KlADH1-H124R-F2; another PCR amplification process was carried out by using primers of KlADH1-H124R-PF: CTTGAGTGGATATA-CAAGAGATGGTTCTTTCCAACAATACGCTA CTGC (SEQ ID No.: 63) and KlADH1-HR2-PR: TGC-CAAGCTTGCATGCCTGCAGGTCGACGATCT-TATACTGGGTA GATTTCAAACGGGAC (SEQ ID No.: 41) with a *Kluyveromyces lactis* genomic DNA as template, and the product was named KlADH1-H124R-F3.

1 μL of each of the amplified products KlADH1-H124R-F1, KlADH1-H124R-F2, KlADH1-H124R-F3 and pKMD1-T were mixed, and added with 5 μL of Cloning Mix and 1 μL of water. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H124R.

5.3 Electrotransformation of *K. lactis* (the Same as Example 2.3)

5.4 Positive Identification 12 to 24 monoclonal colonies were picked out from a plate with transformed cells. Samples were detected by PCR using identification primers of ADH1-m-CF: TGG-GAGAGAATGTTAAAGGT (SEQ ID No.: 54) and ADH1-m-CR: TGACGGTCGTTAACTAAGAT (SEQ ID No.: 55) with the cells as template. Strains that were tested positive by PCR and identified by sequencing were determined as positive strains and named ADH1 H124K and ADH1 H124R, respectively.

Example 6 Simultaneous Site-Directed Mutation of ADH1 H47 And H124 Sites by CRISPR/Cas9

6.1 Determination of KlADH1 CRISPR gRNA Sequence

According to the point mutation designed in KlADH1, PAM sequence (NGG) was selected and corresponding gRNA sequence was determined. The principle for selecting gRNA in this example is as follows: the gRNA should be close to the designed mutation site; the GC content should be moderate (40%-60%), and the existence of a poly T structure should be avoided. In this embodiment, the KlADH1 gRNA1 sequence is TGGGTGAAAACGT-CAAGGGC (SEQ ID No.: 33).

Methods for plasmid construction and transformation of are as follows: using primers pCas9-KlADH1-gRNA1-PF: TGGGTGAAAACGTCAAGGGCGTTT-TAGAGCTAGAAATAGC (SEQ ID No.: 34) and pCas9-KlADH1-gRNA1-PR: GCCCTTGACGTTTTCACC-CAAAAGTCCCATTCGCCACCCG (SEQ ID No.: 35), and using pCAS plasmid as template, PCR amplification was performed. 17 μL of amplified product was taken and added with 1 L of Dpn I and 2 μL of 10× digestion buffer; after mixing, the mixture was incubated at 37° C. for 3 hours. 10 μL of DpnI-treated mixture was added into 50 μL of DH5a competent cells. The mixture was placed on ice for 30 minutes, heat-shocked at 42° C. for 45 seconds, followed by the addition of 1 mL of LB liquid medium, and then cultured with shaking at 37° C. for 1 hour. Thereafter, the mixture was coated onto a Kan-resistant LB solid medium, and then an inverted culture was carried out at 37° C. until monoclonal colonies grew out. Two monoclonal colonies were picked out and then cultured with shaking in an LB liquid medium. After being detected PCR-positive and confirmed by sequencing, the plasmid was extracted and stored, and named pKMCas9_StR_KlADH1.

6.2 Construction and Amplification of Donor DNA Plasmid

In this example, to facilitate the storage and amplification of linear donor DNA, the donor DNA was firstly inserted into a pKMD1 plasmid, and then amplified by PCR to obtain linear donor DNA sequences.

A PCR amplification process was carried out by using primers of pKMD1-PF: ATCGTCGACCTGCAGGCATG (SEQ ID No.: 36) and pKMD1-PR: ATCTCTAGAG-GATCCCCGGG (SEQ ID No.: 37) with a pKMD1 plasmid as template. 17 μL amplified product was taken and then added with 1 μL of Dpn I and 2 μL of 10× digestion buffer; after mixing, the mixture was incubated at 37° C. for 3 hours; and a linear fragment pKMD1-T of plasmid skeleton was obtained.

6.2.1 Construction of Donor Plasmid pKMD1-KlADH1-H47KH124K

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H47K-PR: AGCATGAAGGTCAGTTT-TACAGACACCGGAGTACTTGACG (SEQ ID No.: 44) with a *Kluyveromyces lactis* genomic DNA as template, and the product was named KlADH1-H47KH124K-F1; another PCR amplification process was carried out by using primers of KlADH1-H47K-PF: GTAAAACTGACCTT-CATGCTTGGAAGGGTGACTGGCCTTTG (SEQ ID No.: 45) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H47KH124K-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-H124K-PR: CCATCTTTTGTATATCCACT-CAAGTCAGCTTCTGGACAGTTGG (SEQ ID No.: 60) with a *Kluyveromyces lactis* genomic DNA as template, and the product was named KlADH1-H47KH124K-F3; another PCR amplification process was carried out by using primers of KlADH1-H124K-PF: CTTGAGTGGATATACAAAA-GATGGTTCTTTCCAACAATACGCTA CTGC (SEQ ID No.: 61) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H47KH124K-F4.

1 μL of each of the amplified products KlADH1-H47KH124K-F1, KlADH1-H47KH124K-F2, KlADH1-H47KH124K-F3, KlADH1-H47KH124K-F4 and pKMD1-T were mixed, and added with 5 μL of Cloning Mix. After mixing, the mixture was bathed in 50° C. water for 1 hour. After the water bath, the mixture was placed on ice for 2 minutes. 10 μL of the reaction mixture was all added into 50 L of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H47KH124K.

6.2.2 Construction of Donor Plasmid pKMD1-KlADH1-H47NH124K

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H47N-PR: AGCATGAAGGTCAGTAT-TACAGACACCGGAGTACTTGACG (SEQ ID No.: 48) with a *Kluyveromyces lactis* genomic DNA as template, and the product was named KlADH1-H47NH124K-F1; another PCR amplification process was carried out by using primers of KlADH1-H47N-PF: GTAATACTGACCTT-CATGCTTGGAAGGGTGACTGGCCTTTG (SEQ ID No.: 49) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H47NH124K-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47 and KlADH1-H124K-PR: CCATCTTTTGTATATCCACT-CAAGTCAGCTTCTGGACAGTTGG (SEQ ID No.: 60) with a *Kluyveromyces lactis* genomic DNA as template, and the product was named KlADH1-H47NH124K-F3; another PCR amplification process was carried out by using primers of KlADH1-H124K-PF: CTTGAGTGGATATACAAAA-GATGGTTCTTTCCAACAATACGCTA CTGC (SEQ ID No.: 61) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H47NH124K-F4.

1 μL of each of the amplified products KlADH1-H47NH124K-F1, KlADH1-H47NH124K-F2, KlADH1-H47NH124K-F3, KlADH1-H47NH124K-F4 and pKMD1-T were mixed, and added with 5 μL of Cloning Mix. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H47NH124K.

6.2.3 Construction of Donor Plasmid pKMD1-KlADH1-H47QH124K

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H47Q-PR: AGCAT-GAAGGTCAGTTTGACAGACACCG-GAGTACTTGACG (SEQ ID No.: 50) with a *Kluyveromyces lactis* genomic DNA as template, and the product was named KlADH1-H47QH124K-F1; another PCR amplification process was carried out by using primers of KlADH1-H47Q-PF: GTCAAACTGACCTTCATGCTTG-GAAGGGTGACTGGCCTTTG (SEQ ID No.: 51) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H47QH124K-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-H124K-PR: CCATCTTTTGTATATCCACT-CAAGTCAGCTTCTGGACAGTTGG (SEQ ID No.: 60) with a *Kluyveromyces lactis* genomic DNA as template, and the product was named KlADH1-H47QH124K-F3; another PCR amplification process was carried out by using primers of KlADH1-H124K-PF: CTTGAGTGGATATACAAAA-GATGGTTCTTTCCAACAATACGCTA CTGC (SEQ ID No.: 61) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H47QH124K-F4.

1 μL of each of the amplified products KlADH1-H47QH124K-F1, KlADH1-H47QH124K-F2, KlADH1-H47QH124K-F3, KlADH1-H47QH124K-F4 and pKMD1-T were mixed, and added with 5 μL of Cloning Mix. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H47QH124K.

6.2.4 Construction of Donor Plasmid pKMD1-KlADH1-H47RH124K

One PCR amplification process was carried out by using primers of KlADH1-HR1-PF: TCGAGCTCGGTACCCGGGGATCCTCTAGAGAT-CATGGACAATAC GTTACCGAGATGAGG (SEQ ID No.: 38) and KlADH1-H47R-PR: AGCATGAAGGTCAGTTC-TACAGACACCGGAGTACTTGACG (SEQ ID No.: 52) with a *Kluyveromyces lactis* genomic DNA as template, and the product was named KlADH1-H47RH124K-F1; another PCR amplification process was carried out by using primers of KlADH1-H47R-PF: GTAGAACTGACCTT-CATGCTTGGAAGGGTGACTGGCCTTTG (SEQ ID No.: 53) and KlADH1-gRNA1-m-PR: CCAACCTTTAACAT-TCTCTCCCATAGCAACAACGACACCAG (SEQ ID No.: 46) with a *Kluyveromyces lactis* genomic DNA as template, and the product was named KlADH1-H47RH124K-F2; another PCR amplification process was carried out by using primers of KlADH1-gRNA1-m-PF: GGGAGAGAATGT-TAAAGGTTGGAAGATTGGTGACTTCGCTGG (SEQ ID No.: 47) and KlADH1-H124K-PR: CCATCTTTTGTATATCCACT-CAAGTCAGCTTCTGGACAGTTGG (SEQ ID No.: 60) with a *Kluyveromyces lactis* genomic DNA as template, and the product was named KlADH1-H47RH124K-F3; another PCR amplification process was carried out by using primers of KlADH1-H124K-PF: CTTGAGTGGATATACAAAA-GATGGTTCTTTCCAACAATACGCTA CTGC (SEQ ID No.: 61) and KlADH1-HR2-PR: TGCCAAGCTTG-CATGCCTGCAGGTCGACGATCTTATACTGGGTA GATTTCAAACGGGAC (SEQ ID No.: 41) with a *Kluyveromyces lactis* genomic DNA as template, and the product was named KlADH1-H47RH124K-F4.

1 μL of each of the amplified products KlADH1-H47RH124K-F1, KlADH1-H47RH124K-F2, KlADH1-H47RH124K-F3, KlADH1-H47RH124K-F4 and pKMD1-T were mixed, and added with 5 μL of Cloning Mix. After mixing, the mixture was bathed in 50° C. water for 1 hour. After the water bath, the mixture was placed on ice for 2 minutes. 10 μL of the reaction mixture was all added into 50 μL of Trans-T1 competent cells. The mixture was placed on ice for 30 minutes, heat-shocked at 42° C. for 30 seconds, followed by the addition of 1 mL of LB liquid medium, and then cultured with shaking at 37° C. for 1 hour. Thereafter, the mixture was coated onto an Amp-resistant LB solid medium, and then an inverted culture was carried out at 37° C. until monoclonal colonies grew out. Six monoclonal colonies were picked out and then cultured with shaking in an LB liquid medium. After being detected PCR-positive and confirmed by sequencing, the plasmid was extracted and stored, and named pKMD1-KlADH1-H47RH124K.

6.3 Electrotransformation of *K. lactis* (the Same as Example 2.3)

6.4 Positive Identification 12 to 24 monoclonal colonies were picked out from a plate with transformed cells. Samples were detected by PCR using identification primers of ADH1-m-CF: TGG-GAGAGAATGTTAAAGGT (SEQ ID No.: 54) and ADH1-m-CR: TGACGGTCGTTAACTAAGAT (SEQ ID No.: 55) with the cells as template. Strains that were tested positive by PCR and identified by sequencing were determined as positive strains and named ADH1 H47KH124K, ADH1 H47NH124K, ADH1 H47QH124K and ADH1 H47RH124K, respectively.

Example 7 Analysis of Binding Ability of Endogenous Protein of KlADH1-Engineered Cell Strains to Ni Medium 7.1 Reagent Preparation for Protein Purification System
Binding buffer: 0.5 M NaCl, 20 mM Tris-HCl, 5 mM imidazole, pH 7.9.
Wash buffer: 0.5 M NaCl, 20 mM Tris-HCl, 60 mM imidazole, pH 7.9.
7.2 Purification of Endogenous Protein in KlADH1-Engineered Cell Strains and Analysis of their Binding Ability to Ni Medium Ni-NTA beads were balanced by binding buffer; an appropriate amount of cell lysate of KlADH1-engineered cell strains was added and incubated at 4° C. for 60 minutes; the beads were washed with wash buffer; after removal of the wash buffer, a little amount of loading buffer was added and a treatment at 96° C. for 5 minutes was carried out. The above samples were analyzed by polyacrylamide gel electrophoresis.

Example 8 In Vitro Protein Synthesis System 8.1 Preparation of Storage Solution for the In-Vitro Protein Synthesis System Final concentration: 22 mM 4-hydroxyethyl 1 piperazine ethanesulfonic acid (pH of 7.4), 30-150 mM potassium acetate, 1.0-5.0 mM magnesium acetate, 1.5-4 mM of a mixture of nucleoside triphosphates (adenosine triphosphate (ATP), guanosine triphosphate (GTP), cytidine triphosphate (CTP) and uridine triphosphate (UTP)), 0.08-0.24 mM of a mixture of amino acids (glycine, alanine, valine, leucine, isoleucine, phenylalanine, proline, tryptophan, serine, tyrosine, cysteine, methionine, asparagine, glutamine, threonine, aspartic acid, glutamic acid, lysine, arginine and histidine), 25 mM phosphocreatine, 1.7 mM dithiothreitol, 0.27 mg/ml creatine phosphokinase, 0.027-0.054 mg/mL T7 RNA polymerase, 1%-4% PEG, 0.5%-2% sucrose, and finally added 50% by volume of the cell extract.

8.2 In Vitro Protein Synthesis Reaction

The above-mentioned reaction system was placed in an environment of 20-30° C., and let the mixture stand for a reaction for 2 to 12 hours.

Figure 24:
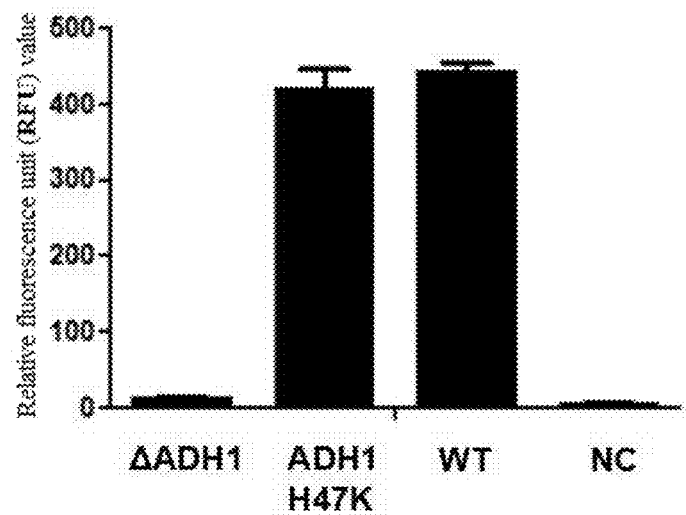
FIG. 24 shows an analysis of the cell-free transcription and translation activity of wild-type cell strain WT, cell strain ΔADH1 with KlADH1 being knocked-out, and cell strain H47K with single mutation of KlADH1. As shown in the figure, the bands from left to right refer to ΔADH1, KlADH1 H47K, *K. lactis* wild-type cell strain WT and negative control, respectively.

Assay of the activity of enhanced green fluorescent protein (eGFP): after several hours of reaction, 10 μL of the reaction solution was added into a 96-well white plate or a 384-well white plate; thereafter the mixture was immediately placed in an Envision 2120 multifunctional microplate reader (Perkin Elmer), and the absorbance was read to detect the activity of enhanced green fluorescent protein, where the unit of activity is relative fluorescence unit (RFU) value, as shown in FIG. 24.

Example 9 In Vitro Protein Synthesis and Purification 9.1 In Vitro Protein Synthesis In view of the results that, compared with the wild-type cell strain, the ΔADH1 cell strain has significantly reduced transcription and translation activity of cell-free system, while the ADH1 H47K cell strain had no obvious change, accordingly, ADH1 H47K became the material for our in vitro protein synthesis study. The cell-free transcription and translation system of the ADH1 H47K cell strain was added with templates of N-His8-eGFP and N-His8-Strep-GFP. The above-mentioned reaction system was placed in an environment of 20-30° C., and let the mixture stand for a reaction of 2 to 12 hours.

9.2 In Vitro Protein Purification

Figure 25:
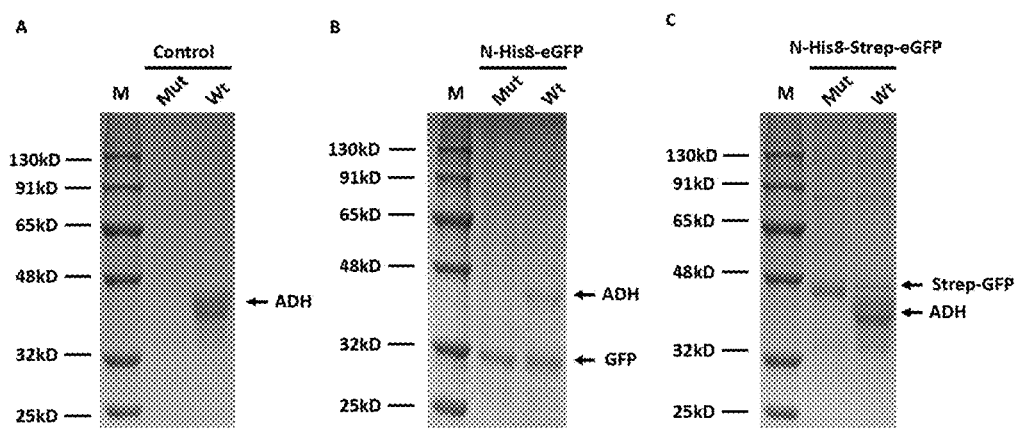
FIG. 25 shows a purification analysis of the target protein prepared by cell-free transcription and translation of wild-type cell strain WT and cell strain H47K (Mut) with single mutation of KlADH1. As shown in the figure, the bands from left to right refer to cell strain H47K (Mut) with single mutation of KlADH1 and *K. lactis* wild-type cell strain WT, respectively. Figure A shows the affinity analysis of between K1ADH1 and Ni-NTA without the addition of exogenous target proteins. Figure B shows the purification analysis of eGFP when the target protein N-His8-eGFP was added to the cell-free transcription and translation system of cell strain H47K with single mutation of K1ADH1. Figure C shows the purification analysis of Strep-eGFP when the target protein N-His8-Strep-eGFP was added to the cell-free transcription and translation system of cell strain H47K with single mutation of K1ADH1.
Figure 26:
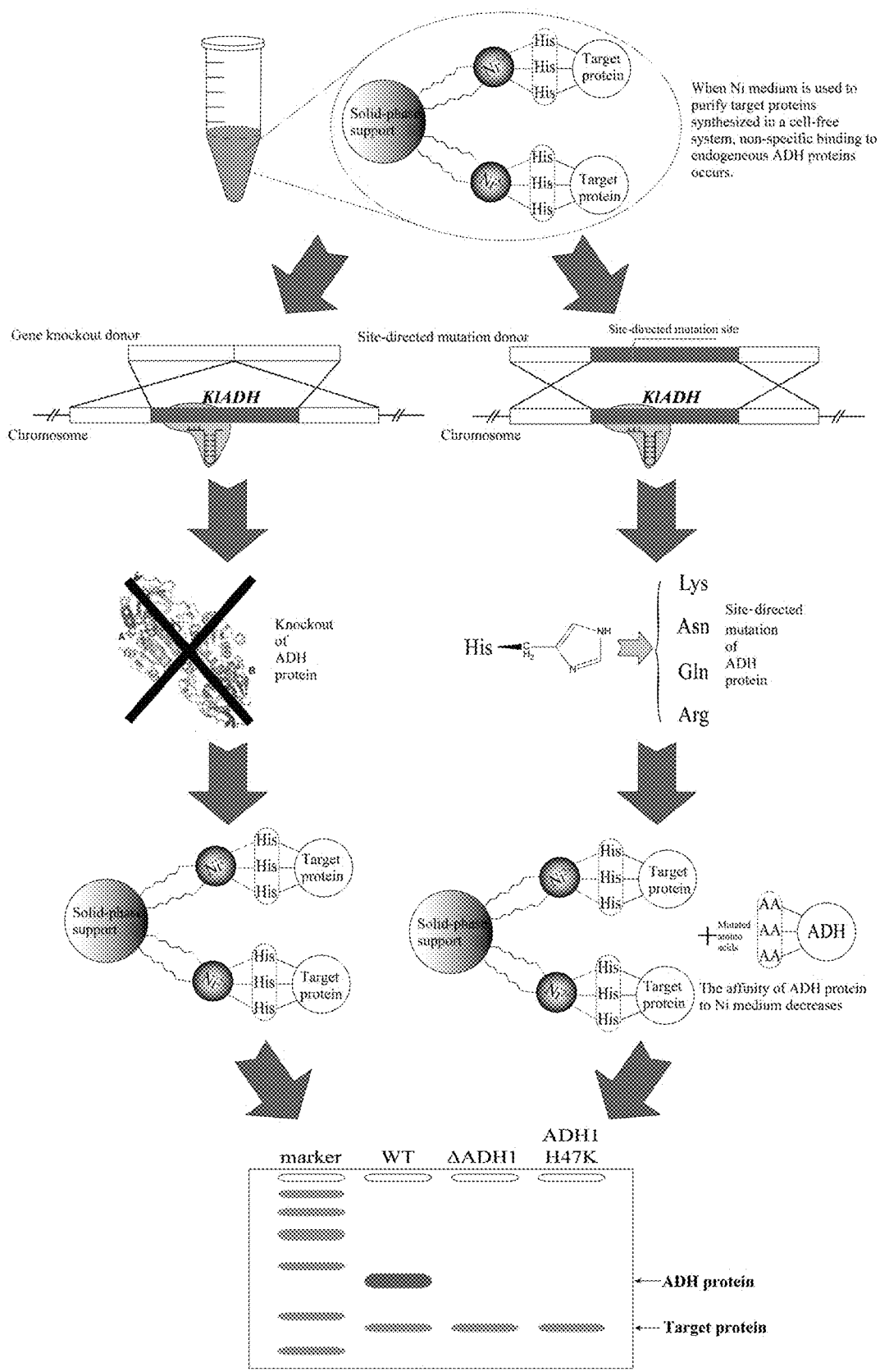
FIG. 26 summarizes elimination of the binding ability of K1ADH1 to Ni medium in order to improve the purity and specificity of the target protein by knockout of K1ADH1 gene and site-directed mutation to K1ADH1 gene, respectively.

Ni-NTA beads were balanced by binding buffer; an appropriate amount of the above-mentioned reaction system was added and incubated at 4° C. for 60 minutes; the beads were washed with wash buffer; after removal of the wash buffer, a little amount of loading buffer was added and a treatment at 96° C. for 5 minutes was carried out. The above samples were analyzed by polyacrylamide gel electrophoresis. The results are shown in FIG. 25.

The Results of the Examples of the Present Invention Indicate That:

The results of Example 7 of the present invention showed that, compared with the wild-type cell strain, the affinity to Ni medium generated by the engineered cell strains of the present invention were all significantly reduced.

Among them, cell strains such as ΔADH1, ADH1 H47K, ADH1 H47N, ADH1 H51R, ADH1 H124K, ADH1 H47KH124K and ADH1 H47NH124K had the lowest affinity with Ni medium.

ΔADH1, ADH1 H47K, ADH1 H47N, ADH1 H51R, ADH1 H124K, ADH1 H47KH124K and ADH1 H47NH124K had similar affinity to Ni medium, and the present invention selected ΔADH1 and ADH1 H47K to analyze the transcription and translation activity of cell-free system.

The results were shown in FIG. 24. The relative fluorescence unit (RFU) value of transcription and translation activity of the wild-type cell-free system was 442, and the RFU value of ΔADH1 cell-free system was 12, which was significantly reduced than that of the wild-type cell-free system, indicating that the knockout of ADH1 gene had a great negative impact on transcription and translation activity of cell-free system. The relative fluorescence unit (RFU) value of cell-free system of ADH1 H47K was 419, which had no significant change compared with that of the wild-type cell strain.

The same method was used to analyze the cell-free system transcription and translation activity of other mutant cell strains. The results showed that the relative fluorescence unit (RFU) value of cell-free system transcription and translation activity of other mutant cell strains were 300-400 which were substantially equivalent to that of the wild-type cell strain.

In addition, the expression purity of the exogenous proteins N-His8-eGFP and N-His8-Strep-eGFP in the KlADH1 H47K cell-free transcription and translation system of the present invention was analyzed. The results was shown in FIG. 25. Compared with the wild-type cell strains (WT), the KlADH1 H47K cell strain showed a significantly weakened ADH1 protein band at 37 kD, indicating that the purity of the exogenous proteins N-His8-eGFP and d N-His8-Strep-eGFP was significantly improved in the cell-free transcription and translation system of KlADH1 H47K.

The purity of other mutant cell strains was analyzed by using the same method. The results showed that the purity of the exogenous proteins N-His8-eGFP and N-His8-Strep-eGFP was also significantly improved in the cell-free transcription and translation system of other mutant cell strains compared with that of the wild-type cell strain (WT).

All the above results indicate that the site-directed mutation of ADH family proteins in the present invention can not only reduce the binding ability of ADH family proteins to Ni medium, but also do not affect the cell-free system transcription and translation activity of the strain, and can further effectively improve the expression purity of the exogenous protein in the cell-free system transcription and translation system of the cell strain.

All documents mentioned in the present invention are cited as references in this application, just as each document is individually cited as a reference. Additionally, it should be understood that those skilled in the art can make various changes or modifications to the present invention in light of the above teachings, and the equivalents also fall into the scope as defined by the appended claims of this application.

What is claimed is:

1. An alcohol dehydrogenase (ADH) mutant protein, wherein the ADH mutant protein is a non-natural protein with at least one core amino acid of a wild-type ADH protein artificially engineered, and wherein the ADH mutant protein has the amino acid sequence set forth in SEQ ID NO.: 2, 3, 7, 8, 10, or 11; wherein the ADH mutant protein has reduced binding affinity to Ni medium as compared to said wild-type ADH protein.

* * * * *

SEQUENCE LISTING

```
<160> NUMBER OF SEQ ID NOS: 65

<210> SEQ ID NO 1
<211> LENGTH: 350
<212> TYPE: PRT
<213> ORGANISM: Kluyveromyces lactis

<400> SEQUENCE: 1

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys His Thr
        35                  40                  45

Asp Leu His Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
```

```
                    100                 105                 110
Asn Cys Pro Glu Ala Asp Leu Ser Gly Tyr Thr His Asp Gly Ser Phe
            115                 120                 125

Gln Gln Tyr Ala Thr Ala Asp Ala Val Gln Ala Ala Lys Ile Pro Val
        130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
        195                 200                 205

Lys Ala Lys Leu Phe Lys Asp Leu Gly Gly Glu Tyr Phe Ile Asp Phe
    210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
            260                 265                 270

Leu Pro Arg Asp Ala Lys Cys Lys Ser Asp Val Phe Asn Gln Val Val
        275                 280                 285

Lys Ser Ile Ser Ile Val Gly Ser Tyr Val Gly Asn Arg Ala Asp Thr
    290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
            340                 345                 350

<210> SEQ ID NO 2
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 2

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys Lys Thr
        35                  40                  45

Asp Leu His Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr His Asp Gly Ser Phe
```

```
            115                 120                 125
Gln Gln Tyr Ala Thr Ala Asp Ala Val Gln Ala Ala Lys Ile Pro Val
        130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
        195                 200                 205

Lys Ala Lys Leu Phe Lys Asp Leu Gly Gly Glu Tyr Phe Ile Asp Phe
210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
            260                 265                 270

Leu Pro Arg Asp Ala Lys Cys Lys Ser Asp Val Phe Asn Gln Val Val
        275                 280                 285

Lys Ser Ile Ser Ile Val Gly Ser Tyr Val Gly Asn Arg Ala Asp Thr
290                 295                 300

Arg Glu Ala Ile Asp Phe Phe Ser Arg Gly Leu Val Lys Ala Pro Ile
305                 310                 315                 320

His Val Val Gly Leu Ser Leu Pro Ser Ile Tyr Glu Lys Met Glu
                325                 330                 335

Lys Gly Ala Ile Val Gly Arg Tyr Val Val Asp Thr Ser Lys
            340                 345                 350

<210> SEQ ID NO 3
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 3

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys Asn Thr
        35                  40                  45

Asp Leu His Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr His Asp Gly Ser Phe
        115                 120                 125

Gln Gln Tyr Ala Thr Ala Asp Ala Val Gln Ala Ala Lys Ile Pro Val
```

```
                    130                 135                 140
Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                    165                 170                 175

Ala Ile Ser Gly Ala Ala Gly Gly Leu Gly Ser Leu Ala Val Gln Tyr
                180                 185                 190

Ala Lys Ala Met Gly Tyr Arg Val Leu Gly Ile Asp Ala Gly Glu Glu
                195                 200                 205

Lys Ala Lys Leu Phe Lys Asp Leu Gly Gly Glu Tyr Phe Ile Asp Phe
            210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                    245                 250                 255

Gln Ser Thr Asn Tyr Val Arg Ser Asn Gly Thr Val Val Leu Val Gly
                260                 265                 270

Leu Pro Arg Asp Ala Lys Cys Lys Ser Asp Val Phe Asn Gln Val Val
            275                 280                 285

Lys Ser Ile Ser Ile Val Gly Ser Tyr Val Gly Asn Arg Ala Asp Thr
            290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                    325                 330                 335

Lys Gly Ala Ile Val Gly Arg Tyr Val Val Asp Thr Ser Lys
                340                 345                 350

<210> SEQ ID NO 4
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 4

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
                20                  25                  30

Ala Asn Glu Leu Leu Ile Asn Val Lys Tyr Ser Gly Val Cys Gln Thr
            35                  40                  45

Asp Leu His Ala Trp Lys Gly Asp Trp Pro Leu Pro Thr Lys Leu Pro
        50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
                100                 105                 110

Asn Cys Pro Glu Ala Asp Leu Ser Gly Tyr Thr His Asp Gly Ser Phe
            115                 120                 125

Gln Gln Tyr Ala Thr Ala Asp Ala Val Gln Ala Lys Ile Pro Val
        130                 135                 140

Gly Thr Asp Leu Ala Glu Val Ala Pro Val Leu Cys Ala Gly Val Thr
```

```
            145                 150                 155                 160
Val Tyr Lys Ala Leu Lys Ser Ala Asn Leu Lys Ala Gly Asp Trp Val
            165                 170                 175

Ala Ile Ser Gly Ala Ala Gly Leu Gly Ser Leu Ala Val Gln Tyr
            180                 185                 190

Ala Lys Ala Met Gly Tyr Arg Val Leu Gly Ile Asp Ala Gly Glu Glu
            195                 200                 205

Lys Ala Lys Leu Phe Lys Asp Leu Gly Gly Glu Tyr Phe Ile Asp Phe
            210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                    245                 250                 255

Gln Ser Thr Asn Tyr Val Arg Ser Asn Gly Thr Val Val Leu Val Gly
                260                 265                 270

Leu Pro Arg Asp Ala Lys Cys Lys Ser Asp Val Phe Asn Gln Val Val
            275                 280                 285

Lys Ser Ile Ser Ile Val Gly Ser Tyr Val Gly Asn Arg Ala Asp Thr
            290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                    325                 330                 335

Lys Gly Ala Ile Val Gly Arg Tyr Val Val Asp Thr Ser Lys
                340                 345                 350

<210> SEQ ID NO 5
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 5

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
                20                  25                  30

Ala Asn Glu Leu Leu Ile Asn Val Lys Tyr Ser Gly Val Cys Arg Thr
            35                  40                  45

Asp Leu His Ala Trp Lys Gly Asp Trp Pro Leu Pro Thr Lys Leu Pro
        50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr His Asp Gly Ser Phe
        115                 120                 125

Gln Gln Tyr Ala Thr Ala Asp Ala Val Gln Ala Ala Lys Ile Pro Val
    130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
```

```
                    165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
        195                 200                 205

Lys Ala Lys Leu Phe Lys Asp Leu Gly Gly Glu Tyr Phe Ile Asp Phe
    210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
            260                 265                 270

Leu Pro Arg Asp Ala Lys Cys Lys Ser Asp Val Phe Asn Gln Val Val
        275                 280                 285

Lys Ser Ile Ser Ile Val Gly Ser Tyr Val Gly Asn Arg Ala Asp Thr
    290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
            340                 345                 350

<210> SEQ ID NO 6
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 6

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys His Thr
        35                  40                  45

Asp Leu Lys Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr His Asp Gly Ser Phe
        115                 120                 125

Gln Gln Tyr Ala Thr Ala Asp Ala Val Gln Ala Ala Lys Ile Pro Val
    130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
```

```
                180                 185                 190
Ala Lys Ala Met Gly Tyr Arg Val Leu Gly Ile Asp Ala Gly Glu Glu
            195                 200                 205

Lys Ala Lys Leu Phe Lys Asp Leu Gly Gly Glu Tyr Phe Ile Asp Phe
        210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
            260                 265                 270

Leu Pro Arg Asp Ala Lys Cys Lys Ser Asp Val Phe Asn Gln Val Val
        275                 280                 285

Lys Ser Ile Ser Ile Val Gly Ser Tyr Val Gly Asn Arg Ala Asp Thr
290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
            340                 345                 350

<210> SEQ ID NO 7
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 7

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys His Thr
        35                  40                  45

Asp Leu Arg Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr His Asp Gly Ser Phe
        115                 120                 125

Gln Gln Tyr Ala Thr Ala Asp Ala Val Gln Ala Lys Ile Pro Val
    130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
```

```
                195                 200                 205
Lys Ala Lys Leu Phe Lys Asp Leu Gly Gly Glu Tyr Phe Ile Asp Phe
210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
                260                 265                 270

Leu Pro Arg Asp Ala Lys Cys Lys Ser Asp Val Phe Asn Gln Val Val
            275                 280                 285

Lys Ser Ile Ser Ile Val Gly Ser Tyr Val Gly Asn Arg Ala Asp Thr
        290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
                340                 345                 350

<210> SEQ ID NO 8
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 8

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys His Thr
        35                  40                  45

Asp Leu His Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr Lys Asp Gly Ser Phe
        115                 120                 125

Gln Gln Tyr Ala Thr Ala Asp Ala Val Gln Ala Ala Lys Ile Pro Val
    130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
        195                 200                 205

Lys Ala Lys Leu Phe Lys Asp Leu Gly Gly Glu Tyr Phe Ile Asp Phe
```

```
             210                 215                 220
Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
                260                 265                 270

Leu Pro Arg Asp Ala Lys Cys Lys Ser Asp Val Phe Asn Gln Val Val
                275                 280                 285

Lys Ser Ile Ser Ile Val Gly Ser Tyr Val Gly Asn Arg Ala Asp Thr
290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
                340                 345                 350
```

<210> SEQ ID NO 9
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 9

```
Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
                20                  25                  30

Ala Asn Glu Leu Leu Ile Asn Val Lys Tyr Ser Gly Val Cys His Thr
            35                  40                  45

Asp Leu His Ala Trp Lys Gly Asp Trp Pro Leu Pro Thr Lys Leu Pro
        50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
                100                 105                 110

Asn Cys Pro Glu Ala Asp Leu Ser Gly Tyr Thr Arg Asp Gly Ser Phe
            115                 120                 125

Gln Gln Tyr Ala Thr Ala Asp Ala Val Gln Ala Ala Lys Ile Pro Val
        130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
                180                 185                 190

Ala Lys Ala Met Gly Tyr Arg Val Leu Gly Ile Asp Ala Gly Glu Glu
            195                 200                 205

Lys Ala Lys Leu Phe Lys Asp Leu Gly Gly Glu Tyr Phe Ile Asp Phe
        210                 215                 220

Thr Lys Ser Lys Asn Ile Pro Glu Glu Val Ile Glu Ala Thr Lys Gly
```

```
            225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
                260                 265                 270

Leu Pro Arg Asp Ala Lys Cys Lys Ser Asp Val Phe Asn Gln Val Val
                275                 280                 285

Lys Ser Ile Ser Ile Val Gly Ser Tyr Val Gly Asn Arg Ala Asp Thr
                290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
                340                 345                 350

<210> SEQ ID NO 10
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 10

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
                20                  25                  30

Ala Asn Glu Leu Leu Ile Asn Val Lys Tyr Ser Gly Val Cys Lys Thr
                35                  40                  45

Asp Leu His Ala Trp Lys Gly Asp Trp Pro Leu Pro Thr Lys Leu Pro
                50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
                100                 105                 110

Asn Cys Pro Glu Ala Asp Leu Ser Gly Tyr Thr Lys Asp Gly Ser Phe
                115                 120                 125

Gln Gln Tyr Ala Thr Ala Asp Ala Val Gln Ala Ala Lys Ile Pro Val
                130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
                180                 185                 190

Ala Lys Ala Met Gly Tyr Arg Val Leu Gly Ile Asp Ala Gly Glu Glu
                195                 200                 205

Lys Ala Lys Leu Phe Lys Asp Leu Gly Gly Glu Tyr Phe Ile Asp Phe
                210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
```

```
                        245                 250                 255
Gln Ser Thr Asn Tyr Val Arg Ser Asn Gly Thr Val Val Leu Val Gly
            260                 265                 270

Leu Pro Arg Asp Ala Lys Cys Lys Ser Asp Val Phe Asn Gln Val Val
        275                 280                 285

Lys Ser Ile Ser Ile Val Gly Ser Tyr Val Gly Asn Arg Ala Asp Thr
    290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
            340                 345                 350

<210> SEQ ID NO 11
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 11

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys Asn Thr
        35                  40                  45

Asp Leu His Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr Lys Asp Gly Ser Phe
        115                 120                 125

Gln Gln Tyr Ala Thr Ala Asp Ala Val Gln Ala Ala Lys Ile Pro Val
    130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
        195                 200                 205

Lys Ala Lys Leu Phe Lys Asp Leu Gly Gly Glu Tyr Phe Ile Asp Phe
    210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
```

```
                    260                 265                 270
Leu Pro Arg Asp Ala Lys Cys Lys Ser Asp Val Phe Asn Gln Val Val
            275                 280                 285

Lys Ser Ile Ser Ile Val Gly Ser Tyr Val Gly Asn Arg Ala Asp Thr
        290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
            340                 345                 350

<210> SEQ ID NO 12
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 12

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys Gln Thr
        35                  40                  45

Asp Leu His Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr Lys Asp Gly Ser Phe
        115                 120                 125

Gln Gln Tyr Ala Thr Ala Asp Ala Val Gln Ala Ala Lys Ile Pro Val
    130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
        195                 200                 205

Lys Ala Lys Leu Phe Lys Asp Leu Gly Gly Glu Tyr Phe Ile Asp Phe
    210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
            260                 265                 270

Leu Pro Arg Asp Ala Lys Cys Lys Ser Asp Val Phe Asn Gln Val Val
```

```
                275                 280                 285
Lys Ser Ile Ser Ile Val Gly Ser Tyr Val Gly Asn Arg Ala Asp Thr
    290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys
            340                 345                 350

<210> SEQ ID NO 13
<211> LENGTH: 350
<212> TYPE: PRT
<213> ORGANISM: Artificial sequence
<220> FEATURE:
<223> OTHER INFORMATION: Synthetic protein {ADH mutant protein}

<400> SEQUENCE: 13

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys Arg Thr
        35                  40                  45

Asp Leu His Ala Trp Lys Gly Asp Trp Pro Leu Pro Thr Lys Leu Pro
    50                  55                  60

Leu Val Gly Gly His Glu Gly Ala Gly Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr Lys Asp Gly Ser Phe
        115                 120                 125

Gln Gln Tyr Ala Thr Ala Asp Ala Val Gln Ala Lys Ile Pro Val
    130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
        195                 200                 205

Lys Ala Lys Leu Phe Lys Asp Leu Gly Gly Glu Tyr Phe Ile Asp Phe
    210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255

Gln Ser Thr Asn Tyr Val Arg Ser Asn Gly Thr Val Val Leu Val Gly
            260                 265                 270

Leu Pro Arg Asp Ala Lys Cys Lys Ser Asp Val Phe Asn Gln Val Val
        275                 280                 285

Lys Ser Ile Ser Ile Val Gly Ser Tyr Val Gly Asn Arg Ala Asp Thr
```

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
            325                 330                 335

Lys Gly Ala Ile Val Gly Arg Tyr Val Val Asp Thr Ser Lys
        340                 345                 350

<210> SEQ ID NO 14
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 14

```
atggccgcat ctatcccaga aactcaaaag ggtgttatct tctacgaaaa cggtggtgaa    60
ttgcaataca aggacatccc agttccaaag ccaaaggcta cgaactttt gatcaacgtc    120
aagtactccg gtgtctgtaa aactgacctt catgcttgga agggtgactg gcctttgcca    180
accaaattgc cattagttgg tggtcacgaa ggtgctggtg tcgttgttgc tatgggagag    240
aatgttaaag gttggaagat tggtgacttc gctggtatca aatggttgaa cggttcttgt    300
atgtcctgtg aatactgtga attgtccaac gaatccaact gtccagaagc tgacttgtcc    360
ggttacactc acgacggttc tttccaacaa tacgctactg ctgatgccgt tcaagctgcc    420
aagatcccag tcggtactga cttggctgaa gttgctccag tgctatgtgc tggtgtcacc    480
gtttacaagg ccctaaaatc cgccaacttg aaggccggtg actgggtcgc catctctggt    540
gctgctggtg gtctaggttc tctagctgtc caatacgcca aggccatggg ttacagagtg    600
ttgggtatcg atgctggtga agaaaaggct aagttgttca aggacttggg tggtgaatac    660
ttcattgatt tcaccaagtc caagaacatc ccagaagaag tcatcgaagc taccaagggt    720
ggtgctcacg gtgtcatcaa cgtctctgtc tccgaattcg ctatcgaaca atctaccaac    780
tacgtcagat ctaacggtac cgtcgtattg gtcggtctac caagagacgc caagtgtaag    840
tccgatgtct ttaaccaagt tgtgaagtcc atctccattg tcggttctta cgtcggtaac    900
agagctgaca ccagagaagc cattgacttc ttctccagag gtctagtcaa ggctccaatc    960
cacgtcgttg gttttgtccga actaccatcc atctacgaaa agatggaaaa gggtgctatc   1020
gtcggtagat acgtcgtcga cacttcaaaa taa                                 1053
```

<210> SEQ ID NO 15
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 15

```
atggccgcat ctatcccaga aactcaaaag ggtgttatct tctacgaaaa cggtggtgaa    60
ttgcaataca aggacatccc agttccaaag ccaaaggcta cgaactttt gatcaacgtc    120
aagtactccg gtgtctgtaa tactgacctt catgcttgga agggtgactg gcctttgcca    180
accaaattgc cattagttgg tggtcacgaa ggtgctggtg tcgttgttgc tatgggagag    240
aatgttaaag gttggaagat tggtgacttc gctggtatca aatggttgaa cggttcttgt    300
```

| | |
|---|---|
| atgtcctgtg aatactgtga attgtccaac gaatccaact gtccagaagc tgacttgtcc | 360 |
| ggttacactc acgacggttc tttccaacaa tacgctactg ctgatgccgt tcaagctgcc | 420 |
| aagatcccag tcggtactga cttggctgaa gttgctccag tgctatgtgc tggtgtcacc | 480 |
| gtttacaagg ccctaaaatc cgccaacttg aaggccggtg actgggtcgc catctctggt | 540 |
| gctgctggtg gtctaggttc tctagctgtc aatacgcca aggccatggg ttacagagtg | 600 |
| ttgggtatcg atgctggtga agaaaaggct aagttgttca aggacttggg tggtgaatac | 660 |
| ttcattgatt tcaccaagtc caagaacatc ccagaagaag tcatcgaagc taccaagggt | 720 |
| ggtgctcacg gtgtcatcaa cgtctctgtc tccgaattcg ctatcgaaca atctaccaac | 780 |
| tacgtcagat ctaacggtac cgtcgtattg gtcggtctac aagagacgc caagtgtaag | 840 |
| tccgatgtct ttaaccaagt tgtgaagtcc atctccattg tcggttctta cgtcggtaac | 900 |
| agagctgaca ccagagaagc cattgacttc ttctccagag gtctagtcaa ggctccaatc | 960 |
| cacgtcgttg gtttgtccga actaccatcc atctacgaaa agatggaaaa gggtgctatc | 1020 |
| gtcggtagat acgtcgtcga cacttcaaaa taa | 1053 |

<210> SEQ ID NO 16
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 16

| | |
|---|---|
| atggccgcat ctatcccaga aactcaaaag ggtgttatct tctacgaaaa cggtggtgaa | 60 |
| ttgcaataca aggacatccc agttccaaag ccaaaggcta acgaactttt gatcaacgtc | 120 |
| aagtactccg gtgtctgtca aactgacctt catgcttgga agggtgactg gccttttgcca | 180 |
| accaaattgc cattagttgg tggtcacgaa ggtgctggtg tcgttgttgc tatgggagag | 240 |
| aatgttaaag gttggaagat tggtgacttc gctggtatca atggttgaa cggttcttgt | 300 |
| atgtcctgtg aatactgtga attgtccaac gaatccaact gtccagaagc tgacttgtcc | 360 |
| ggttacactc acgacggttc tttccaacaa tacgctactg ctgatgccgt tcaagctgcc | 420 |
| aagatcccag tcggtactga cttggctgaa gttgctccag tgctatgtgc tggtgtcacc | 480 |
| gtttacaagg ccctaaaatc cgccaacttg aaggccggtg actgggtcgc catctctggt | 540 |
| gctgctggtg gtctaggttc tctagctgtc aatacgcca aggccatggg ttacagagtg | 600 |
| ttgggtatcg atgctggtga agaaaaggct aagttgttca aggacttggg tggtgaatac | 660 |
| ttcattgatt tcaccaagtc caagaacatc ccagaagaag tcatcgaagc taccaagggt | 720 |
| ggtgctcacg gtgtcatcaa cgtctctgtc tccgaattcg ctatcgaaca atctaccaac | 780 |
| tacgtcagat ctaacggtac cgtcgtattg gtcggtctac aagagacgc caagtgtaag | 840 |
| tccgatgtct ttaaccaagt tgtgaagtcc atctccattg tcggttctta cgtcggtaac | 900 |
| agagctgaca ccagagaagc cattgacttc ttctccagag gtctagtcaa ggctccaatc | 960 |
| cacgtcgttg gtttgtccga actaccatcc atctacgaaa agatggaaaa gggtgctatc | 1020 |
| gtcggtagat acgtcgtcga cacttcaaaa taa | 1053 |

<210> SEQ ID NO 17
<211> LENGTH: 1053
<212> TYPE: DNA
<213> ORGANISM: Artificial sequence
<220> FEATURE:

<223> OTHER INFORMATION: Synthetic DNA {nucleotide sequence of ADH mutant protein}

<400> SEQUENCE: 17

| | |
|---|---|
| atggccgcat ctatcccaga aactcaaaag ggtgttatct tctacgaaaa cggtggtgaa | 60 |
| ttgcaataca aggacatccc agttccaaag ccaaaggcta acgaactttt gatcaacgtc | 120 |
| aagtactccg gtgtctgtag aactgacctt catgcttgga agggtgactg gcctttgcca | 180 |
| accaaattgc cattagttgg tggtcacgaa ggtgctggtg tcgttgttgc tatgggagag | 240 |
| aatgttaaag gttggaagat tggtgacttc gctggtatca aatggttgaa cggttcttgt | 300 |
| atgtcctgtg aatactgtga attgtccaac gaatccaact gtccagaagc tgacttgtcc | 360 |
| ggttacactc acgacggttc tttccaacaa tacgctactg ctgatgccgt tcaagctgcc | 420 |
| aagatcccag tcggtactga cttggctgaa gttgctccag tgctatgtgc tggtgtcacc | 480 |
| gtttacaagg ccctaaaatc cgccaacttg aaggccggtg actgggtcgc catctctggt | 540 |
| gctgctggtg gtctaggttc tctagctgtc aatacgcca aggccatggg ttacagagtg | 600 |
| ttgggtatcg atgctggtga agaaaaggct aagttgttca aggacttggg tggtgaatac | 660 |
| ttcattgatt tcaccaagtc caagaacatc ccagaagaag tcatcgaagc taccaagggt | 720 |
| ggtgctcacg gtgtcatcaa cgtctctgtc tccgaattcg ctatcgaaca atctaccaac | 780 |
| tacgtcagat ctaacggtac cgtcgtattg gtcggtctac aagagacgc caagtgtaag | 840 |
| tccgatgtct ttaaccaagt tgtgaagtcc atctccattg tcggttctta cgtcggtaac | 900 |
| agagctgaca ccagagaagc cattgacttc ttctccagag gtctagtcaa ggctccaatc | 960 |
| cacgtcgttg gtttgtccga actaccatcc atctacgaaa agatggaaaa gggtgctatc | 1020 |
| gtcggtagat acgtcgtcga cacttcaaaa taa | 1053 |

<210> SEQ ID NO 18
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 18

| | |
|---|---|
| atggccgcat ctatcccaga aactcaaaag ggtgttatct tctacgaaaa cggtggtgaa | 60 |
| ttgcaataca aggacatccc agttccaaag ccaaaggcta acgaactttt gatcaacgtc | 120 |
| aagtactccg gtgtctgtca tactgacctt aaagcttgga agggtgactg gcctttgcca | 180 |
| accaaattgc cattagttgg tggtcacgaa ggtgctggtg tcgttgttgc tatgggagag | 240 |
| aatgttaaag gttggaagat tggtgacttc gctggtatca aatggttgaa cggttcttgt | 300 |
| atgtcctgtg aatactgtga attgtccaac gaatccaact gtccagaagc tgacttgtcc | 360 |
| ggttacactc acgacggttc tttccaacaa tacgctactg ctgatgccgt tcaagctgcc | 420 |
| aagatcccag tcggtactga cttggctgaa gttgctccag tgctatgtgc tggtgtcacc | 480 |
| gtttacaagg ccctaaaatc cgccaacttg aaggccggtg actgggtcgc catctctggt | 540 |
| gctgctggtg gtctaggttc tctagctgtc aatacgcca aggccatggg ttacagagtg | 600 |
| ttgggtatcg atgctggtga agaaaaggct aagttgttca aggacttggg tggtgaatac | 660 |
| ttcattgatt tcaccaagtc caagaacatc ccagaagaag tcatcgaagc taccaagggt | 720 |
| ggtgctcacg gtgtcatcaa cgtctctgtc tccgaattcg ctatcgaaca atctaccaac | 780 |
| tacgtcagat ctaacggtac cgtcgtattg gtcggtctac aagagacgc caagtgtaag | 840 |

```
tccgatgtct ttaaccaagt tgtgaagtcc atctccattg tcggttctta cgtcggtaac    900
agagctgaca ccagagaagc cattgacttc ttctccagag gtctagtcaa ggctccaatc    960
cacgtcgttg gtttgtccga actaccatcc atctacgaaa agatggaaaa gggtgctatc   1020
gtcggtagat acgtcgtcga cacttcaaaa taa                                1053
```

<210> SEQ ID NO 19
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 19

```
atggccgcat ctatcccaga aactcaaaag ggtgttatct tctacgaaaa cggtggtgaa     60
ttgcaataca aggacatccc agttccaaag ccaaaggcta acgaactttt gatcaacgtc    120
aagtactccg gtgtctgtca tactgacctt agagcttgga agggtgactg gcctttgcca    180
accaaattgc cattagttgg tggtcacgaa ggtgctggtg tcgttgttgc tatgggagag    240
aatgttaaag gttggaagat tggtgacttc gctggtatca aatggttgaa cggttcttgt    300
atgtcctgtg aatactgtga attgtccaac gaatccaact gtccagaagc tgacttgtcc    360
ggttacactc acgacggttc tttccaacaa tacgctactg ctgatgccgt tcaagctgcc    420
aagatcccag tcggtactga cttggctgaa gttgctccag tgctatgtgc tggtgtcacc    480
gtttacaagg ccctaaaatc cgccaacttg aaggccggtg actgggtcgc catctctggt    540
gctgctggtg gtctaggttc tctagctgtc caatacgcca aggccatggg ttacagagtg    600
ttgggtatcg atgctggtga agaaaaggct aagttgttca aggacttggg tggtgaatac    660
ttcattgatt tcaccaagtc caagaacatc ccagaagaag tcatcgaagc taccaagggt    720
ggtgctcacg gtgtcatcaa cgtctctgtc tccgaattcg ctatcgaaca atctaccaac    780
tacgtcagat ctaacggtac cgtcgtattg gtcggtctac aagagacgc caagtgtaag    840 tccgatgtct ttaaccaagt tgtgaagtcc atctccattg tcggttctta cgtcggtaac    900
agagctgaca ccagagaagc cattgacttc ttctccagag gtctagtcaa ggctccaatc    960
cacgtcgttg gtttgtccga actaccatcc atctacgaaa agatggaaaa gggtgctatc   1020
gtcggtagat acgtcgtcga cacttcaaaa taa                                1053
```

<210> SEQ ID NO 20
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 20

```
atggccgcat ctatcccaga aactcaaaag ggtgttatct tctacgaaaa cggtggtgaa     60
ttgcaataca aggacatccc agttccaaag ccaaaggcta acgaactttt gatcaacgtc    120
aagtactccg gtgtctgtca caccgatttg cacgcatgga agggtgactg gcctttgcca    180
accaaattgc cattagttgg tggtcacgaa ggtgctggtg tcgttgttgc tatgggagag    240
aatgttaaag gttggaagat tggtgacttc gctggtatca aatggttgaa cggttcttgt    300
atgtcctgtg aatactgtga attgtccaac gaatccaact gtccagaagc tgacttgagt    360
```

```
ggatatacaa aagatggttc tttccaacaa tacgctactg ctgatgccgt tcaagctgcc      420
aagatcccag tcggtactga cttggctgaa gttgctccag tgctatgtgc tggtgtcacc      480
gtttacaagg ccctaaaatc cgccaacttg aaggccggtg actgggtcgc catctctggt      540
gctgctggtg gtctaggttc tctagctgtc caatacgcca aggccatggg ttacagagtg      600
ttgggtatcg atgctggtga agaaaaggct aagttgttca aggacttggg tggtgaatac      660
ttcattgatt tcaccaagtc caagaacatc ccagaagaag tcatcgaagc taccaagggt      720
ggtgctcacg gtgtcatcaa cgtctctgtc tccgaattcg ctatcgaaca atctaccaac      780
tacgtcagat ctaacggtac cgtcgtattg gtcggtctac caagagacgc caagtgtaag      840
tccgatgtct ttaaccaagt tgtgaagtcc atctccattg tcggttctta cgtcggtaac      900
agagctgaca ccagagaagc cattgacttc ttctccagag gtctagtcaa ggctccaatc      960
cacgtcgttg gtttgtccga actaccatcc atctacgaaa agatggaaaa gggtgctatc     1020
gtcggtagat acgtcgtcga cacttcaaaa taa                                  1053

<210> SEQ ID NO 21
<211> LENGTH: 1053
<212> TYPE: DNA
<213> ORGANISM: Artificial sequence
<220> FEATURE:
<223> OTHER INFORMATION: Synthetic DNA {nucleotide sequence of ADH
      mutant protein}

<400> SEQUENCE: 21
atggccgcat ctatcccaga aactcaaaag ggtgttatct tctacgaaaa cggtggtgaa       60
ttgcaataca aggacatccc agttccaaag ccaaaggcta cgaactttt gatcaacgtc       120 aagtactccg gtgtctgtca caccgatttg cacgcatgga agggtgactg gcctttgcca      180
accaaattgc cattagttgg tggtcacgaa ggtgctggtg tcgttgttgc tatgggagag      240
aatgttaaag gttggaagat tggtgacttc gctggtatca aatggttgaa cggttcttgt      300
atgtcctgtg aatactgtga attgtccaac gaatccaact gtccagaagc tgacttgagt      360
ggatatacaa gagatggttc tttccaacaa tacgctactg ctgatgccgt tcaagctgcc      420
aagatcccag tcggtactga cttggctgaa gttgctccag tgctatgtgc tggtgtcacc      480
gtttacaagg ccctaaaatc cgccaacttg aaggccggtg actgggtcgc catctctggt      540
gctgctggtg gtctaggttc tctagctgtc caatacgcca aggccatggg ttacagagtg      600
ttgggtatcg atgctggtga agaaaaggct aagttgttca aggacttggg tggtgaatac      660
ttcattgatt tcaccaagtc caagaacatc ccagaagaag tcatcgaagc taccaagggt      720
ggtgctcacg gtgtcatcaa cgtctctgtc tccgaattcg ctatcgaaca atctaccaac      780
tacgtcagat ctaacggtac cgtcgtattg gtcggtctac caagagacgc caagtgtaag      840
tccgatgtct ttaaccaagt tgtgaagtcc atctccattg tcggttctta cgtcggtaac      900
agagctgaca ccagagaagc cattgacttc ttctccagag gtctagtcaa ggctccaatc      960
cacgtcgttg gtttgtccga actaccatcc atctacgaaa agatggaaaa gggtgctatc     1020
gtcggtagat acgtcgtcga cacttcaaaa taa                                  1053

<210> SEQ ID NO 22
<211> LENGTH: 1053
<212> TYPE: DNA
<213> ORGANISM: Artificial sequence
<220> FEATURE:
<223> OTHER INFORMATION: Synthetic DNA {nucleotide sequence of ADH
      mutant protein}
```

<400> SEQUENCE: 22

```
atggccgcat ctatcccaga aactcaaaag ggtgttatct tctacgaaaa cggtggtgaa        60
ttgcaataca aggacatccc agttccaaag ccaaaggcta acgaactttt gatcaacgtc       120
aagtactccg gtgtctgtaa aactgacctt catgcttgga agggtgactg gcctttgcca       180
accaaattgc cattagttgg tggtcacgaa ggtgctggtg tcgttgttgc tatgggagag       240
aatgttaaag gttggaagat tggtgacttc gctggtatca aatggttgaa cggttcttgt       300
atgtcctgtg aatactgtga attgtccaac gaatccaact gtccagaagc tgacttgagt       360
ggatatacaa aagatggttc tttccaacaa tacgctactg ctgatgccgt tcaagctgcc       420
aagatcccag tcggtactga cttggctgaa gttgctccag tgctatgtgc tggtgtcacc       480
gtttacaagg ccctaaaatc cgccaacttg aaggccggtg actgggtcgc catctctggt       540
gctgctggtg gtctaggttc tctagctgtc caatacgcca aggccatggg ttacagagtg       600
ttgggtatcg atgctggtga agaaaaggct aagttgttca aggacttggg tggtgaatac       660
ttcattgatt tcaccaagtc caagaacatc ccagaagaag tcatcgaagc taccaagggt       720
ggtgctcacg gtgtcatcaa cgtctctgtc tccgaattcg ctatcgaaca atctaccaac       780
tacgtcagat ctaacggtac cgtcgtattg gtcggtctac aagagacgc caagtgtaag       840
tccgatgtct ttaaccaagt tgtgaagtcc atctccattg tcggttctta cgtcggtaac       900
agagctgaca ccagagaagc cattgacttc ttctccagag gtctagtcaa ggctccaatc       960
cacgtcgttg gtttgtccga actaccatcc atctacgaaa agatggaaaa gggtgctatc      1020
gtcggtagat acgtcgtcga cacttcaaaa taa                                   1053
```

<210> SEQ ID NO 23
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 23

```
atggccgcat ctatcccaga aactcaaaag ggtgttatct tctacgaaaa cggtggtgaa        60
ttgcaataca aggacatccc agttccaaag ccaaaggcta acgaactttt gatcaacgtc       120
aagtactccg gtgtctgtaa tactgacctt catgcttgga agggtgactg gcctttgcca       180
accaaattgc cattagttgg tggtcacgaa ggtgctggtg tcgttgttgc tatgggagag       240
aatgttaaag gttggaagat tggtgacttc gctggtatca aatggttgaa cggttcttgt       300
atgtcctgtg aatactgtga attgtccaac gaatccaact gtccagaagc tgacttgagt       360
ggatatacaa aagatggttc tttccaacaa tacgctactg ctgatgccgt tcaagctgcc       420
aagatcccag tcggtactga cttggctgaa gttgctccag tgctatgtgc tggtgtcacc       480
gtttacaagg ccctaaaatc cgccaacttg aaggccggtg actgggtcgc catctctggt       540
gctgctggtg gtctaggttc tctagctgtc caatacgcca aggccatggg ttacagagtg       600
ttgggtatcg atgctggtga agaaaaggct aagttgttca aggacttggg tggtgaatac       660
ttcattgatt tcaccaagtc caagaacatc ccagaagaag tcatcgaagc taccaagggt       720
ggtgctcacg gtgtcatcaa cgtctctgtc tccgaattcg ctatcgaaca atctaccaac       780
tacgtcagat ctaacggtac cgtcgtattg gtcggtctac aagagacgc caagtgtaag       840
tccgatgtct ttaaccaagt tgtgaagtcc atctccattg tcggttctta cgtcggtaac       900
```

```
agagctgaca ccagagaagc cattgacttc ttctccagag gtctagtcaa ggctccaatc    960
cacgtcgttg gtttgtccga actaccatcc atctacgaaa agatggaaaa gggtgctatc   1020
gtcggtagat acgtcgtcga cacttcaaaa taa                                1053
```

<210> SEQ ID NO 24
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 24

```
atggccgcat ctatcccaga aactcaaaag ggtgttatct tctacgaaaa cggtggtgaa     60
ttgcaataca aggacatccc agttccaaag ccaaaggcta acgaactttt gatcaacgtc    120
aagtactccg gtgtctgtca aactgacctt catgcttgga agggtgactg gcctttgcca    180
accaaattgc cattagttgg tggtcacgaa ggtgctggtg tcgttgttgc tatgggagag    240
aatgttaaag gttggaagat tggtgacttc gctggtatca aatggttgaa cggttcttgt    300
atgtcctgtg aatactgtga attgtccaac gaatccaact gtccagaagc tgacttgagt    360
ggatatacaa aagatggttc tttccaacaa tacgctactg ctgatgccgt tcaagctgcc    420
aagatcccag tcggtactga cttggctgaa gttgctccag tgctatgtgc tggtgtcacc    480
gtttacaagg ccctaaaatc cgccaacttg aaggccggtg actgggtcgc catctctggt    540
gctgctggtg gtctaggttc tctagctgtc caatacgcca aggccatggg ttacagagtg    600
ttgggtatcg atgctggtga agaaaaggct aagttgttca aggacttggg tggtgaatac    660
ttcattgatt tcaccaagtc caagaacatc ccagaagaag tcatcgaagc taccaagggt    720
ggtgctcacg gtgtcatcaa cgtctctgtc tccgaattcg ctatcgaaca atctaccaac    780
tacgtcagat ctaacggtac cgtcgtattg gtcggtctac aagagacgc caagtgtaag    840 tccgatgtct ttaaccaagt tgtgaagtcc atctccattg tcggttctta cgtcggtaac    900
agagctgaca ccagagaagc cattgacttc ttctccagag gtctagtcaa ggctccaatc    960
cacgtcgttg gtttgtccga actaccatcc atctacgaaa agatggaaaa gggtgctatc   1020
gtcggtagat acgtcgtcga cacttcaaaa taa                                1053
```

<210> SEQ ID NO 25
<211> LENGTH: 1053
<212> TYPE: DNA
<213> ORGANISM: Artificial sequence
<220> FEATURE:
<223> OTHER INFORMATION: Synthetic DNA {nucleotide sequence of ADH mutant protein}

<400> SEQUENCE: 25

```
atggccgcat ctatcccaga aactcaaaag ggtgttatct tctacgaaaa cggtggtgaa     60
ttgcaataca aggacatccc agttccaaag ccaaaggcta acgaactttt gatcaacgtc    120
aagtactccg gtgtctgtag aactgacctt catgcttgga agggtgactg gcctttgcca    180
accaaattgc cattagttgg tggtcacgaa ggtgctggtg tcgttgttgc tatgggagag    240
aatgttaaag gttggaagat tggtgacttc gctggtatca aatggttgaa cggttcttgt    300
atgtcctgtg aatactgtga attgtccaac gaatccaact gtccagaagc tgacttgagt    360
ggatatacaa aagatggttc tttccaacaa tacgctactg ctgatgccgt tcaagctgcc    420
```

```
aagatcccag tcggtactga cttggctgaa gttgctccag tgctatgtgc tggtgtcacc    480
gtttacaagg ccctaaaatc cgccaacttg aaggccggtg actgggtcgc catctctggt    540
gctgctggtg gtctaggttc tctagctgtc caatacgcca aggccatggg ttacagagtg    600
ttgggtatcg atgctggtga agaaaaggct aagttgttca aggacttggg tggtgaatac    660
ttcattgatt tcaccaagtc caagaacatc ccagaagaag tcatcgaagc taccaagggt    720
ggtgctcacg tgtcatcaa cgtctctgtc tccgaattcg ctatcgaaca atctaccaac    780
tacgtcagat ctaacggtac cgtcgtattg gtcggtctac aagagacgc caagtgtaag    840 tccgatgtct ttaaccaagt tgtgaagtcc atctccattg tcggttctta cgtcggtaac    900
agagctgaca ccagagaagc cattgacttc ttctccagag gtctagtcaa ggctccaatc    960
cacgtcgttg gtttgtccga actaccatcc atctacgaaa agatggaaaa gggtgctatc   1020
gtcggtagat acgtcgtcga cacttcaaaa taa                                1053

<210> SEQ ID NO 26
<211> LENGTH: 348
<212> TYPE: PRT
<213> ORGANISM: Kluyveromyces lactis

<400> SEQUENCE: 26

Met Ser Ile Pro Glu Thr Gln Lys Gly Val Ile Phe Tyr Glu Asn Gly
1               5                   10                  15

Gly Glu Leu Gln Tyr Lys Asp Ile Pro Val Pro Lys Pro Lys Ala Asn
            20                  25                  30

Glu Leu Leu Ile Asn Val Lys Tyr Ser Gly Val Cys His Thr Asp Leu
        35                  40                  45

His Ala Trp Lys Gly Asp Trp Pro Leu Pro Thr Lys Leu Pro Leu Val
    50                  55                  60

Gly Gly His Glu Gly Ala Gly Val Val Val Ala Met Gly Glu Asn Val
65                  70                  75                  80

Lys Gly Trp Asn Ile Gly Asp Phe Ala Gly Ile Lys Trp Leu Asn Gly
                85                  90                  95

Ser Cys Met Ser Cys Glu Tyr Cys Glu Leu Ser Asn Glu Ser Asn Cys
            100                 105                 110

Pro Asp Ala Asp Leu Ser Gly Tyr Thr His Asp Gly Ser Phe Gln Gln
        115                 120                 125

Tyr Ala Thr Ala Asp Ala Val Gln Ala Ala Arg Ile Pro Lys Gly Thr
    130                 135                 140

Asp Leu Ala Glu Val Ala Pro Ile Leu Cys Ala Gly Val Thr Val Tyr
145                 150                 155                 160

Lys Ala Leu Lys Ser Ala Asp Leu Lys Ala Gly Asp Trp Val Ala Ile
                165                 170                 175

Ser Gly Ala Cys Gly Gly Leu Gly Ser Leu Ala Ile Gln Tyr Ala Lys
            180                 185                 190

Ala Met Gly Tyr Arg Val Leu Gly Ile Asp Thr Gly Ala Glu Lys Ala
        195                 200                 205

Lys Leu Phe Lys Glu Leu Gly Gly Glu Tyr Phe Val Asp Tyr Ala Val
    210                 215                 220

Ser Lys Asp Leu Ile Lys Glu Ile Val Asp Ala Thr Asn Gly Gly Ala
225                 230                 235                 240

His Gly Val Ile Asn Val Ser Val Ser Glu Phe Ala Ile Glu Gln Ser
                245                 250                 255

Thr Asn Tyr Val Arg Ser Asn Gly Thr Val Val Leu Val Gly Leu Pro
```

```
            260                 265                 270
Arg Asp Ala Lys Cys Lys Ser Asp Val Phe Thr Gln Val Val Lys Ser
            275                 280                 285

Val Ser Ile Val Gly Ser Tyr Val Gly Asn Arg Ala Asp Thr Arg Glu
            290                 295                 300

Ala Leu Asp Phe Phe Ala Arg Gly Leu Val His Ala Pro Ile Lys Ile
305                 310                 315                 320

Val Gly Leu Ser Glu Leu Ala Asp Val Tyr Asp Lys Met Val Lys Gly
            325                 330                 335

Glu Ile Val Gly Arg Tyr Val Val Asp Thr Ser Lys
            340                 345

<210> SEQ ID NO 27
<211> LENGTH: 374
<212> TYPE: PRT
<213> ORGANISM: Kluyveromyces lactis

<400> SEQUENCE: 27

Met Leu Arg Leu Thr Ser Ala Arg Ser Ile Val Ser Pro Leu Arg Lys
1               5                   10                  15

Gly Ala Phe Gly Ser Ile Arg Thr Leu Ala Thr Ser Val Pro Glu Thr
            20                  25                  30

Gln Lys Gly Val Ile Phe Tyr Glu Asn Gly Gly Lys Leu Glu Tyr Lys
        35                  40                  45

Asp Ile Pro Val Pro Lys Pro Lys Pro Asn Glu Ile Leu Ile Asn Val
    50                  55                  60

Lys Tyr Ser Gly Val Cys His Thr Asp Leu His Ala Trp Lys Gly Asp
65                  70                  75                  80

Trp Pro Leu Pro Thr Lys Leu Pro Leu Val Gly Gly His Glu Gly Ala
                85                  90                  95

Gly Val Val Val Ala Met Gly Glu Asn Val Lys Gly Trp Asn Ile Gly
            100                 105                 110

Asp Phe Ala Gly Ile Lys Trp Leu Asn Gly Ser Cys Met Ser Cys Glu
        115                 120                 125

Tyr Cys Glu Leu Ser Asn Glu Ser Asn Cys Pro Asp Ala Asp Leu Ser
    130                 135                 140

Gly Tyr Thr His Asp Gly Ser Phe Gln Gln Tyr Ala Thr Ala Asp Ala
145                 150                 155                 160

Val Gln Ala Ala Arg Ile Pro Lys Gly Thr Asp Leu Ala Glu Val Ala
                165                 170                 175

Pro Ile Leu Cys Ala Gly Val Thr Val Tyr Lys Ala Leu Lys Ser Ala
            180                 185                 190

Asn Leu Lys Ala Gly Asp Trp Val Ala Ile Ser Gly Ala Ala Gly Gly
        195                 200                 205

Leu Gly Ser Leu Ala Val Gln Tyr Ala Lys Ala Met Gly Tyr Arg Val
210                 215                 220

Val Gly Ile Asp Gly Gly Glu Glu Lys Gly Lys Leu Val Lys Gln Leu
225                 230                 235                 240

Gly Gly Glu Ala Phe Val Asp Phe Thr Lys Thr Lys Asp Met Val Ala
                245                 250                 255

Glu Ile Gln Glu Ile Thr Asn Gly Gly Pro His Gly Val Ile Asn Val
            260                 265                 270

Ser Val Ser Glu Ala Ala Met Asn Ala Ser Thr Gln Phe Val Arg Pro
        275                 280                 285
```

```
Thr Gly Thr Val Val Leu Val Gly Leu Pro Ala Gly Ala Val Ile Lys
    290                 295                 300

Ser Glu Val Phe Ser His Val Val Lys Ser Ile Asn Ile Lys Gly Ser
305                 310                 315                 320

Tyr Val Gly Asn Arg Ala Asp Thr Arg Glu Ala Ile Asn Phe Phe Ala
                325                 330                 335

Asn Gly His Val His Ser Pro Ile Lys Val Val Gly Leu Ser Glu Leu
                340                 345                 350

Pro Lys Val Tyr Glu Leu Met Glu Gln Gly Lys Ile Leu Gly Arg Tyr
                355                 360                 365

Val Val Asp Thr Ser Asn
    370

<210> SEQ ID NO 28
<211> LENGTH: 375
<212> TYPE: PRT
<213> ORGANISM: Kluyveromyces lactis

<400> SEQUENCE: 28

Met Phe Arg Leu Ala Arg Ala Gln Thr Ala Leu Ala Asn Lys Ala Ser
1               5                   10                  15

Val Ser Arg Ser Phe Leu Arg Leu Asn Ser Ser Phe Ala Ile Pro Glu
                20                  25                  30

Thr Gln Lys Gly Val Ile Phe Tyr Glu Asn Gly Gly Lys Leu Glu Tyr
            35                  40                  45

Lys Asp Leu Pro Val Pro Lys Pro Lys Ala Asn Glu Ile Leu Ile Asn
    50                  55                  60

Val Lys Tyr Ser Gly Val Cys His Thr Asp Leu His Ala Trp Lys Gly
65                  70                  75                  80

Asp Trp Pro Leu Pro Val Lys Leu Pro Leu Val Gly Gly His Glu Gly
                85                  90                  95

Ala Gly Ile Val Val Ala Lys Gly Glu Asn Val Lys Asn Phe Glu Ile
                100                 105                 110

Gly Asp Tyr Ala Gly Ile Lys Trp Leu Asn Gly Ser Cys Met Ser Cys
            115                 120                 125

Glu Leu Cys Glu Gln Gly Tyr Glu Ser Asn Cys Leu Gln Ala Asp Leu
    130                 135                 140

Ser Gly Tyr Thr His Asp Gly Ser Phe Gln Gln Tyr Ala Thr Ala Asp
145                 150                 155                 160

Ala Val Gln Ala Ala Gln Ile Pro Lys Gly Thr Asp Leu Ala Glu Ile
                165                 170                 175

Ala Pro Ile Leu Cys Ala Gly Val Thr Val Tyr Lys Ala Leu Lys Thr
                180                 185                 190

Ala Asp Leu Lys Pro Gly Gln Trp Val Ala Ile Ser Gly Ala Ala Gly
            195                 200                 205

Gly Leu Gly Ser Leu Ala Val Gln Tyr Ala Lys Ala Met Gly Leu Arg
    210                 215                 220

Val Leu Gly Ile Asp Gly Gly Asp Gly Lys Glu Glu Leu Phe Lys Gln
225                 230                 235                 240

Cys Gly Gly Glu Val Phe Ile Asp Phe Arg Lys Ser Lys Asp Met Val
                245                 250                 255

Ala Asp Ile Gln Glu Ala Thr Asn Gly Gly Pro His Gly Val Ile Asn
                260                 265                 270

Val Ser Val Ser Glu Ala Ala Ile Ser Met Ser Thr Glu Tyr Val Arg
            275                 280                 285
```

```
Pro Thr Gly Val Val Leu Val Gly Leu Pro Ala Asp Ala Tyr Val
    290                 295                 300

Lys Ser Glu Val Phe Ser His Val Val Lys Ser Ile Ser Ile Lys Gly
305                 310                 315                 320

Ser Tyr Val Gly Asn Arg Ala Asp Thr Arg Glu Ala Thr Asp Phe Phe
                325                 330                 335

Thr Arg Gly Leu Val Lys Ser Pro Ile Lys Ile Ile Gly Leu Ser Glu
            340                 345                 350

Leu Pro Glu Ala Tyr Glu Leu Met Glu Gln Gly Lys Ile Leu Gly Arg
        355                 360                 365

Phe Val Val Asp Thr Tyr Lys
    370                 375

<210> SEQ ID NO 29
<211> LENGTH: 1047
<212> TYPE: DNA
<213> ORGANISM: Kluyveromyces lactis

<400> SEQUENCE: 29
atgtccattc ctgaaactca aaagggtgtt atcttttacg aaaacggtgg tgaattgcaa      60
tacaaggaca ttccagttcc aaagccaaag ccaacgaac ttttgatcaa cgtcaagtac     120
tccggtgtct gtcacaccga tttgcacgca tggaagggtg actggccttt gccaaccaaa     180
ttgccattag ttggtggtca cgaaggtgct ggtgtcgttg ttgctatggg tgaaaatgtc     240
aagggctgga acattggtga ctttgctggt atcaaatggt tgaacggttc ttgtatgtcc     300
tgtgaatact gtgaattgtc caatgaatcc aactgtcccg atgctgactt gtctggttac     360
acccacgatg gttcttttcca acaatatgct accgctgatg ccgttcaagc tgctagaatt     420
ccaaagggta ccgatttggc tgaagttgct ccaattctat gtgccggtgt taccgtttac     480
aaggctctaa aatctgctga cttgaaggcc ggtgactggg ttgccatttc cggtgcctgt     540
ggtggtctag gttctttggc tatccaatac gccaaggcta tgggttacag agtcttgggt     600
attgataccg tgctgaaaa ggctaagttg ttcaaggagc taggtggtga atacttcgtc     660
gattatgccg tctctaagga tttgattaaa gaaattgttg acgctactaa cggtggtgcc     720
cacggtgtca ttaacgtctc tgtctccgaa tttgctatag aacaatccac caattacgtt     780
agatcaaacg gtaccgttgt attggtcggt ctaccaaggg acgccaaatg taagtctgat     840
gtctttacac aagttgtcaa atcggtctcc attgttggtt cttacgtcgg taacagagct     900
gacaccagag aagctctaga tttcttcgca agaggtttag tgcatgctcc aattaagata     960
gtcggattat ctgaattggc agatgtttat gacaagatgg tcaagggtga aatcgttggt    1020
agatacgttg tcgacaccct caaaataa                                       1047

<210> SEQ ID NO 30
<211> LENGTH: 1125
<212> TYPE: DNA
<213> ORGANISM: Kluyveromyces lactis

<400> SEQUENCE: 30
atgttgagat tgacttccgc cagatccatt gtttccccat tgcgtaaggg tgcttttggt      60
tccatcagaa ccttagctac ctctgtgcca gaaacccaaa aggtgttat tttctatgag     120 aatggtggta aattggaata caaggacatt ccagttccaa agccaaagcc aaatgaaatc     180
ttgatcaacg tcaagtactc cggtgtgtgt cataccgatt tgcacgcatg gaagggtgac     240
```

```
tggccattgc caaccaagtt gccattggtc ggtggtcacg aaggtgctgg tgtcgttgtt      300
gctatgggtg aaaacgtcaa gggctggaac attggtgact tgcgggtat caaatggttg       360 aacggttctt gtatgtcctg tgaatactgt gaattgtcca atgaatccaa ctgtccagat      420
gctgacttgt ctggttacac ccacgatggt tctttccaac aatacgctac cgcagatgct      480
gttcaagctg ccagaattcc aaagggtacc gatttggctg aagttgctcc aattctatgt      540
gccggtgtta ctgtttacaa ggcttttgaaa agtgctaact tgaaggctgg tgactgggtt     600
gccatctctg gtgctgctgg tggtctaggt tctctagctg tccaatacgc caaggccatg      660
ggttacagag tcgttggtat cgacggtggt gaagaaaagg gtaagttggt caagcaattg      720
ggtggtgaag cctttgttga tttcaccaaa accaaggaca tggttgctga atccaagaa       780 atcaccaacg gtggtccaca cggtgtcatt aacgtctctg tttctgaagc tgccatgaac     840
gcttccactc aattcgtcag accaactggt actgtcgtat tggtcggttt gccagctggt     900
gccgtcatca gtccgaagt cttctcccac gtcgttaagt ctattaacat caagggttct     960
tacgtcggta acagagctga caccagagaa gctatcaact tcttcgctaa cggtcacgtc   1020
cactctccaa tcaaggttgt tggtttgtcc gaactaccaa aggtttacga attgatggaa    1080
caaggtaaga ttttgggtag atacgttgtt gacacctcca actag                    1125
```

<210> SEQ ID NO 31
<211> LENGTH: 1128
<212> TYPE: DNA
<213> ORGANISM: Kluyveromyces lactis

<400> SEQUENCE: 31

```
atgttcagat tagcccgtgc ccaaactgct ctagcgaaca aagcttctgt ttccagaagc      60 ttttgagat taaactcttc tttcgctatc ccagaaactc aaaagggtgt tatcttctac      120
gaaaatggtg gtaagttgga atacaaggat ttgccagttc aaagccaaa ggctaacgaa     180 attttgatta acgttaagta ctccggtgtt tgtcacaccg atttgcacgc ctggaagggt     240
gactggccat tgccagttaa attgccatta gtcggtggtc acgaaggtgc tggtatcgtt    300
gttgccaagg gtgaaaacgt taagaacttc gaaattggtg attacgctgg tatcaagtgg    360
ttgaacggtt cttgtatgtc ttgtgaattg tgtgaacaag gttacgaatc taactgtttg    420
caagctgact gtctggttta cacccatgac ggttctttcc aacaatacgc taccgctgat    480
gccgttcaag ctgctcaaat tccaaagggt accgatttgg ctgaaatcgc cccaatcttg    540
tgtgccggtt taccgtttta caaggctttg aagaccgctg acttgaaacc aggccaatgg   600
gttgctatct ccggtgctgc cggtggttta ggttcccttg ctgtgcaata cgccaaggcc    660
atgggtttga gagtcctagg tattgacggt ggtgatggta aggaagaatt gttcaagcaa   720
tgtggtggtg aagtcttcat cgacttcaga aagtctaagg acatggtcgc cgatatccaa   780
gaagctacca acggtggtcc tcacggtgtc attaacgtct ccgtctccga ggctgctatc   840
tccatgtcta ccgaatacgt tagaccaacc ggtgttgttg tcttggtcgg tttgccagct    900
gacgcttacg tcaagtccga agtcttctcc cacgtcgtta agtccatctc catcaagggt   960
tcttacgtcg gtaacagagc tgacaccaga gaagccaccg acttcttcac cagaggtttg  1020
gtcaagtctc caatcaagat catcggtcta tctgaattgc cagaagctta tgaactaatg  1080
gaacaaggta agatcttggg tagattcgtc gttgacactt acaaataa                1128
```

<210> SEQ ID NO 32
<211> LENGTH: 1053

```
<212> TYPE: DNA
<213> ORGANISM: Kluyveromyces lactis

<400> SEQUENCE: 32
atggccgcat ctatcccaga aactcaaaag ggtgttatct tctacgaaaa cggtggtgaa      60
ttgcaataca aggacatccc agttccaaag ccaaaggcta acgaactttt gatcaacgtc     120
aagtactccg gtgtctgtca caccgatttg cacgcatgga agggtgactg gcctttgcca     180
accaaattgc cattagttgg tggtcacgaa ggtgctggtg tcgttgttgc tatgggtgaa     240
aacgtcaagg gctggaagat tggtgacttc gctggtatca aatggttgaa cggttcttgt     300
atgtcctgtg aatactgtga attgtccaac gaatccaact gtccagaagc tgacttgtcc     360
ggttacactc acgacggttc tttccaacaa tacgctactg ctgatgccgt tcaagctgcc     420
aagatcccag tcggtactga cttggctgaa gttgctccag tgctatgtgc tggtgtcacc     480
gtttacaagg ccctaaaatc cgccaacttg aaggccggtg actgggtcgc catctctggt     540
gctgctggtg gtctaggttc tctagctgtc aatacgccca aggccatggg ttacagagtg     600
ttgggtatcg atgctggtga agaaaaggct aagttgttca aggacttggg tggtgaatac     660
ttcattgatt tcaccaagtc caagaacatc ccagaagaag tcatcgaagc taccaagggt     720
ggtgctcacg gtgtcatcaa cgtctctgtc tccgaattcg ctatcgaaca atctaccaac     780
tacgtcagat ctaacggtac cgtcgtattg gtcggtctac aagagacgc caagtgtaag     840 tccgatgtct ttaaccaagt tgtgaagtcc atctccattg tcggttctta cgtcggtaac     900
agagctgaca ccagagaagc cattgacttc ttctccagag gtctagtcaa ggctccaatc     960
cacgtcgttg gtttgtccga actaccatcc atctacgaaa agatggaaaa gggtgctatc    1020
gtcggtagat acgtcgtcga cacttcaaaa taa                                 1053

<210> SEQ ID NO 33
<211> LENGTH: 20
<212> TYPE: DNA
<213> ORGANISM: Artificial sequence
<220> FEATURE:
<223> OTHER INFORMATION: Synthetic DNA {KlADH1 gRNA1 sequence}

<400> SEQUENCE: 33
tgggtgaaaa cgtcaagggc                                                  20

<210> SEQ ID NO 34
<211> LENGTH: 40
<212> TYPE: DNA
<213> ORGANISM: Artificial sequence
<220> FEATURE:
<223> OTHER INFORMATION: Synthetic DNA {pKMCas9-KlADH1-gRNA1-PF forward
      primer}

<400> SEQUENCE: 34
tgggtgaaaa cgtcaagggc gttttagagc tagaaatagc                            40

<210> SEQ ID NO 35
<211> LENGTH: 40
<212> TYPE: DNA
<213> ORGANISM: Artificial sequence
<220> FEATURE:
<223> OTHER INFORMATION: Synthetic DNA {pCas9-KlADH1-gRNA1-PR reverse
      primer}

<400> SEQUENCE: 35
gcccttgacg ttttcaccca aaagtcccat tcgccacccg                            40
```

```
<210> SEQ ID NO 36
<211> LENGTH: 20
<212> TYPE: DNA
<213> ORGANISM: Artificial sequence
<220> FEATURE:
<223> OTHER INFORMATION: Synthetic DNA {pKMD1-PF forward primer}

<400> SEQUENCE: 36
atcgtcgacc tgcaggcatg                                                20

<210> SEQ ID NO 37
<211> LENGTH: 20
<212> TYPE: DNA
<213> ORGANISM: Artificial sequence
<220> FEATURE:
<223> OTHER INFORMATION: Synthetic DNA {pKMD1-PR reverse primer}

<400> SEQUENCE: 37
atctctagag gatccccggg                                                20

<210> SEQ ID NO 38
<211> LENGTH: 59
<212> TYPE: DNA
<213> ORGANISM: Artificial sequence
<220> FEATURE:
<223> OTHER INFORMATION: Synthetic DNA {KlADH1-HR1-PF forward primer}

<400> SEQUENCE: 38
tcgagctcgg tacccgggga tcctctagag atcatggaca atacgttacc gagatgagg    59

<210> SEQ ID NO 39
<211> LENGTH: 53
<212> TYPE: DNA
<213> ORGANISM: Artificial sequence
<220> FEATURE:
<223> OTHER INFORMATION: Synthetic DNA {KlADH1-HR1-PR reverse primer}

<400> SEQUENCE: 39
gaagagattt catttatctt tttttagtat agagtttgtg tgtttaaagc ttg          53

<210> SEQ ID NO 40
<211> LENGTH: 55
<212> TYPE: DNA
<213> ORGANISM: Artificial sequence
<220> FEATURE:
<223> OTHER INFORMATION: Synthetic DNA {KlADH1-HR2-PF forward primer}

<400> SEQUENCE: 40
caaactctat actaaaaaaa gataaatgaa atctcttccg cattcaagtc atgac        55

<210> SEQ ID NO 41
<211> LENGTH: 59
<212> TYPE: DNA
<213> ORGANISM: Artificial sequence
<220> FEATURE:
<223> OTHER INFORMATION: Synthetic DNA {KlADH1-HR2-PR reverse primer}

<400> SEQUENCE: 41
tgccaagctt gcatgcctgc aggtcgacga tcttatactg ggtagatttc aaacgggac    59

<210> SEQ ID NO 42
<211> LENGTH: 20
<212> TYPE: DNA
<213> ORGANISM: Artificial sequence
<220> FEATURE:
<223> OTHER INFORMATION: Synthetic DNA {ADH1-CF forward primer}
```

<400> SEQUENCE: 42
gtgatggaac acgggaatag                                                    20

<210> SEQ ID NO 43
<211> LENGTH: 20
<212> TYPE: DNA
<213> ORGANISM: Artificial sequence
<220> FEATURE:
<223> OTHER INFORMATION: Synthetic DNA {ADH1-CR reverse primer}

<400> SEQUENCE: 43
cacatatacc ttggcagtag                                                    20

<210> SEQ ID NO 44
<211> LENGTH: 40
<212> TYPE: DNA
<213> ORGANISM: Artificial sequence
<220> FEATURE:
<223> OTHER INFORMATION: Synthetic DNA {KlADH1-H47K-PR reverse primer}

<400> SEQUENCE: 44
agcatgaagg tcagttttac agacaccgga gtacttgacg                              40

<210> SEQ ID NO 45
<211> LENGTH: 41
<212> TYPE: DNA
<213> ORGANISM: Artificial sequence
<220> FEATURE:
<223> OTHER INFORMATION: Synthetic DNA {KlADH1-H47K-PF forward primer}

<400> SEQUENCE: 45
gtaaaactga ccttcatgct tggaagggtg actggccttt g                            41

<210> SEQ ID NO 46
<211> LENGTH: 41
<212> TYPE: DNA
<213> ORGANISM: Artificial sequence
<220> FEATURE:
<223> OTHER INFORMATION: Synthetic DNA {KlADH1-gRNA1-m-PR reverse
      primer}

<400> SEQUENCE: 46 ccaacctttaacattctctc ccatagcaac aacgacacca g                             41

ccaacccttta acattctctc ccatagcaac aacgacacca g                           41

<210> SEQ ID NO 47
<211> LENGTH: 42
<212> TYPE: DNA
<213> ORGANISM: Artificial sequence
<220> FEATURE:
<223> OTHER INFORMATION: Synthetic DNA {KlADH1-gRNA1-m-PF forward
      primer}

<400> SEQUENCE: 47
gggagagaat gttaaaggtt ggaagattgg tgacttcgct gg                           42

<210> SEQ ID NO 48
<211> LENGTH: 40
<212> TYPE: DNA
<213> ORGANISM: Artificial sequence
<220> FEATURE:
<223> OTHER INFORMATION: Synthetic DNA {KlADH1-H47N-PR reverse primer}

<400> SEQUENCE: 48
agcatgaagg tcagtattac agacaccgga gtacttgacg                              40

<210> SEQ ID NO 49
<211> LENGTH: 41
<212> TYPE: DNA
<213> ORGANISM: Artificial sequence
<220> FEATURE:
<223> OTHER INFORMATION: Synthetic DNA {KlADH1-H47N-PF forward primer}

<400> SEQUENCE: 49
gtaatactga ccttcatgct tggaagggtg actggccttt g                41

<210> SEQ ID NO 50
<211> LENGTH: 40
<212> TYPE: DNA
<213> ORGANISM: Artificial sequence
<220> FEATURE:
<223> OTHER INFORMATION: Synthetic DNA {KlADH1-H47Q-PR reverse primer}

<400> SEQUENCE: 50
agcatgaagg tcagtttgac agacaccgga gtacttgacg                 40

<210> SEQ ID NO 51
<211> LENGTH: 41
<212> TYPE: DNA
<213> ORGANISM: Artificial sequence
<220> FEATURE:
<223> OTHER INFORMATION: Synthetic DNA {KlADH1-H47Q-PF forward primer}

<400> SEQUENCE: 51
gtcaaactga ccttcatgct tggaagggtg actggccttt g                41

<210> SEQ ID NO 52
<211> LENGTH: 40
<212> TYPE: DNA
<213> ORGANISM: Artificial sequence
<220> FEATURE:
<223> OTHER INFORMATION: Synthetic DNA {KlADH1-H47R-PR reverse primer}

<400> SEQUENCE: 52
agcatgaagg tcagttctac agacaccgga gtacttgacg                 40

<210> SEQ ID NO 53
<211> LENGTH: 41
<212> TYPE: DNA
<213> ORGANISM: Artificial sequence
<220> FEATURE:
<223> OTHER INFORMATION: Synthetic DNA {KlADH1-H47R-PF forward primer}

<400> SEQUENCE: 53
gtagaactga ccttcatgct tggaagggtg actggccttt g                41

<210> SEQ ID NO 54
<211> LENGTH: 20
<212> TYPE: DNA
<213> ORGANISM: Artificial sequence
<220> FEATURE:
<223> OTHER INFORMATION: Synthetic DNA {ADH1-m-CF forward primer}

<400> SEQUENCE: 54
tgggagagaa tgttaaaggt                                       20

<210> SEQ ID NO 55
<211> LENGTH: 20
<212> TYPE: DNA
<213> ORGANISM: Artificial sequence
<220> FEATURE:
<223> OTHER INFORMATION: Synthetic DNA {ADH1-m-CR reverse primer}

<400> SEQUENCE: 55
tgacggtcgt taactaagat                                              20

<210> SEQ ID NO 56
<211> LENGTH: 43
<212> TYPE: DNA
<213> ORGANISM: Artificial sequence
<220> FEATURE:
<223> OTHER INFORMATION: Synthetic DNA {KlADH1-H51K-PR reverse primer}

<400> SEQUENCE: 56
ccaagcttta aggtcagtat gacagacacc ggagtacttg acg                    43

<210> SEQ ID NO 57
<211> LENGTH: 41
<212> TYPE: DNA
<213> ORGANISM: Artificial sequence
<220> FEATURE:
<223> OTHER INFORMATION: Synthetic DNA {KlADH1-H51K-PF forward primer}

<400> SEQUENCE: 57
gtcatactga ccttaaagct tggaagggtg actggccttt g                      41

<210> SEQ ID NO 58
<211> LENGTH: 43
<212> TYPE: DNA
<213> ORGANISM: Artificial sequence
<220> FEATURE:
<223> OTHER INFORMATION: Synthetic DNA {KlADH1-H51R-PR reverse primer}

<400> SEQUENCE: 58
ccaagctcta aggtcagtat gacagacacc ggagtacttg acg                    43

<210> SEQ ID NO 59
<211> LENGTH: 41
<212> TYPE: DNA
<213> ORGANISM: Artificial sequence
<220> FEATURE:
<223> OTHER INFORMATION: Synthetic DNA {KlADH1-H51R-PF forward primer}

<400> SEQUENCE: 59
gtcatactga ccttagagct tggaagggtg actggccttt g                      41

<210> SEQ ID NO 60
<211> LENGTH: 43
<212> TYPE: DNA
<213> ORGANISM: Artificial sequence
<220> FEATURE:
<223> OTHER INFORMATION: Synthetic DNA {KlADH1-H124K-PR reverse primer}

<400> SEQUENCE: 60
ccatcttttg tatatccact caagtcagct tctggacagt tgg                    43

<210> SEQ ID NO 61
<211> LENGTH: 48
<212> TYPE: DNA
<213> ORGANISM: Artificial sequence
<220> FEATURE:
<223> OTHER INFORMATION: Synthetic DNA {KlADH1-H124K-PF forward primer}

<400> SEQUENCE: 61
cttgagtgga tatacaaaag atggttcttt ccaacaatac gctactgc               48

<210> SEQ ID NO 62

-continued

```
<211> LENGTH: 43
<212> TYPE: DNA
<213> ORGANISM: Artificial sequence
<220> FEATURE:
<223> OTHER INFORMATION: Synthetic DNA {K1ADH1-H124R-PR reverse primer}

<400> SEQUENCE: 62
ccatctcttg tatatccact caagtcagct tctggacagt tgg                        43

<210> SEQ ID NO 63
<211> LENGTH: 48
<212> TYPE: DNA
<213> ORGANISM: Artificial sequence
<220> FEATURE:
<223> OTHER INFORMATION: Synthetic DNA {K1ADH1-H124R-PF forward primer}

<400> SEQUENCE: 63
cttgagtgga tatacaagag atggttcttt ccaacaatac gctactgc                   48

<210> SEQ ID NO 64
<211> LENGTH: 607
<212> TYPE: PRT
<213> ORGANISM: Artificial sequence
<220> FEATURE:
<223> OTHER INFORMATION: K1ADH1

<400> SEQUENCE: 64

Met Ala Ala Ser Ile Pro Glu Thr Gln Lys Gly Val Ile Phe Tyr Glu
1               5                   10                  15

Asn Gly Gly Glu Leu Gln Tyr Lys Asp Ile Pro Val Pro Lys Pro Lys
            20                  25                  30

Ala Asn Glu Leu Leu Ile Asn Val Lys Tyr Ser Gly Val Cys His Thr
        35                  40                  45

Asp Leu His Ala Trp Lys Gly Asp Trp Pro Leu Pro Thr Lys Leu Pro
    50                  55                  60

Leu Val Gly Gly His Glu Gly Ala Gly Val Val Val Ala Met Gly Glu
65                  70                  75                  80

Asn Val Lys Gly Trp Lys Ile Gly Asp Phe Ala Gly Ile Lys Trp Leu
                85                  90                  95

Asn Gly Ser Cys Met Ser Cys Glu Tyr Cys Glu Leu Ser Asn Glu Ser
            100                 105                 110

Asn Cys Pro Glu Ala Asp Leu Ser Gly Tyr Thr His Asp Gly Ser Phe
        115                 120                 125

Gln Gln Tyr Ala Thr Ala Asp Ala Val Gln Ala Lys Ile Pro Val
    130                 135                 140

Gly Thr Asp Leu Ala Glu Val Ala Pro Val Leu Cys Ala Gly Val Thr
145                 150                 155                 160

Val Tyr Lys Ala Leu Lys Ser Ala Asn Leu Lys Ala Gly Asp Trp Val
                165                 170                 175

Ala Ile Ser Gly Ala Ala Gly Gly Leu Gly Ser Leu Ala Val Gln Tyr
            180                 185                 190

Ala Lys Ala Met Gly Tyr Arg Val Leu Gly Ile Asp Ala Gly Glu Glu
        195                 200                 205

Lys Ala Lys Leu Phe Lys Asp Leu Gly Gly Glu Tyr Phe Ile Asp Phe
    210                 215                 220

Thr Lys Ser Lys Asn Ile Pro Glu Glu Val Ile Glu Ala Thr Lys Gly
225                 230                 235                 240

Gly Ala His Gly Val Ile Asn Val Ser Val Ser Glu Phe Ala Ile Glu
                245                 250                 255
```

```
Gln Ser Thr Asn Tyr Val Arg Ser Asn Gly Thr Val Leu Val Gly
            260                 265                 270

Leu Pro Arg Asp Ala Lys Cys Lys Ser Asp Val Phe Asn Gln Val Val
            275                 280                 285

Lys Ser Ile Ser Ile Val Gly Ser Tyr Val Gly Asn Arg Ala Asp Thr
290                 295                 300

Arg Glu Ala Ile Asp Phe Phe Ser Arg Gly Leu Val Lys Ala Pro Ile
305                 310                 315                 320

His Val Val Gly Leu Ser Glu Leu Pro Ser Ile Tyr Glu Lys Met Glu
                325                 330                 335

Lys Gly Ala Ile Val Gly Arg Tyr Val Val Asp Thr Ser Lys Met Ala
                340                 345                 350

Ala Ser Ile Pro Glu Thr Gln Lys Gly Val Ile Phe Tyr Glu Asn Gly
                355                 360                 365

Gly Glu Leu Gln Tyr Lys Asp Ile Pro Val Pro Lys Pro Lys Ala Asn
        370                 375                 380

Glu Leu Leu Ile Asn Val Lys Tyr Ser Gly Val Cys His Thr Asp Leu
385                 390                 395                 400

His Ala Trp Lys Gly Asp Trp Pro Leu Pro Thr Lys Leu Pro Leu Val
                405                 410                 415

Gly Gly His Glu Gly Ala Gly Val Val Val Ala Met Gly Glu Asn Val
                420                 425                 430

Lys Gly Trp Lys Ile Gly Asp Phe Ala Gly Ile Lys Trp Leu Asn Gly
                435                 440                 445

Ser Cys Met Ser Cys Glu Tyr Cys Glu Leu Ser Asn Glu Ser Asn Cys
        450                 455                 460

Pro Glu Ala Asp Leu Ser Gly Tyr Thr His Asp Gly Ser Phe Gln Gln
465                 470                 475                 480

Tyr Ala Thr Ala Asp Ala Val Gln Ala Ala Lys Ile Pro Val Gly Thr
                485                 490                 495

Asp Leu Ala Glu Val Ala Pro Val Leu Cys Ala Gly Val Thr Val Tyr
                500                 505                 510

Lys Ala Leu Lys Ser Ala Asn Leu Lys Ala Gly Asp Trp Val Ala Ile
                515                 520                 525

Ser Gly Ala Ala Gly Gly Leu Gly Ser Leu Ala Val Gln Tyr Ala Lys
        530                 535                 540

Ala Met Gly Tyr Arg Val Leu Gly Ile Asp Ala Gly Glu Glu Lys Ala
545                 550                 555                 560

Lys Leu Phe Lys Asp Leu Gly Gly Glu Tyr Phe Ile Asp Phe Thr Lys
                565                 570                 575

Ser Lys Asn Ile Pro Glu Glu Val Ile Glu Ala Thr Lys Gly Gly Ala
                580                 585                 590

His Gly Val Ile Asn Val Ser Val Ser Glu Phe Ala Ile Glu Gln
        595                 600                 605

<210> SEQ ID NO 65
<211> LENGTH: 601
<212> TYPE: PRT
<213> ORGANISM: Artificial sequence
<220> FEATURE:
<223> OTHER INFORMATION: 4w6z_ScADH1

<400> SEQUENCE: 65

Ser Ile Pro Glu Thr Gln Lys Gly Val Ile Phe Tyr Glu Ser His Gly
1               5                   10                  15
```

-continued

```
Lys Leu Glu Tyr Lys Asp Ile Pro Val Pro Lys Pro Lys Ala Asn Glu
             20                  25                  30

Leu Leu Ile Asn Val Lys Tyr Ser Gly Val Cys His Thr Asp Leu His
         35                  40                  45

Ala Trp His Gly Asp Trp Pro Leu Pro Val Lys Leu Pro Leu Val Gly
     50                  55                  60

Gly His Glu Gly Ala Gly Val Val Gly Met Gly Glu Asn Val Lys
65                  70                  75                  80

Gly Trp Lys Ile Gly Asp Tyr Ala Gly Ile Lys Trp Leu Asn Gly Ser
             85                  90                  95

Cys Met Ala Cys Glu Tyr Cys Glu Leu Gly Asn Glu Ser Asn Cys Pro
                100                 105                 110

His Ala Asp Leu Ser Gly Tyr Thr His Asp Gly Ser Phe Gln Gln Tyr
            115                 120                 125

Ala Thr Ala Asp Ala Val Gln Ala Ala His Ile Pro Gln Gly Thr Asp
    130                 135                 140

Leu Ala Gln Val Ala Pro Ile Leu Cys Ala Gly Ile Thr Val Tyr Lys
145                 150                 155                 160

Ala Leu Lys Ser Ala Asn Leu Met Ala Gly His Trp Val Ala Ile Ser
                165                 170                 175

Gly Ala Ala Gly Gly Leu Gly Ser Leu Ala Val Gln Tyr Ala Lys Ala
            180                 185                 190

Met Gly Tyr Arg Val Leu Gly Ile Asp Gly Gly Glu Gly Lys Glu Glu
    195                 200                 205

Leu Phe Arg Ser Ile Gly Gly Glu Val Phe Ile Asp Phe Thr Lys Glu
    210                 215                 220

Lys Asp Ile Val Gly Ala Val Leu Lys Ala Thr Asp Gly Gly Ala His
225                 230                 235                 240

Gly Val Ile Asn Val Ser Val Ser Glu Ala Ala Ile Glu Ala Ser Thr
                245                 250                 255

Arg Tyr Val Arg Ala Asn Gly Thr Thr Val Leu Val Gly Met Pro Ala
            260                 265                 270

Gly Ala Lys Cys Cys Ser Asp Val Phe Asn Gln Val Val Lys Ser Ile
        275                 280                 285

Ser Ile Val Gly Ser Tyr Val Gly Asn Arg Ala Asp Thr Arg Glu Ala
    290                 295                 300

Leu Asp Phe Phe Ala Arg Gly Leu Val Lys Ser Pro Ile Lys Val Val
305                 310                 315                 320

Gly Leu Ser Thr Leu Pro Glu Ile Tyr Glu Lys Met Glu Lys Gly Gln
                325                 330                 335

Ile Val Gly Arg Tyr Val Val Asp Thr Ser Lys Ser Ile Pro Glu Thr
            340                 345                 350

Gln Lys Gly Val Ile Phe Tyr Glu Ser His Gly Lys Leu Glu Tyr Lys
        355                 360                 365

Asp Ile Pro Val Pro Lys Pro Lys Ala Asn Glu Leu Leu Ile Asn Val
    370                 375                 380

Lys Tyr Ser Gly Val Cys His Thr Asp Leu His Ala Trp His Gly Asp
385                 390                 395                 400

Trp Pro Leu Pro Val Lys Leu Pro Leu Val Gly Gly His Glu Gly Ala
                405                 410                 415

Gly Val Val Gly Met Gly Glu Asn Val Lys Gly Trp Lys Ile Gly
            420                 425                 430
```

```
Asp Tyr Ala Gly Ile Lys Trp Leu Asn Gly Ser Cys Met Ala Cys Glu
            435                 440                 445

Tyr Cys Glu Leu Gly Asn Glu Ser Asn Cys Pro His Ala Asp Leu Ser
    450                 455                 460

Gly Tyr Thr His Asp Gly Ser Phe Gln Gln Tyr Ala Thr Ala Asp Ala
465                 470                 475                 480

Val Gln Ala Ala His Ile Pro Gln Gly Thr Asp Leu Ala Gln Val Ala
                485                 490                 495

Pro Ile Leu Cys Ala Gly Ile Thr Val Tyr Lys Ala Leu Lys Ser Ala
            500                 505                 510

Asn Leu Met Ala Gly His Trp Val Ala Ile Ser Gly Ala Ala Gly Gly
        515                 520                 525

Leu Gly Ser Leu Ala Val Gln Tyr Ala Lys Ala Met Gly Tyr Arg Val
    530                 535                 540

Leu Gly Ile Asp Gly Gly Glu Gly Lys Glu Glu Leu Phe Arg Ser Ile
545                 550                 555                 560

Gly Gly Glu Val Phe Ile Asp Phe Thr Lys Glu Lys Asp Ile Val Gly
                565                 570                 575

Ala Val Leu Lys Ala Thr Asp Gly Gly Ala His Gly Val Ile Asn Val
            580                 585                 590

Ser Val Ser Glu Ala Ala Ile Glu Ala
        595                 600
```